(12) United States Patent
Dong et al.

(10) Patent No.: US 11,741,138 B2
(45) Date of Patent: *Aug. 29, 2023

(54) ENABLING RESOURCE SEMANTICS

(71) Applicant: Convida Wireless, LLC, Wilmington, DE (US)

(72) Inventors: Lijun Dong, San Diego, CA (US); William Robert Flynn, IV, Schwenksville, PA (US); Dale N. Seed, Allentown, PA (US); Paul L. Russell, Jr., Pennington, NJ (US)

(73) Assignee: Convida Wireless, LLC, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/551,250

(22) Filed: Dec. 15, 2021

(65) Prior Publication Data

US 2022/0107970 A1    Apr. 7, 2022

Related U.S. Application Data

(63) Continuation of application No. 14/607,648, filed on Jan. 28, 2015, now Pat. No. 11,238,073.

(60) Provisional application No. 61/937,209, filed on Feb. 7, 2014.

(51) Int. Cl.
| | |
|---|---|
| *G06F 16/33* | (2019.01) |
| *H04W 4/70* | (2018.01) |
| *G06F 40/30* | (2020.01) |
| *H04L 61/45* | (2022.01) |
| *H04L 67/51* | (2022.01) |

(52) U.S. Cl.
CPC .............. *G06F 16/33* (2019.01); *G06F 40/30* (2020.01); *H04L 61/45* (2022.05); *H04L 67/51* (2022.05); *H04W 4/70* (2018.02)

(58) Field of Classification Search
CPC .......... G06F 16/33; G06F 40/30; H04W 4/70; H04L 67/51; H04L 61/45
See application file for complete search history.

(56) References Cited

U.S. PATENT DOCUMENTS

| | | |
|---|---|---|
| 9,171,042 B1 | 10/2015 | Welton et al. |
| 2013/0094403 A1 | 4/2013 | Park et al. |
| 2013/0203394 A1 | 8/2013 | Dong et al. |
| 2015/0189005 A1 | 7/2015 | Dubois et al. |
| 2015/0370900 A1 | 12/2015 | Song et al. |
| 2016/0004767 A1 | 1/2016 | Song et al. |

(Continued)

OTHER PUBLICATIONS

Brickley, RDF Schema 1.1, W3C Proposed Edited Recommendation, Jan. 9, 2014, http://www.w3.org/TR/rdf-schema/.

(Continued)

*Primary Examiner* — Apu M Mofiz
*Assistant Examiner* — Husam Turki Samara
(74) *Attorney, Agent, or Firm* — BakerHostetler

(57) ABSTRACT

Disclosed are methods and systems for Semantics Node functions which provide semantics support in machine-to-machine systems. In an example, a Semantic node may manage semantics resources capable of being discovered, retrieved, or validated by other devices. In another example, the Semantics Node may be discovered by other nodes, and semantics resources may be discovered with subscription mechanisms.

20 Claims, 39 Drawing Sheets

(56) References Cited

U.S. PATENT DOCUMENTS

2016/0119435 A1* 4/2016 Ben Fredj ............... H04L 67/51
370/310
2016/0174269 A1* 6/2016 Lei ....................... H04W 8/005
455/515

OTHER PUBLICATIONS

Downey, "XML Schema Patterns for Common Data Structures", Jul. 2005, 9 pages, http://www.w3.org/2005/07/XML-schema-patterns.html.

European Telecommunications-Standards Institute (ETSI), M2M(13)024023R3 Towards semantic M2M, Feb. 22, 2013, 4 pages.

European Telecommunications-Standards Institute (ETSI), TR 102 966 V0.1.1, Machine to Machine Communications (M2M); Interworking between the M2M Architecture and M2M Area Network technologies; Sep. 16, 2011, 19 pages.

European Telecommunications-Standards Institute (ETSI), TR-101-584 V8.5.8; Machine to Machine Corrmunications (M2M); Study on Semantic support for M2M Data, Dec. 7, 2012, 36 pages.

European Telecommunications-Standards Institute (ETSI), TS 102 690 V2.1.1, Machine-to-Machine communications (M2M); Functional Architecture, Oct. 2013, 332 pages.

Hebeler et al, "Semantic Web Programming", Wiley Publishing, Inc., 2009, 651 pages.

International Application No. PCT/US2015/014157: International Search Report and the Written Opinion dated Apr. 14, 2015, 12 pages.

OneM2M Technical Specification, TS-0001 Functional Architecture, V.0.0.5, Jul. 2013, 21 Pages.

Resource Description Framework (RDF): Concepts and Abstract Syntax, W3C Recommendation, Feb. 10, 2004, 21 pages, http://www.w3.org/TR/rdf-concepts/.

* cited by examiner

280

Find some of the existing data of the same application share the same semantics association
281

↓

Classify the data in the same application sharing the same semantics into groups
282

↓

Associate each group with the appropriate semantics
283

↓

Put newly received data from the same application into the group that shares the same semantics
284

FIG. 12

ENABLING RESOURCE SEMANTICS

CROSS-REFERENCE TO RELATED APPLICATIONS

This application is continuation of U.S. patent application Ser. No. 14/607,648, filed Jan. 28, 2015, entitled ENABLING RESOURCE SEMANTICS, which claims the benefit of U.S. Provisional Patent Application No. 61/937,209, filed on Feb. 7, 2014, entitled "ENABLE RESOURCE SEMANTICS IN M2M SYSTEMS," the contents of which are hereby incorporated by reference herein.

BACKGROUND

The rapid increase in the number of network-enabled devices and sensors deployed in physical environments is changing communication networks. It is predicted that within the next decade billions of devices will generate a myriad of real world data for many applications and services by service providers in a variety of areas such as smart grids, smart homes, e-health, automotive, transport, logistics, and environmental monitoring. The related technologies and solutions that enable integration of real world data and services into the current information networking technologies are often described under the umbrella terms of the Internet of things (IoT) or machine-to-machine (M2M) communications. Because of the large amount of data created by devices there is a need for an efficient way to identify and query this data.

FIG. 1 illustrates an example patient monitoring application that may be provided by a patient's hospital or rehabilitation center using compact biomedical wireless sensor motes that use an actuator as an aggregation point. The actuator transmits data to the network. These small wearable resource constrained devices are examples of M2M devices that may be deployed on a patient to continuously monitor vital signs such as blood pressure and flow, core temperature, oxygen saturation, motion, heart rate, hearing, and vision, among other things. Various kinds of M2M data collected by the M2M devices may be used by the patient's doctor, personal trainer (e.g. from 24 hour fitness), and/or an ambulance service, as depicted in FIG. 1. In order to enable the doctor, personal trainer, and the ambulance service to use the data generated from those M2M device, the semantics of those resources need to be available too. The semantics provide a descriptive definition of the data such that the format and structure of the data can be understood (e.g., the semantics provide meaning for the data).

However, current M2M systems such as the ETSI M2M Architecture described in Draft ETSI TS 102 690 and TS 102 921, do not define mechanisms to support semantics (e.g., data stored within ETSI M2M defined container resources do not have any semantic information that can be stored along with it). As a result, devices and applications need to agree beforehand on a common definition of the exchanged containers as well as on the contained data. This makes re-use of M2M data across different applications difficult in current M2M systems.

The semantics concept is commonly known in the area of Semantics Web, which is a collaborative movement led by the international standards body known as the World Wide Web Consortium (W3C). The standard promotes common data formats on the World Wide Web. By encouraging the inclusion of semantic content in web pages, the Semantic Web aims at converting the current web dominated by unstructured and semi-structured documents into a "web of data." The Semantic Web stack builds on the W3C's Resource Description Framework (RDF).

The oneM2M standard under development defines a service layer called "Common Service Entity (CSE)" as illustrated in FIG. 2B. The purpose of the Service Layer is to provide "horizontal" services that can be utilized by different 'vertical' M2M silo systems and applications, such as e-Health, fleet management, and smart homes. CSE supports four reference points as shown in FIG. 2A. The Mca reference point interfaces with the Application Entity (AE). The Mcc reference point interfaces with another CSE within the same service provider domain and the Mcc' reference point interfaces with another CSE in a different service provider domain. The Mcn reference point interfaces with the underlying network service entity (NSE). A NSE provides underlying network services to the CSEs, such as device management, location services and device triggering. CSE contains multiple logical functions called "Common Service Functions (CSFs)", such as Discovery 701 and Data Management & Repository 702 in FIG. 2B. FIG. 2B illustrates the CSFs under development at oneM2M.

Prior to oneM2M, ETSI M2M published its own Service Layer oriented M2M standard as defined in ETSI TS 102 690 Machine-to-Machine communications (M2M) Functional architecture V2.1.1. The architecture of oneM2M is similar to ETSI M2M architecture. ETSI M2M defined the Service Capability Layer entity which consists of various service modules called Service Capability.

As further background, the Resource Description Framework (RDF) described at http://www.w3.org/TR/rdf-concepts/ is a framework for representing information in the Web. RDF is essentially a data-model. Its basic building block is a resource-property-value triple, called a statement. RDF has been given a syntax in XML.

RDF includes the concepts of resources, properties, values, and statements. A resource may be thought of as an object or a "thing." Resources may be authors, books, publishers, places, people, hotels, rooms, search queries, and the like. The resource has a universal resource identifier (URI). A URI may be a unified resource locator (URL), Web address, or some other kind of unique identifier. The identifier does not necessarily enable access to a resource. URI schemes have been defined for web-locations, but also for such diverse objects as telephone numbers, ISBN numbers, and geographic locations. Properties may be considered special kinds of resources, and describe relations between resources, for example "written by," "age," "title," and the like. Properties in RDF are also identified by URIs.

Values may be resources or literals. Literals are atomic values (strings). For example, a resource having a property of "age" can have a literal value of "20." Statements assert the properties of resources. A statement is a resource-property-value triple, consisting of a resource, a property, and a value. The underlying structure of an expression in RDF is a collection of triples, each consisting of a resource, a property, and a value. Each triple represents a statement of a relationship between the things denoted by the nodes that it links.

RDF is domain-independent, in which no assumptions about a particular domain of use are made. It is up to the users to define their own terminology in a schema language called RDF Schema (RDFS). RDFS defines the vocabulary used in RDF data models. In RDFS we can define the vocabulary, specify which properties apply to which kinds of objects and what values they can take, and describe the relationships between objects.

The core classes defined by W3C are
rdfs:Resource, the class of all resources
rdfs:Class, the class of all classes. The group of individuals that belongs to a class shares the same properties.
rdfs:Literal, the class of all literals (strings)
rdf:Property, the class of all properties.
rdf: Statement, the class of all reified statements
The core properties defined by W3C are
rdf: type, which relates a resource to its class. The resource is declared to be an instance of that class.
rdfs:subClassOf, which relates a class to one of its superclasses. Instances of a class are instances of its superclass.
rdfs:subPropertyOf, relates a property to one of its superproperties.
rdfs:domain, which specifies the domain of a property P, or specified subjects of the property in the triple.
rdfs:range, which specifies the range of a property P. The class of those resources that may appear as values in a triple with predicate P.

With the foregoing discussion of M2M systems and the RDF and RDFS as background, the present application is directed to systems and method for semantic support and management in M2M systems.

SUMMARY

Disclosed herein are methods, devices, and systems for Semantics Node functions which provide semantics support in machine-to-machine (M2M) systems. The M2M architecture with Semantics Nodes is proposed as well as the architecture of the Semantics Node. The disclosure defines Semantics Node reference points (sIs, sIe, sIc), Semantics Node procedures, and Semantics Node messages, among other things.

In addition, issues with regard to complex data types may be addressed herein by structures and representations of the semantics-related resources and methods to enable semantics to resources by linking and associating the resources with the semantics-related resources. In another aspect, the issues may be addressed via mechanisms to enable extension of XSD with restrictions/facets unit and description, such that the fields in the complex data type can be extracted and interpreted. In yet another aspect, the issues may be addressed by embedding description/attributes in the name of the datatypes and the fields in the complex datatypes, such as keywords of the datatype to make it discoverable and interpretable and unit of each field in the datatype such that the value to each can be properly quantified.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 12 illustrates a flow diagram of grouping of resources with the same semantics.

DETAILED DESCRIPTION

In current M2M systems, M2M applications (hosted on devices as well as backend network servers) need to agree beforehand on a common definition of exchanged data. This is primarily due to a lack of semantic aware M2M service layers that are able to parse, interpret, or process M2M data automatically on behalf of applications. In current M2M systems, M2M service layers lack semantic awareness capabilities and hence data flowing through or stored within M2M service layers is treated as opaque information.

This lack of semantic awareness prevents M2M service layers from offering services which allow data produced by M2M applications to be effectively abstracted or virtualized by the M2M service layer such that it can be discovered, accessed, interpreted, and shared by different applications even if they do not have any prior knowledge of the application from which the data originated. As a result, the physical entities that are sensed and acted upon (e.g. appliances, people, cars, rooms of a building, etc.) may not be effectively virtualized/abstracted by M2M service layers and the physical entities are treated as generic entities, intrinsic to the environment, and not tied to a specific M2M application.

In order to overcome this limitation, the data transmitted in M2M systems needs to be associated and integrated with semantic information, such that semantic aware M2M service layers can have the same knowledge of the data as M2M applications. In doing so, M2M service layers can better facilitate the sharing of data across applications and provide value-added semantic aware services to M2M applications (e.g., data aggregation, data sharing amongst different applications, etc.).

Figure 1:
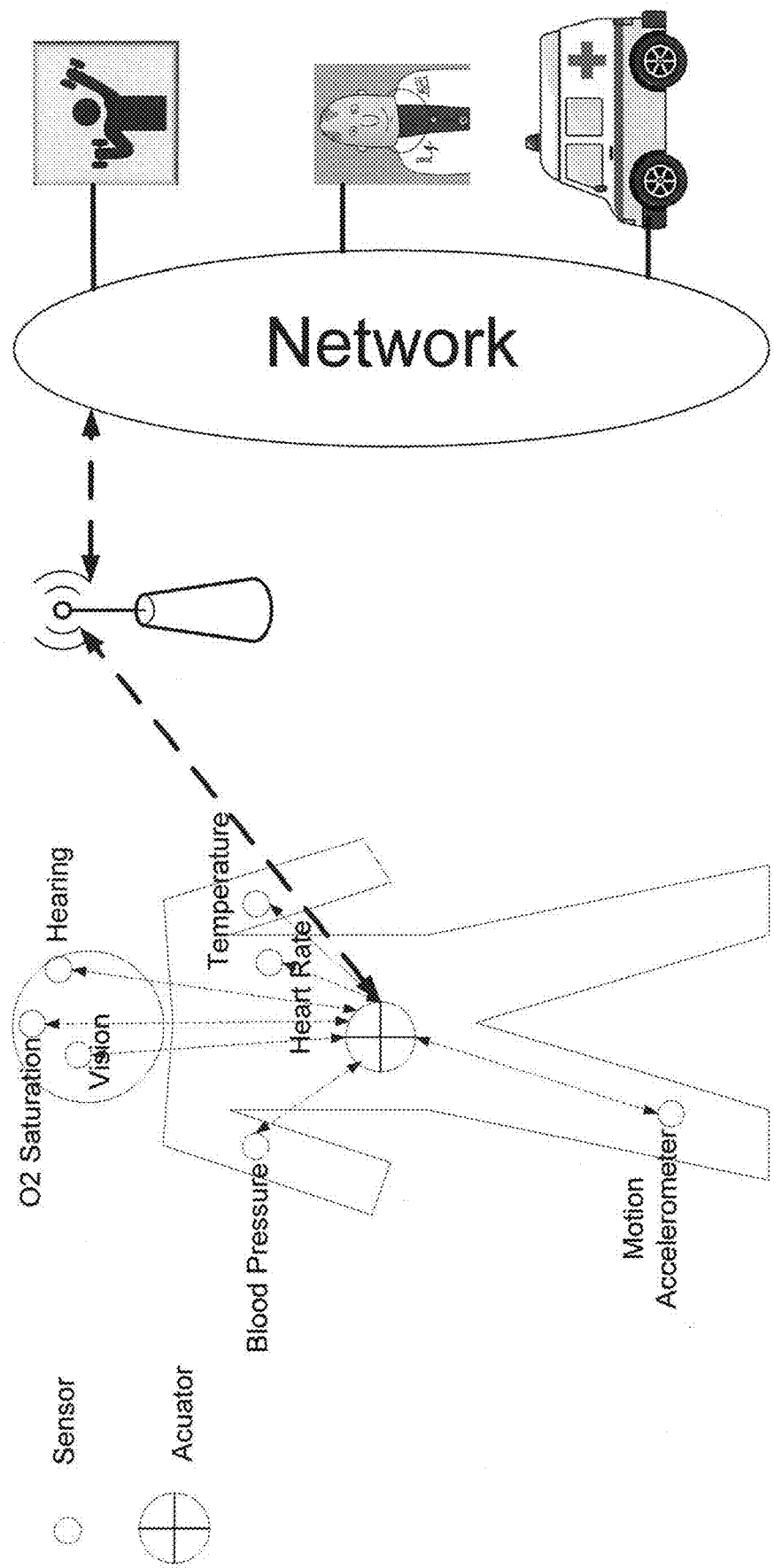
FIG. 1 illustrates a patient monitoring application.
Figure 2A:
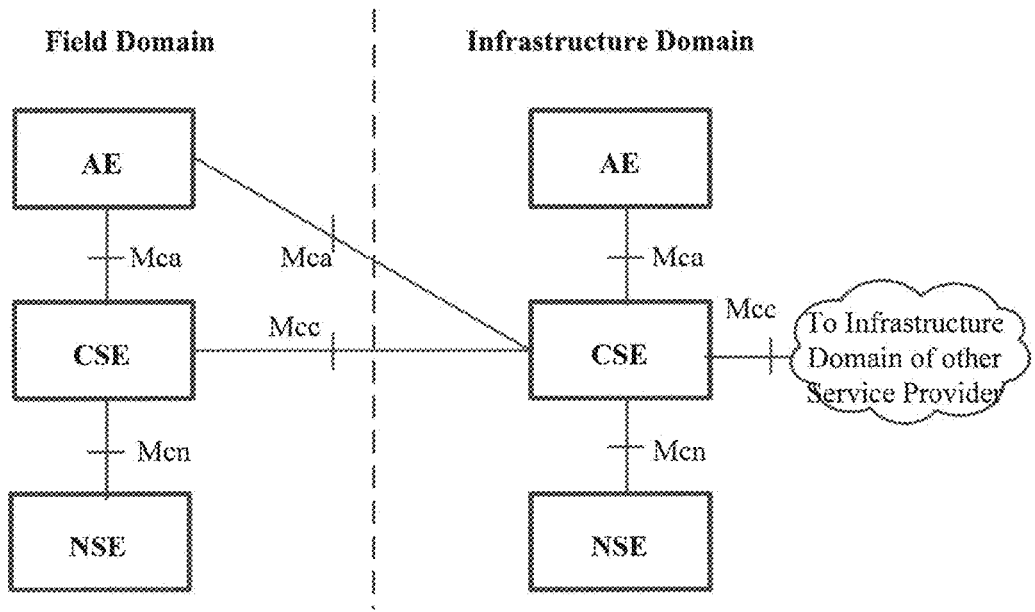
FIG. 2A illustrates a oneM2M Architecture.
Figure 2B:
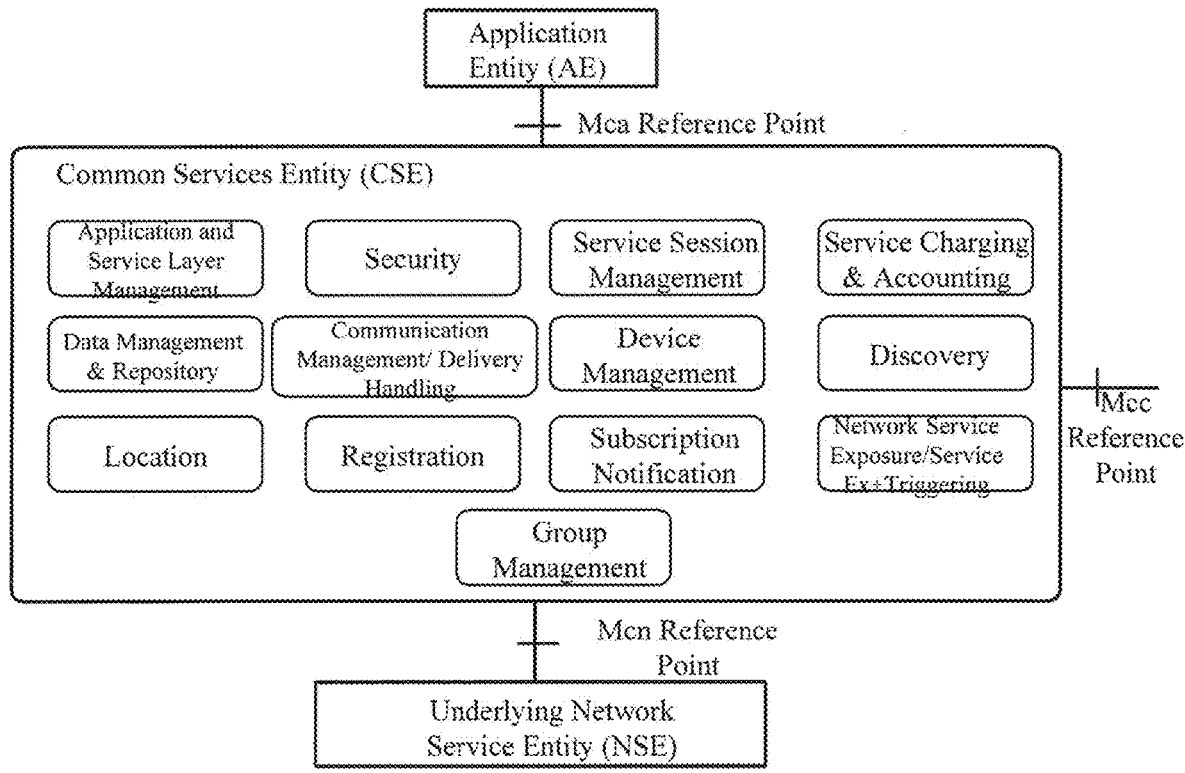
FIG. 2B illustrates a oneM2M Common Service Functions.

For example, in the patient monitoring application illustrated in FIG. 1, there could be separate applications hosted on each of the wireless sensor devices that monitor a patient's vital signs (e.g., blood pressure, temperature, oxygen, heart rate, etc.). Likewise, there could be separate applications hosted in the network that could make use of this information (e.g., patient's doctor, personal trainer, family members, ambulance paramedics, etc.). However, without M2M semantic aware services data from each of the wireless sensor devices, network applications may have difficulty discovering, sharing, and understanding the information from device applications unless the network applications have prior knowledge of the applications hosted on the wireless sensor devices and the type of information they produce (e.g. the location/address, units of the data, context of the data, etc.).

The present application aims to provide the following functionalities in an M2M system to support M2M service layer semantic awareness and data abstraction: (i) support for storing semantics information, and/or support for interfaces to servers storing semantics information; (ii) support for mechanisms for creating, retrieving, updating, and deleting semantics information; (iii) support for mechanisms for semantic information updates to local and remote resources; (iv) support for associating/linking semantic information with corresponding resources which may be stored either locally or remotely; and (v) capabilities to publish and discover semantic descriptions.

In order to provide one or more of the functionalities mentioned, the present application discloses the concept of a semantics node. As described herein, a semantics node is a logical entity that may be hosted on a stand-alone computing device (e.g., server) in the network or hosted on an existing entity within the network, such as an M2M gateway, M2M device, M2M server, or the like. A semantics node may be seen as a repository that describes data. For example, a sensor device for blood pressure may want to understand how to describe its data, so it queries a nearby semantics node to find out if there is a blood pressure class already defined. If so, the semantics node responds to the sensor device with the blood pressure class it found locally. If not, the semantics node may query other semantics nodes (e.g., siblings or parents). The use of a semantics node may reduce the need to have end devices store descriptions of data.

A semantics node stores and manages semantics related resources, which are stored on the semantics node. Semantics related resources usually describe other resources, such as, for example, the ETSI M2M resources that are stored under the resource tree, <SCL>, <application>, <container>, <contentInstance>, which need to have semantics related resources associated with them in order to enable an understanding of their semantics. In one example, semantics related resources may have one of three types: class, relationship, and term. This categorization provides compatibility with current techniques of the semantics web and enables an M2M system to leverage existing semantics related resources.

As discussed herein, semantics nodes may be deployed in an M2M system in different levels, such as a M2M area network, a M2M access network, and a M2M core network, such that the different levels form into a hierarchical structure. Semantics nodes in the same level may be distributed and have a sibling relationship. Mechanisms are disclosed with regard to building and maintaining such a hybrid architecture of semantics nodes, which provides the benefits of different levels of abstraction and compatibility to an existing network hierarchy.

Functions, reference points, messages, and procedures for the semantics node are also disclosed. In various examples, the following functionalities may be enabled on a semantic node: (i) semantics related resources managed by the semantics node are capable of being discovered, retrieved, and validated; (ii) semantics nodes may be discovered by other nodes and semantics related resources may also be discovered with subscription mechanisms; (iii) semantics related resources may be linked and associated with resources in the M2M system such that the semantics related resources are provided with semantics information and universally understood; (iv) semantics related resources may be pushed to other semantics nodes in the hierarchy for the purpose of efficient discovery and easy access; (v) semantics related resource association and linking may be optimized based on the semantics similarity and grouping of semantics related resources being described; and (vi) semantics related resources may be moved from one semantics node to another semantics node, along with the data movement.

In one example described hereinafter, the semantics node is implemented in the service capability layers (xSCLs) of the ETSI M2M/oneM2M architecture. In another example, the semantics node is implemented in a service capability server (SCS) of the 3GPP Machine Type Communication (MTC) architecture.

I. M2M Architecture with Semantics Nodes

Figure 3:
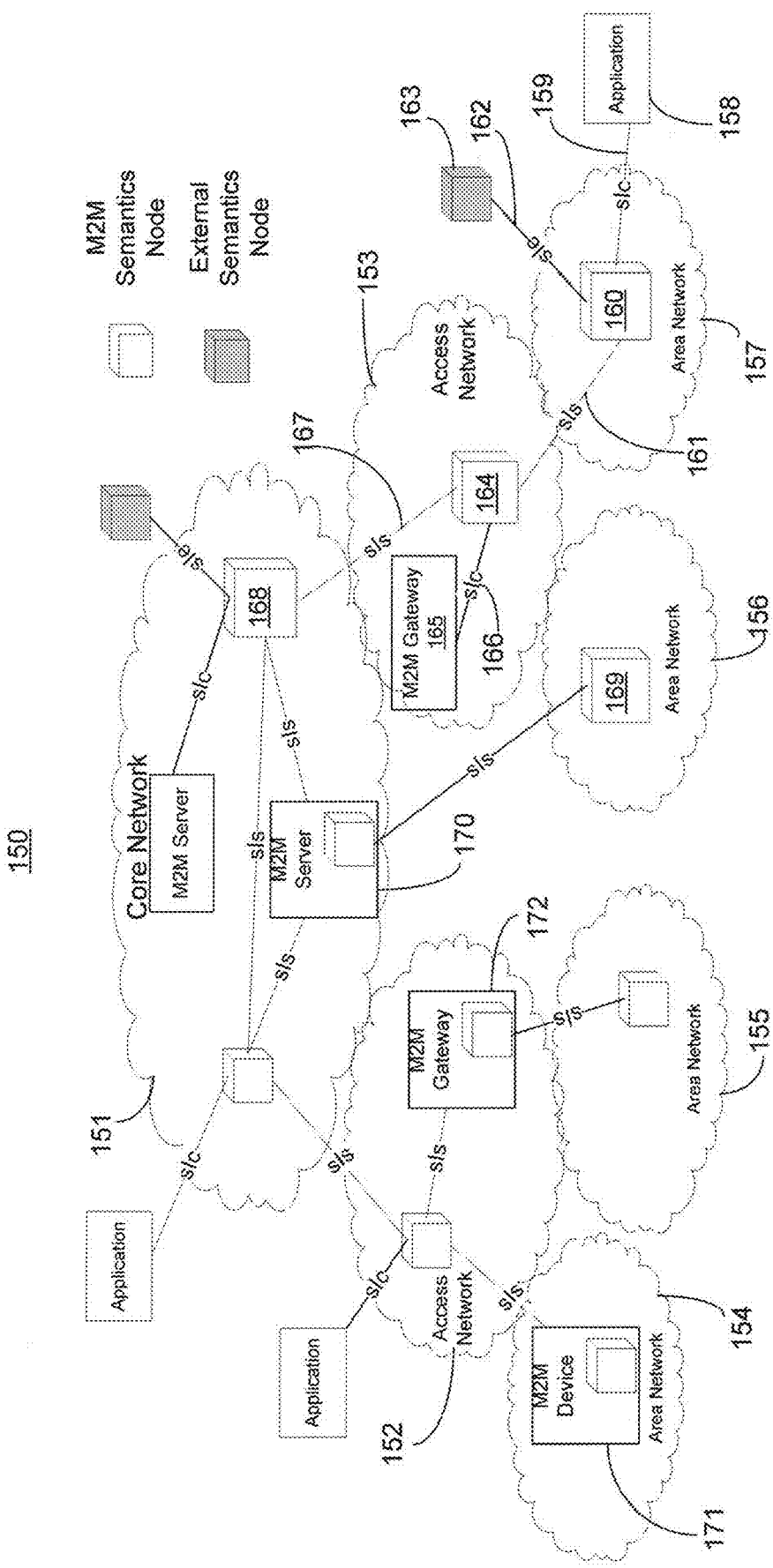
FIG. 3 illustrates a M2M Architecture with semantics nodes.

One example of an M2M system that includes semantics nodes is illustrated in in FIG. 3. As shown in M2M system 150 the semantics nodes are deployed at three levels. There may be an area level, which may include networks, such as area network 154, area network 155, area network 156, and area network 157. There may be an access level, which may include networks, such as access network 152 and access network 153. And there may be a core level, which includes a network, such as core network 151.

As shown in system 150, application 158 may be communicatively connected with M2M semantics node 160 located in area network 157 via reference point sIc 159. The sIc reference point is generally used by applications, other non-semantics node entities in the area network, access network, and core network entities to talk to a semantics node. M2M semantics node 160 is communicatively connected with external semantics node 163 via reference point sIe 162. The semantics nodes in M2M systems may interface with external semantics nodes via the sIe reference point. The external semantics nodes may manage other existing semantics related resources such as those defined by RDFS for the semantics web. M2M semantics node 160 is also communicatively connected with M2M semantics node 164 located in access network 153 via sIs reference point 161. M2M semantics node 164 is communicatively connected with M2M gateway 165 via sIc reference point 166 and communicatively connected with M2M semantics node 168 located in core network 151 via reference point sIs. In this example, M2M Gateway 165 itself is not a semantics node, but in other examples, M2M Gateway 165 could incorporate the functionality of semantics node.

Semantics node(s) may be deployed at the area level for the purpose of offloading, load balancing, easy access, etc. At the area level, it is possible that there is no semantics node deployed if all the devices in the local area network communicate with a semantics node in the attached access or core networks. A semantics node at the area level may have a corresponding parent semantics node at the access level (e.g., M2M semantics node 160 connected with M2M semantics node 164) or at the core level (e.g., M2M semantics node 169 connected with M2M server 170 that includes a semantics node). Semantics nodes talk to each other through the sIs reference point. The details of the reference points are defined further hereinafter. A semantics node at the access level may also have a parent at the core level, which it communicates with over the sIs reference point. Likewise, a semantics node at the access level may have children semantics nodes at the area level, which it communicates with via the sIs reference point. Semantics nodes at the core level may also have children semantics nodes at the access or area level.

In addition to the parent-child relationships illustrated in FIG. 3, the semantics node also supports a notion of siblings at any of the semantics node levels (e.g., access, area, or core). Sibling semantics nodes are nodes at the same level in the hierarchy and can be used to distribute the load of the semantics node. For example, in core network 151, M2M semantics node 168 is connected with M2M server 170 that includes a semantics node. From a vertical perspective, if there is an established hierarchy of more than one semantics node, then the nodes can talk to each other and share semantics information, via notification, broadcast, discovery, etc. over the sIs reference point.

For a constrained device, due to the limit of capacity, the semantics can be a code referring to a specific semantic or a link pointing to the semantics stored in a remote semantics node. Such semantic information may be provided by the application that created the data or by the service layer.

At the access level, there might be one or more semantics nodes deployed in one access network. If so, the siblings may communicate with each other for semantics information notification, broadcast and discovery through the sIs reference point. A semantics node at the access level may also have a parent at the core level which it communicates with over the sIs reference point. Likewise, a semantics node at the access level may have children semantic nodes at the area level which it communicates with via the sIs reference point.

At the core level, there might be one or more semantics nodes deployed in the core network. These nodes may be siblings and communicate with each other over sIs reference point for sharing semantics information using notification, broadcast and discovery. Semantics nodes at the core level may also have children semantic nodes at the access or area level. Applications, other non-semantics-node entities in the area network, access network and core network talk to a semantics node via the sIc reference point.

As mentioned above, a semantics node may be a standalone physical node in a network (e.g., standalone M2M semantics node 160) or it can be a logical entity hosted on another physical node in the network, such as M2M device 171, M2M gateway 172, or M2M server 170, as shown in system 150 of FIG. 3. In the other words, an M2M device, M2M gateway, and M2M server can support semantics node functionalities.

A feature of the multi-layer semantics node hierarchy illustrated in FIG. 3 is that it can provide different levels of abstraction. A semantics node may only be in charge of managing the semantics related resources in a localized area, such as in a M2M area network, such that the area network specific semantics related resources may be found locally. Any semantics related resources that are not typical in the localized area can be stored and found in higher-level parent or parallel sibling semantics nodes. Another feature is that the semantics related resources may have a hierarchy themselves due to the Internet hierarchy, the location hierarchy, etc. As a result, the multiple layers of semantics are coherent with the existing network architecture. In addition, semantics nodes may be distributed in each level, which prevents a single failure point if a centralized semantics node is deployed only in the core network.

II. Semantics Node Architecture

More details regarding the architecture of a semantics node will now be discussed. As mentioned, a semantics node stores and manages semantics related resources. As defined herein, a semantics related resource comprises information that can be used to describe the semantics information of a thing, such as the meaning of data generated by an M2M device or application or the M2M device or application itself. In one example, semantics related resources may be expressed in extensible markup language (XML) using existing schemas, such as XML Schema Definition (XSD), RDF Schema/Web Ontology Language (RDFS/OWL), or the like. In an example, three types of semantics related resources may be stored in a semantics node—classes, relationships, and terms—each of which is described more fully below. The categorization of semantics related resources in this manner provides compatibility with the current techniques of the semantics web. This compatibility enables an M2M system to leverage existing semantics related resources, such as for example those core classes and core properties defined by W3C. Applications and entities external to the M2M system are able to use the semantics related resources hosted by the semantics node, without incurring any extra overhead due to format conversion or modification necessary to make the semantics compatible.

Classes. Discussed herein is the concept of classes of objects/things in an M2M domain. In the example health monitoring system of FIG. 1, for example, the classes of objects relevant to the system include patient, doctor, ambulance dispatcher, blood pressure, core temperature, oxygen saturation, motion accelerometer and the like. A class may be identified by a uniform resource identifier (URI) or a uniform resource locator (URL). A class contains field descriptions that contain information defining the class. For example, a temperatureReading class that represents temperature data as an integer in units of Celsius and can be used, for example, to provide those semantics to data generated by a temperature sensor may be defined in XML with the schema of XSD as follows:

```
<simpleType name="temperatureReading">
    <restriction>
        description ="temperature in Celsius" unit="Celsius" base="integer"
    </restriction>
</simpleType>
```

Here, the class contains the fields "description," "unit," and "base," and the information in those fields is "temperature in Celsius," "Celsius," and "integer," respectfully. As another example, a BloodPressure class may contain two fields, one for systolic pressure and another for diastolic pressure. The class description for this BloodPressure class would include both fields' descriptions and may be expressed using XML/ as follows:

```
<complexType name="BloodPressure">
    <sequence>
        <element name="systolicINmmHG " type="integer"/>
        <element name="diastolicINmmHG" type="integer"/>
    </sequence>
</complexType>
```

Again, however, it is understood that classes (and the other types of semantic related resources—relationships and terms) are not limited to expression using XML/XSD but rather may be expressed in any of a variety of suitable description languages, including, for example, RDFS/OWL and the like. Classes may also be related to each other. For example, "blood pressure" may be a subclass of "vitals", or equivalently, "vitals" may be a superclass of "blood pressure." The subclass/superclass relationships define a hierarchy of classes. In general, A is a subclass of B if every instance of A is also an instance of B. A class may have multiple super classes.

Relationships. Relationships are a special kind of semantics related resource. Relationships describe relations between semantics related resources, for example "created by," "lifetime," "subscribed by," and so on. A relationship can also be identified by a URI/URL, which gives a global and unique naming scheme to relationships of the M2M domain. Classes and inheritance are known in other fields of computing, for example in object-oriented programming. But while there are similarities, differences exist too. In object-oriented programming, an object class defines the relationships or properties that apply to it. To add new relationships or properties to a class means to modify the class. However, here, relationships are defined globally, that is, they are not encapsulated as attributes in class definitions. A new relationship may be defined that applies to an existing class without changing the definition of the class itself. Like classes, the relationships can also be related to each other. For example, "energy mode" and "usage mode" are sub-relationships of "mode". If a device has an "energy mode" of electric and a "usage mode" of manual, then it has a "mode" of electric and manual.

Terms. Terms are concepts that are commonly used in an M2M domain. As defined herein, a term is a value that may be used by many parties to describe the semantics of a resource. The definition of a term may be universally acknowledged in certain domains where it is published. For example, manual, user-directed, and autonomous are each examples of terms that may be used to describe, for example, an appliance's usage mode. In general, the creator of a semantics related resource will determine whether that semantics related resource is a class, relationship, or term. A semantics node will then store the semantics related resources under the categories defined or determined by their creator. For example, in the patient monitoring example of FIG. 1, semantics related resource classes, relationships, and terms may be created by a blood pressure monitor manufacturer, by a doctor, or by another appliance manufacturer. In other examples, semantics related resource classes, resources, and terms may be defined or created by a vertical application.

The semantics of a resource (including data, thing, etc.) can be described by a resource-relationship-value triple, consisting of a resource, a relationship and a value. Values can either be classes, terms, or other resources. The following are some examples, A content instance (resource) hasType (relationship) temperatureReading (class)

An appliance (resource) hasUsageMode (relationship) user-directed (term)

A content instance (resource) generatedBySameApplicationAs (relationship) another content instance (resource)

Figure 4:
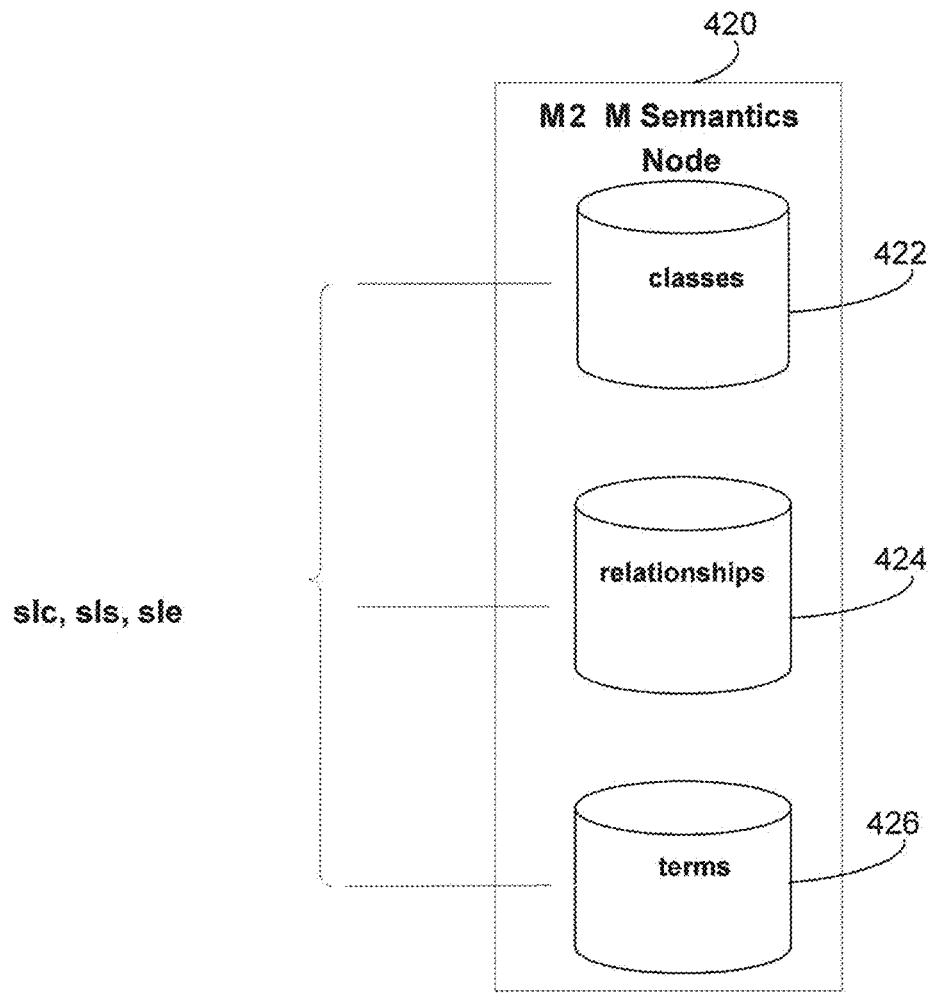
FIG. 4 illustrates a M2M semantics node architecture.

Through the proposed sIc, sIs and sIe reference points, requests to a semantics node's class, relationship and term resources can be made. FIG. 4 is an exemplary illustration of an M2M semantics node's class, relationship and term resources. As illustrated in this example, semantics node 420 may be configured to store various classes 422, relationships 424 and terms 426 from different applications and domains. Alternatively, semantics node 420 may be configured to store class, relationship, and term resources for a unique application or domain, such as appliance semantics, vehicle semantics, health care application semantics, or the like.

III. M2M Semantics Node Functions and Reference Points

In this section, further details concerning the functions and reference points of a semantics node are provided. In one example, a semantics node may perform the following functions: authenticating other semantics nodes including authenticating lower level children or parallel sibling semantics nodes in a semantic node hierarchy to allow them to register and make requests for a semantic node's resources;

authenticating applications, devices, and/or users to allow them to publish, create, delete, update, and retrieve semantics related classes, relationships and terms resources; storing and managing semantics related classes, relationships and terms resources; providing support for discovery of semantics related resources; and providing support for semantics nodes to communicate with one another (between parent-child, siblings) in order to collaborate on discovery queries and share semantics related resource information.

A semantics node may communicate with other entities in the network via one or more reference points or interfaces. In one example, three reference points are defined—an sIs reference point, an sIc reference point, and sIe reference point. The sIs reference point is used for communication between semantics nodes. The sIs reference point may also be used by a semantics node to register to another semantics node to form parent-child or sibling relationships, to discover other semantics nodes, to notify others about its status (e.g., online, offline, overloaded, etc.), to trigger another semantics node to perform a particular operation (e.g., de-registration, registration), to publish, create, delete, update, and retrieve semantics related resources in another semantics node. In addition, a semantics node may use the sIs reference point to subscribe to semantics related resources in another semantics node and to receive corresponding notifications, to discover semantics related resources on the siblings and parent semantic nodes in its hierarchy, to move a group of semantics related resources from one semantics node to another semantics node, and to allow the semantics related resources stored in another semantics node to be linked and associated with a resource to provide the semantics to that resource, as described further below in connection with FIG. 20, FIG. 21, and FIG. 22.

In the present example, the sIc reference point may be used by an application or non-semantics node to communicate with a semantics node from various network domains (e.g., area network, access network, or core network). The sIc reference point also allows an application or non-semantics node to publish, create, delete, update, retrieve, subscribe to, or discover semantics related resources in a semantics node and to receive notifications from the semantics node. In addition, the sIc reference point allows the semantics related resources stored in a semantics node to be linked and associated with a resource to provide the semantics to that resource.

The sIe reference point may be used for communication between a semantics node that is part of an existing hierarchy of nodes in an M2M system and an external semantics node. An external semantics node stores semantics-related resources outside of the M2M domain. One example of an external semantics node may be a server that stores the semantics-related resources for Semantic Sensor Network Ontology that is defined by the W2C Semantic Sensor Network Incubator Group, as described at http://www.w3.org/2005/Incubator/ssn. The sIe reference point allows a semantics node to retrieve, discover, and subscribe to semantics related resources in an external semantics node and vice versa. Also via the sIe reference point, external semantics nodes may discover semantics nodes in the M2M system and receive notifications.

One example of the messages associated with the sIs, sIe, and sIc reference points, which effectively define those reference points, are set forth below in Table 1.

Table 1 lists semantics node related messages, there corresponding meanings, and reference points used.

TABLE 1

Semantics Node Messages

| Message | Description | Reference Point |
| --- | --- | --- |
| SEMANTICS_NODE_DISCOVERY_REQ/RESP | Discover individual semantics nodes to build the hierarchy of semantics nodes and sibling relationship. | sIs, sIc, sIe |
| SEMANTICS_NODE_REGISTER_REQ/RESP | Register to the upper-level semantics node to build the parent-child relationship. | sIs |
| SEMANTICS_NODE_DEREGISTER_REQ/RESP | De-register from the upper-level semantics node to release the parent-child relationship. | sIs |
| SEMANTICS_NODE_STATUS_NOTIFY | Notify the status of a semantics node, e.g. online, offline, overloaded, etc. | sIs |
| SEMANTICS_NODE_DEREGISTER_TRIGGER | Trigger a semantics node to de-register from the current parent, the new candidate parent may be piggybacked. | sIs |
| SEMANTICS_NODE_REGISTER_TRIGGER | Trigger a semantics node to register to another semantics node as parent while the current parent goes offline or proactively releases the parent-child relationship. | sIs |
| SEMANTICS_RELATED_RESOURCE_CREATE_REQ/RESP | Create semantics related resources in types of class, relationship, term in a semantics node | sIs, sIc |
| SEMANTICS_RELATED_RESOURCE_RETRIEVE_REQ/RESP | Retrieve semantics related resources in types of class, relationship, term in a semantics node | sIs, sIc, sIe |

TABLE 1-continued

Semantics Node Messages

| Message | Description | Reference Point |
|---|---|---|
| SEMANTICS_RELATED_RESOURCE_UPDATE_REQ/RESP | Update semantics related resources in types of class, relationship, term in a semantics node | sIs, sIc |
| SEMANTICS_RELATED_RESOURCE_DELETE_REQ/RESP | Delete semantics related resources in types of class, relationship, term in a semantics node | sIs, sIc |
| SEMANTICS_RELATED_RESOURCE_SUBSCRIBE_REQ/RESP | Subscribe to semantics related resources in types of class, relationship, term in a semantics node | sIs, sIc, sIe |
| SEMANTICS_RELATED_RESOURCE_SUBSCRIBE_NOTIFY | Notify the subscribers of the semantics related resource update | sIs, sIc, sIe |
| SEMANTICS_NODE_RESOURCE_SUBSCRIBE_REQ/RESP | Subscribe to a semantics node's stored and managed semantics related resources, with conditions set up. | sIs, sIc, sIe |
| SEMANTICS_NODE_RESOURCE_SUBSCRIBE_NOTIFY | Notify the subscribers of the semantics related resource update from the semantics node. | sIs, sIc, sIe |
| SEMANTICS_RELATED_RESOURCE_MODIFY_REQ/RESP | Modify a semantics related resource to suit the requester's requirement, which may be implemented by UPDATE and CREATE RESTFUL operations. | sIc |
| SEMANTICS_RELATED_RESOURCE_DISCOVERY_REQ | Discover existing semantics related resources in types of class, relationship, term by setting up the search strings (key words) | sIs, sIc, sIe |
| SEMANTICS_RELATED_RESOURCE_DISCOVERY_RESP | Respond to a semantics related resource discovery request by returning the address (e.g. URL/URI) of the matching semantics related resources | sIs, sIc, sIe |
| SEMANTICS_LINKAGE_CREATE_REQ/RESP | Create semantics linking and association between a M2M data/resource and a semantics related resource. | sIs, sIc, sIe |
| SEMANTICS_LINKAGE_UPDATE_REQ/RESP | Update semantics linking and association between a M2M data/resource and a Semantics related resource. | sIs, sIc, sIe |
| SEMANTICS_LINKAGE_RETRIEVE_REQ/RESP | Retrieve semantics linking and association between a M2M data/resource and a semantics related resource. | sIs, sIc, sIe |
| SEMANTICS_LINKAGE_DELETE_REQ/RESP | Delete semantics linking and association between a M2M data/resource and a semantics related resource. | sIs, sIc, sIe |

Protocols such as hypertext transfer protocol (HTTP) or constrained application protocol (CoAP) may be used as an underlying transport protocol for carrying the different types of messages. Examples are presented below of the use of these messages to perform the various semantic node functionalities discussed above IV. M2M Semantics Node Procedures A. Build Semantics Node Hierarchy In this section, additional details are provided regarding how a hierarchy of semantics nodes (hereinafter "semantics node hierarchy") may be built, in accordance with one example. In this example, a semantics node hierarchy is built up by determining the parent-child and sibling relations between the semantics nodes located at the different area, access, and core levels in a network.

Figure 5A:
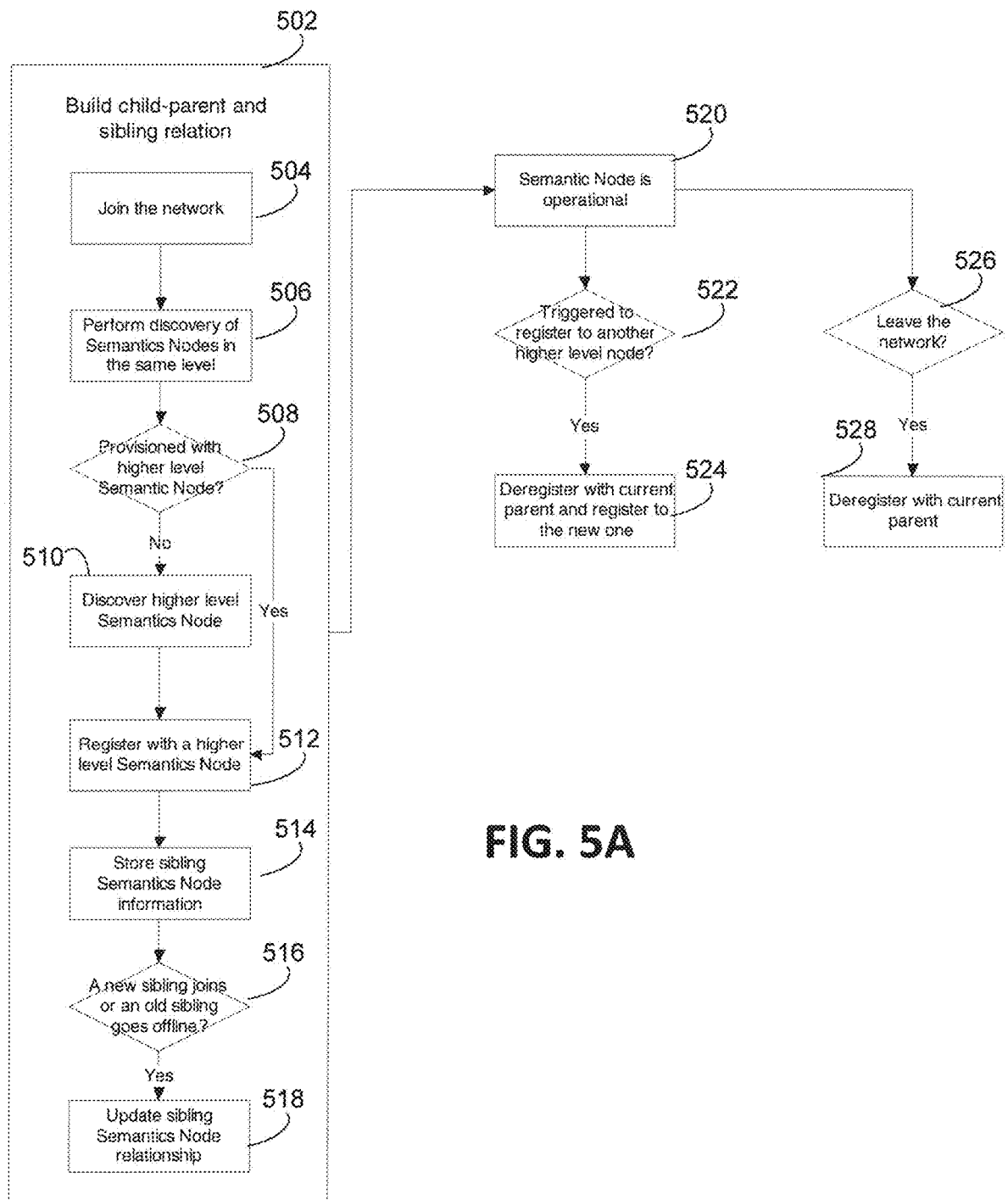
FIG. 5A is a flow diagram illustrating one aspect of a method for establishing a semantics node hierarchy.

FIG. 5A is a flow diagram illustrating one example of a method for establishing a semantics node hierarchy. When a semantics node joins the network (step 504), i.e., becomes online, it needs to first build the child-parent and sibling relations before it can become an operational Semantic Node in the network. To this end, in step 506, the semantic node may perform discovery of sibling semantics nodes in the same level.

The discovery of sibling semantics nodes may be based on sending out semantics node discovery requests (e.g., multicast, broadcast, anycast) where a discovery request can be issued in an attempt to discover sibling semantics nodes. The request can have a defined hop-limit that limits the flooding of discovery request and response messages, which may congest the network. Alternatively, the discovery can leverage existing discovery mechanisms available within the network, such as domain name system (DNS), DNS service discovery (DNS-SD), service location protocol (SLP), etc., if available. A semantics node may store the returned information of the neighboring sibling semantics nodes, such as IP address or type(s) of semantics information managed. As discussed further below, the sibling semantics node discovery response message may also piggyback the address of a higher-level semantics node discovery server, the address of a parent semantics node of the sibling, or both.

Figure 5B:
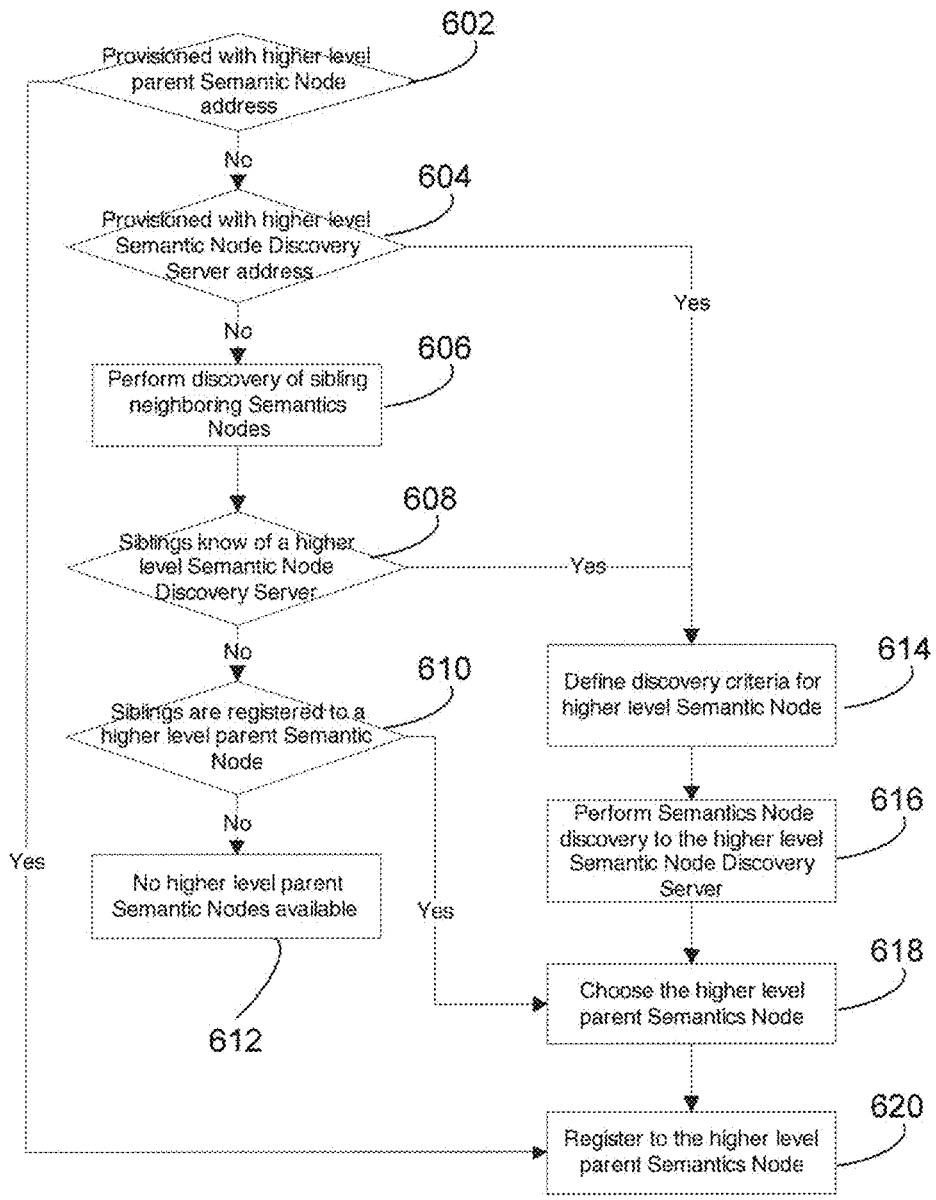
FIG. 5B illustrates steps in FIG. 5A in more detail.

Referring still to FIG. 5A, following discovery of sibling semantic nodes, the semantic node may next attempt to discovery and/or register with higher level semantic nodes in step 508, step 510, and step 512. If the semantics node is provisioned with the higher level node that it needs to register with, it can simply register with this provisioned semantics node and build the parent-child relationship (step 508, step 512). Otherwise, the semantics node needs to discover the existing higher level semantics nodes, and choose one of them to register with (step 510). The choice may be based on a criterion such as nearest in the adjacent upper level, supporting the same type(s) of semantics resources, and the like. FIG. 5B illustrates these step 508, step 510, and step 512 in more detail.

In the present example, at each level, there may be one semantics node discovery server, which accepts a higher-level semantics node discovery request by default. The address of the semantics node discovery server may be well known to the lower level semantics nodes. As shown in FIG. 5B, if the new semantic node is not provisioned with a higher level parent semantic node address (step 602), and if the new semantics node is not provisioned with the semantics node discovery server in the upper level (step 604), it can firstly perform sibling semantics node discovery 606. As part of sibling discovery, the address of the semantics node discovery server may be shared (e.g., piggybacked in the sibling discovery response received from a discovered sibling semantic node) (step 608). On the other hand, it may also explicitly request the siblings' parent semantics node information (address) such that it may choose one as its own parent to which to register (steps 610, 618).

If the new semantics node is provisioned with the upper level semantics node discovery server's address, it can perform the semantics node discovery directly (control passes from step 604 to step 614). Otherwise, it decides whether it wants to choose from the siblings' parent list and whether it wants to retrieve the default semantics node discovery server's address from siblings (steps 608 and 610). If the new semantics node chooses an upper-level semantics node from the siblings' parents (step 618), it may choose not to perform the semantics node discovery further. Otherwise, it decides the criteria of choosing the parent (nearest in hop count, supporting the same type(s) of semantics resources, etc.) (step 614). Based on the criteria, it sets up the information it wants to discover in addition to the semantics nodes' addresses in the upper level (distance, supported type(s) of semantics resources, etc.) (step 616).

At step 620, the new semantic node may register to the higher level parent semantics node it discovered or otherwise selected. If the new semantic node is unable neither to learn the address of a higher-level semantic node discovery server nor to identify any higher-level parent semantic nodes of its siblings to which it might register, it may determine that no higher level parent semantic nodes are available and end the process at step 612.

Referring back to FIG. 5A, once discovery of siblings and discovery and registration with a parent node is complete, the information about the new semantic node's siblings and parent is stored (step 514). As further illustrated in FIG. 5A, if new siblings join the network or an existing sibling goes offline, the semantic node may update it semantic node relationships (steps 516, 518). At step 520, the new semantic node is now operational. As further illustrated in FIG. 5A, the operational semantic node may at some later point be triggered to register to another higher level node (step 522) of it may leave the network (step 526). In the former case, the semantic node may deregister with its current parent and register with the new one (step 524). In the latter case, the semantic node may simply deregister with its current parent (step 528).

Figure 6:
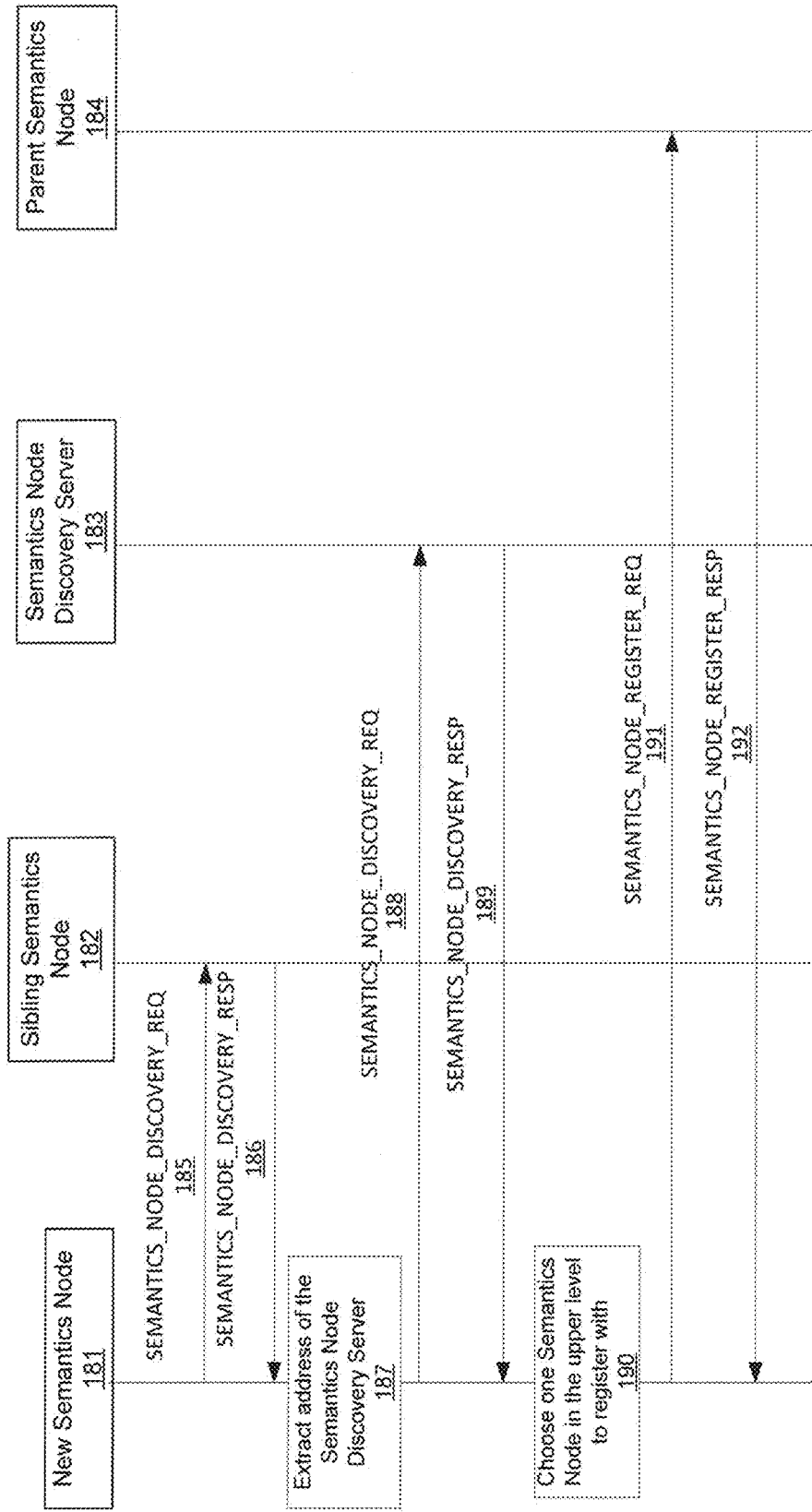
FIG. 6 illustrates a message flow of semantics node registration.

FIG. 6 is a message flow diagram further illustrating the semantics node discovery and registration process discussed above and illustrated in FIG. 5A and FIG. 5B. At step 185, new semantics node 181 sends a semantics node discovery request to sibling semantics node 182. Sibling semantics node 182 is in the same network level as new semantics node 181. The semantics node discovery request of step 185 may contain a request for information (e.g., an address) with regard to semantics node discovery server 183 or information for a semantics node that is the parent (e.g., upper level) semantics node 184 of sibling semantics node 182. A request for the parent semantics node may allow new semantics node 181 to choose its own parent to register with.

Semantics node discovery server 183 may be considered a centralized point for storing information of the semantics nodes scattered in the same level or a rendezvous point to flood the discovery request in the same level of a network and collect the returned responses of semantics nodes. Semantics node discovery server 183 may be a server that resides in a network at a higher, same, or lower level network level than the network level of new semantics node 181. This example assumes that semantics node discovery server 183 is in an upper level in relation to the network level of new semantics node 181. The address of the semantics node discovery server 183 can be well known to lower level semantics nodes (e.g., sibling semantics node 182). If new semantics node 181 is not provisioned with semantics node discovery server 183, then new semantics node 181 may perform sibling semantics node discovery. If new semantics node 181 is provisioned with the address of the semantics node discovery server 183, it can perform the semantics node discovery directly.

At step 186 of FIG. 6, sibling semantics node 182 sends a semantics node discovery response. The semantics node discovery response may contain information (e.g., address information) for semantics node discovery server 183 or information for a semantics node that is the parent of sibling semantics node 182. Each sibling node in a level of a network may respond with parent semantics node information and semantics node discovery server information, which may be different from the information provided by sibling semantics node 182.

At step 187, new semantics node 181 extracts the received address of semantics node discovery server 183. At step 188, new semantics node 181 sends a semantics node discovery request to semantics node discovery server 183. The request at step 188 may be a query for one or more parent semantics nodes that new semantics node 181 may connect with. At step 189, semantics node discovery server 183 sends a semantics node discovery response to new semantics node 181. The response at step 189 may contain one or more parent semantics nodes. At step 190, new semantics node 181 chooses one parent semantics node to register with. At step 191, semantics node 181 sends a request for registration with its chosen parent semantics node 184. At step 192, parent semantics node 184 sends a response to the request for registration at step 191.

Generally, if new semantics node 181 is provisioned with the address of semantics node discovery server 183, it can perform the semantics node discovery directly. Otherwise new semantics node 181 decides whether it wants to choose from the list of parent semantics node received from one or more siblings and whether it wants to retrieve the default address of semantics node discovery server 183 from siblings. At each level, there may be one or more semantics node discovery servers, which accepts the higher-level semantics node discovery request by default. If new semantics node 181 chooses an upper-level semantics node from the siblings' parents, new semantics node 181 may choose not to perform the semantics node discovery further. New semantics node 181 may have the option to decide the criteria of choosing the parent (e.g., choosing from options, such as nearest in hop count, supporting the same type(s) of semantics related resources, etc.). Based on the criteria, new semantics node 181 sets up the information it wants to discover in addition to the addresses of semantics nodes in the upper level (e.g., distance, supported type(s) of semantics related resources, etc.).

Figure 7:
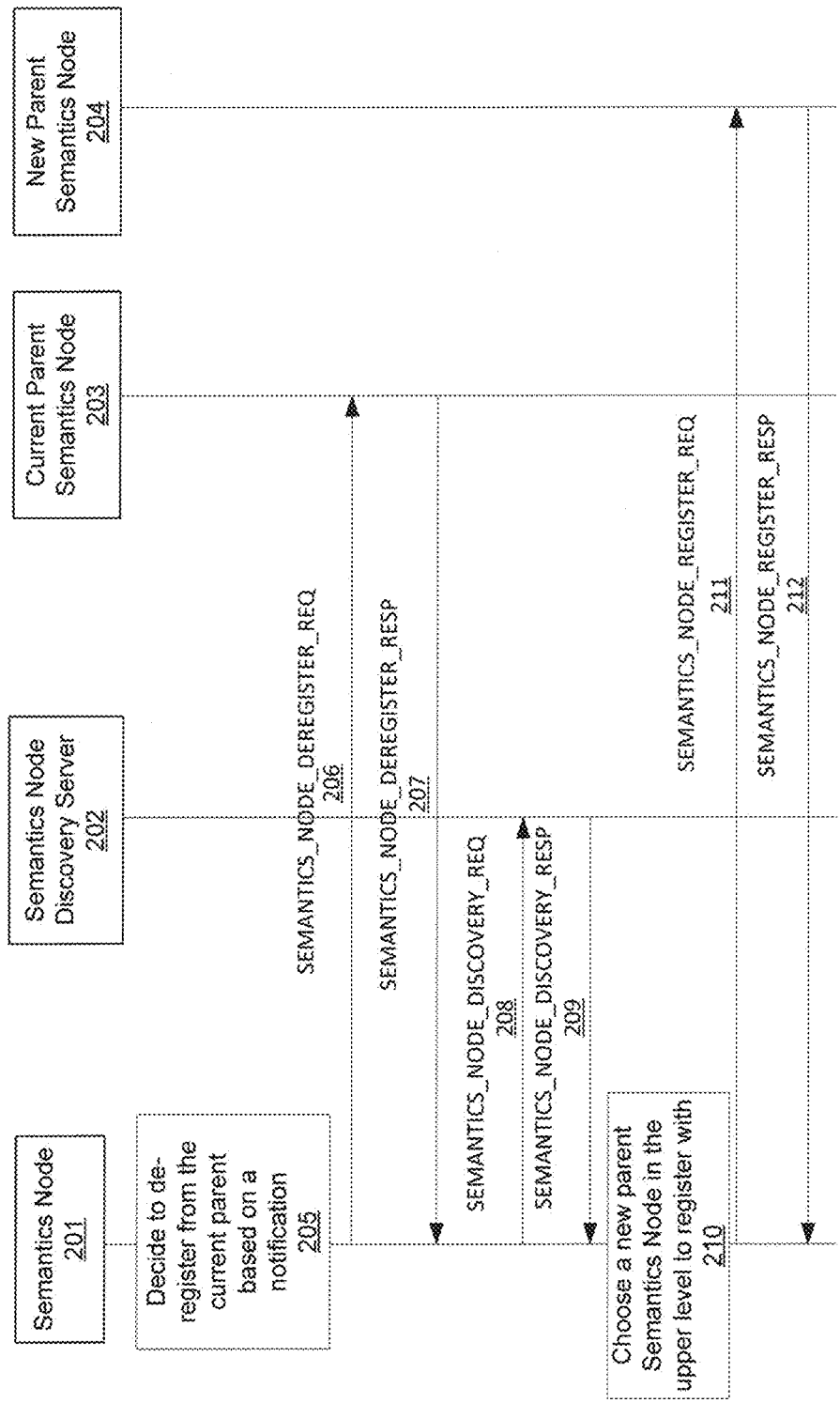
FIG. 7 illustrates a parent-child relationship update initiated by child.

FIG. 7 provides a message flow providing further details of a parent-child relationship update process (e.g., steps 522 and 524 of FIG. 5A), in accordance with one example thereof. The update may be initiated by a child or parent semantics node. At step 205, semantics node 201 decides to de-register from current parent semantics node 203 based on a notification. The notification may be a message from current parent semantics node 203 to initiate de-registration, a determination that current parent semantics node 203 is not reachable (e.g., offline, disconnected, or other communication issue), or a received status update associated with parent semantics node 203 (e.g., network traffic congestion, device or line errors, memory capacity issues, etc.), among other things.

At step 206, semantics node 201 sends a de-register request to current parent semantics node 203, which includes a request to end the parent-child relationship. At step 207, semantics node 201 may receive a response to the de-register request sent in step 206 from current parent semantics node 203 or another device that is able to communicate a perceived status of current parent semantics node 203. Similar to the steps illustrated with regard to FIG. 6, semantics node 201 tries to register with a new parent semantics node. At step 208, semantics node 201 sends a semantics node discovery request to semantics node discovery server 202. At step 209, semantics node discovery server 202 sends a semantics node discovery response to semantics node 201. At step 210, semantics node 201 chooses one upper level semantics node to register with. At step 211, semantics node 201 sends a request for registration with its chosen new parent semantics node 204. At step 212, new parent semantics node 204 sends a response to the request for registration at step 211, which confirms the update of the parent-child relationship.

In an example (not shown, but with reference to elements in FIG. 7), a parent semantics node may trigger the de-registration of a child and provide a new parent semantics node for the child to register with. This new parent information may be included in a de-registration trigger message or alternatively in a separate trigger message. Semantics node 201 can register to new parent semantics node 204 by having current parent semantics node 203 send the registration request to new parent semantics node 204. Current parent semantics node 203 has the option to forward information of semantics node 201 to new parent semantics node 204 for registration purposes. Current parent semantics node 203 or semantics node 201 may terminate the parent-child relationship before switching current parent semantics node 203 to new parent semantics node 204.

Generally, parent-child relationships of semantics nodes are terminated by de-registering to the current parent semantics node when the child semantics node goes offline or when the child semantics node registers to another higher level parent semantics node.

If a neighboring sibling semantics node joins a network, the corresponding sibling information is updated by adding the new semantics node. If a neighboring sibling semantics node leaves a network, the corresponding sibling information is updated by deleting the semantics node or otherwise updating a table to indicate the status of the sibling semantics node that left the network (e.g., status=offline). A semantics node may broadcast or otherwise communicate its status to sibling semantics nodes using, for example, the SEMANTICS_NODE_STATUS_NOTIFY( ) message shown above in Table 1. The status update may affect how a sibling and parent-child relationships are maintained.

B. Semantics Related Resource Discovery, Retrieval, and Validation

Figure 26:
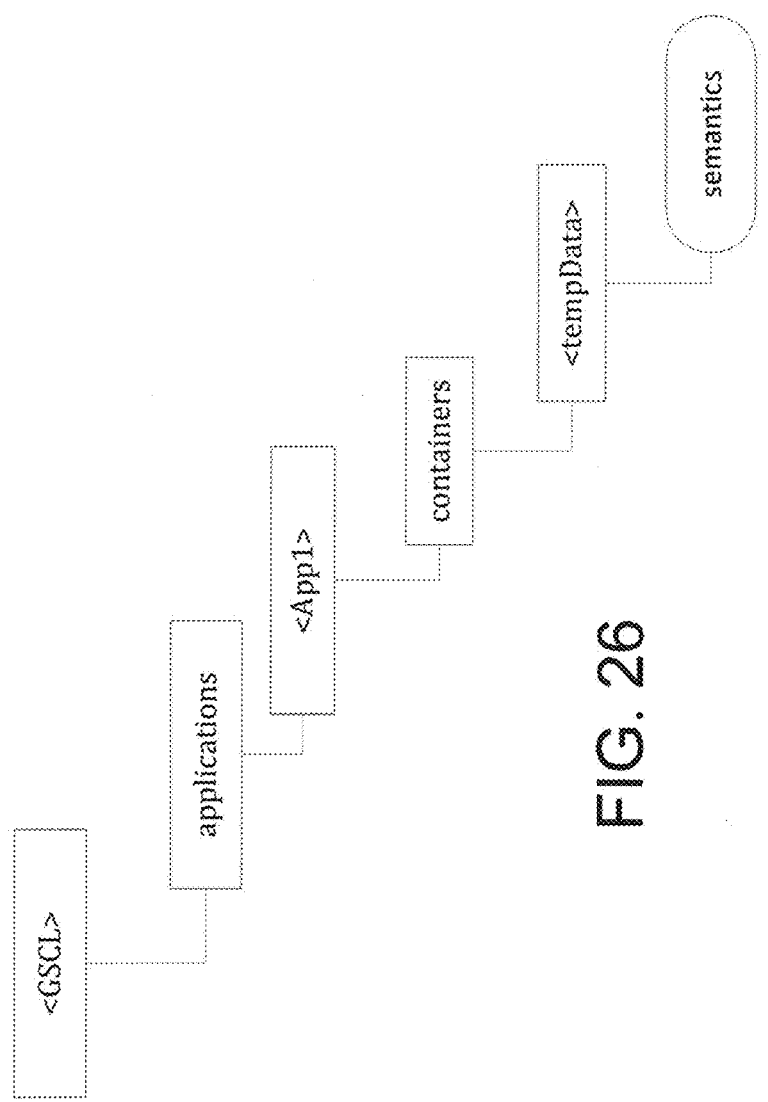
FIG. 26 provides an illustration of one example of the use of semantic nodes as described herein.

An application, a device, a user, a peer semantics node, an external semantics node, or a non-semantics node may send semantics related resource discovery requests to a semantics node through the sIc, sIs, and sIe reference points. The discovery request message may include the type of the semantics related resource (class, relationship, or term) and search string(s). For example, assume a temperature sensing application (App1) in an M2M system that needs to report its temperature reading data—as an integer in units of Celsius—to its M2M gateway. In order to enable the gateway service capability layer (GSCL) to understand the data, App1 needs to associate the data with proper semantics information. In accordance with the procedures described herein, App1 may discover a semantic node that stores a semantic related resource class—the temperatureReading class—that represents temperature data as an integer in units of Celsius. After discovery, App1 will retrieve the representation of the temperatureReading class, and validate that it is the one it wants to use to provide semantics for its temperature data. It will then link the data with the temperatureReading class as one of its attributes (semantics attribute). In the GSCL, the data may be stored under a <tempData> container for App1, which will have a semantics attribute that links to the temperatureReading class using a hasType relationship—as illustrated for example in FIG. 26. As a result, all the App1 data stored under the <tempData> container in the GSCL will have the same semantics—that each item of data is an integer and has the unit of Celsius. As another example, App1 may be an application which retrieves a resource from an NSCL. The resource may have a semantics attribute which links to the temperatureReading class (similar to the above example). In order to understand and interpret the data in a container of the resource, App1 will need to retrieve the semantics-related resource to which the semantics attribute of the resource is linked—in this case the temperatureReading class. After App1 retrieves the representation of the temperatureReading class semantics-related resource, it will be able to interpret the resource data—which it now knows is an integer and has the unit of Celsius.

Figure 8:
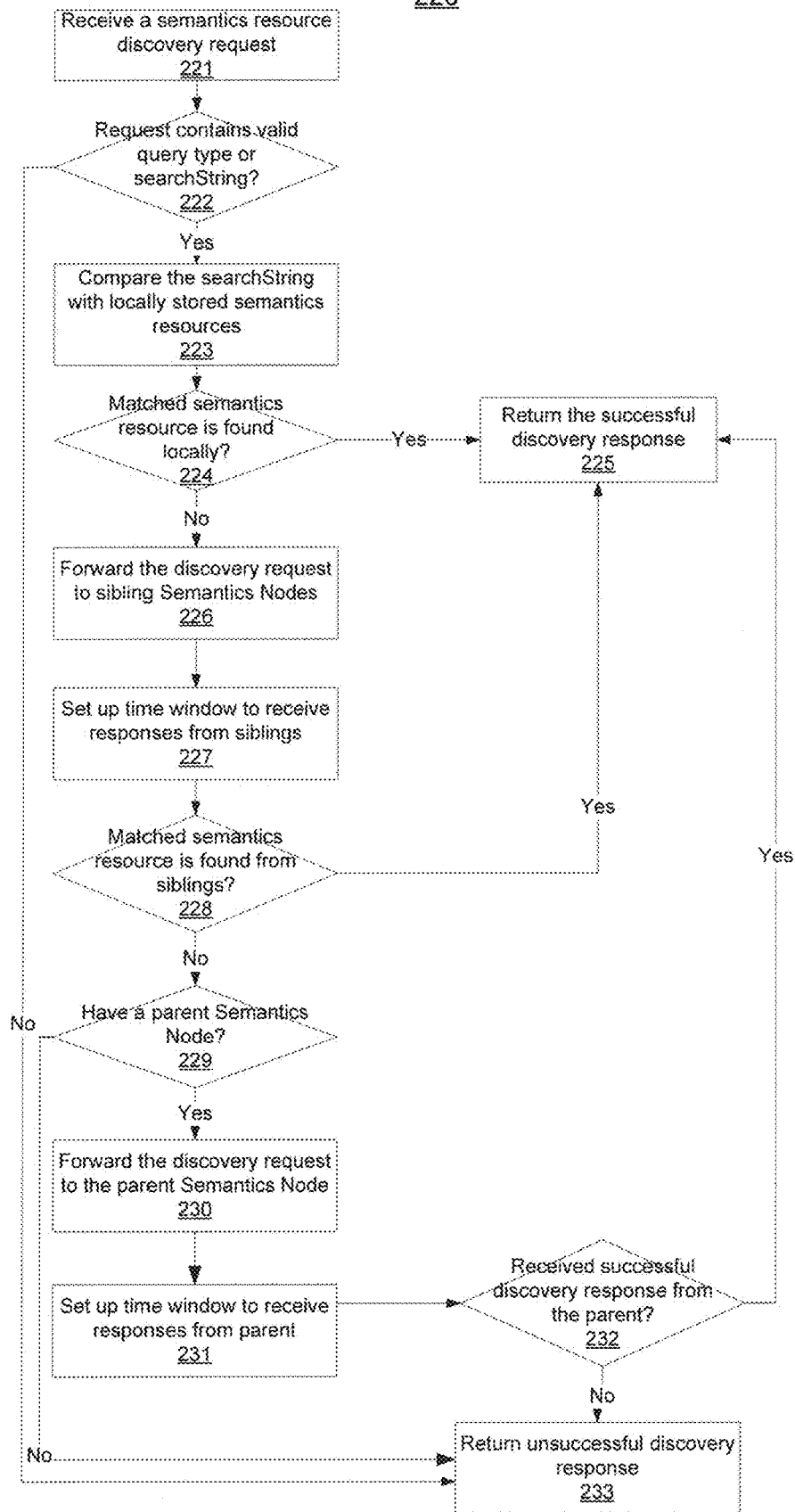
FIG. 8 illustrates a flow diagram of processing semantics resource discovery.

FIG. 8 is flow diagram illustrating the processing of a semantics related resource discovery request at a semantics node, in accordance with one example. At block 221, a semantics node receives a semantics related resource discovery request that includes the type of the requested semantics related resource and potential search string(s). At block 222, the semantics node checks the discovery request. If the request is insufficient or malformed (e.g., missing type of requested resource) the discovery request is considered invalid and an invalid discovery response will be returned to the issuer (e.g., requesting client device) as indicated by block 233. If the request is valid, as indicated by block 223, the search string is compared with locally stored semantics related resources. In particular, based on the type of the requested semantics related resource, the semantics node is able to determine which type (i.e., class, relationship, or term) of semantics related resource on which it will search. As indicated by block 224, using the search string(s) as a key word(s), the semantics node searches its local semantic database to find one or more matching semantics related resources. If there is a matching semantics related resource found locally, the address (e.g., URL/URI) of the semantics related resource is returned to the issuer in a discovery response, as indicated by block 225.

If there is not a matching semantics related resource found locally, the semantics node will try to find a matching semantics related resource from its sibling semantics nodes. As indicated by block 226 and block 227, the semantics node forwards the discovery request to the siblings and sets up a time window it will wait for the response to come back. At block 228, it is determined whether a matching semantics related resource is found from the contacted siblings. If matching semantics related resources are returned from its siblings, the corresponding address (e.g., URI/URL) of the semantics related resource(s) is sent back to the issuer with a successful discovery response (block 225).

If there are no matching semantics related resources returned from siblings of the semantics node, then it is determined whether a parent semantics node can be contacted, as indicated by block 229. If there is no parent semantics node, then a discovery response indicating a negative outcome will be returned to the issuer (block 233). If there is a parent semantics node, the semantics node will try to find a matching semantics related resource from its parent semantics nodes. As indicated by block 230 and block 231, respectively, the semantics node forwards the discovery request to the parent semantics node and sets up a time window it will wait for the response to come back. At block 232, it is determined if a matching semantics related resource is found from the contacted parent. If matching semantics related resources are returned from the contacted parent, the corresponding address (e.g., URI/URL) of the semantics related resources is sent back to the issuer with a successful discovery response (block 225). If there are no matching semantics related resources returned from the parent of the semantics node, then a discovery response indicating a negative outcome will be returned to the issuer (block 233).

After the issuer receives a successful discovery response, which contains the address (e.g. URL/URI) of the matching semantics resource, the issuer can retrieve the representation of the semantics resource.

In one example, the semantics node may support a RESTful architecture style (representational state transfer), which consist of clients and servers. Clients (e.g., Issuers) initiate semantic requests to servers (e.g., semantics nodes). In this example, servers (e.g., semantics nodes) process requests for semantics and return appropriate semantic responses. Requests and responses are built around the transfer of representations of semantics related resources. A client can be an application, a user, a device, a semantics node, etc., which can request RESTful operations on the semantics related resources (e.g., classes, relationships, or terms) to a semantics node.

When handling resources in a RESTful architecture, there are four basic methods that may be applied to the semantic related resources:

CREATE: Create a class, relationship, or term resource.
RETRIEVE: Read the content of a class, relationship, or term resource.
UPDATE: Write the content of a class, relationship, or term resource.
DELETE: Delete a class, relationship, or term resource.

A semantics node acting as a RESTful server may validate a received request. The operation is allowed, if the issuer is authorized with the proper access rights.

Figure 9:
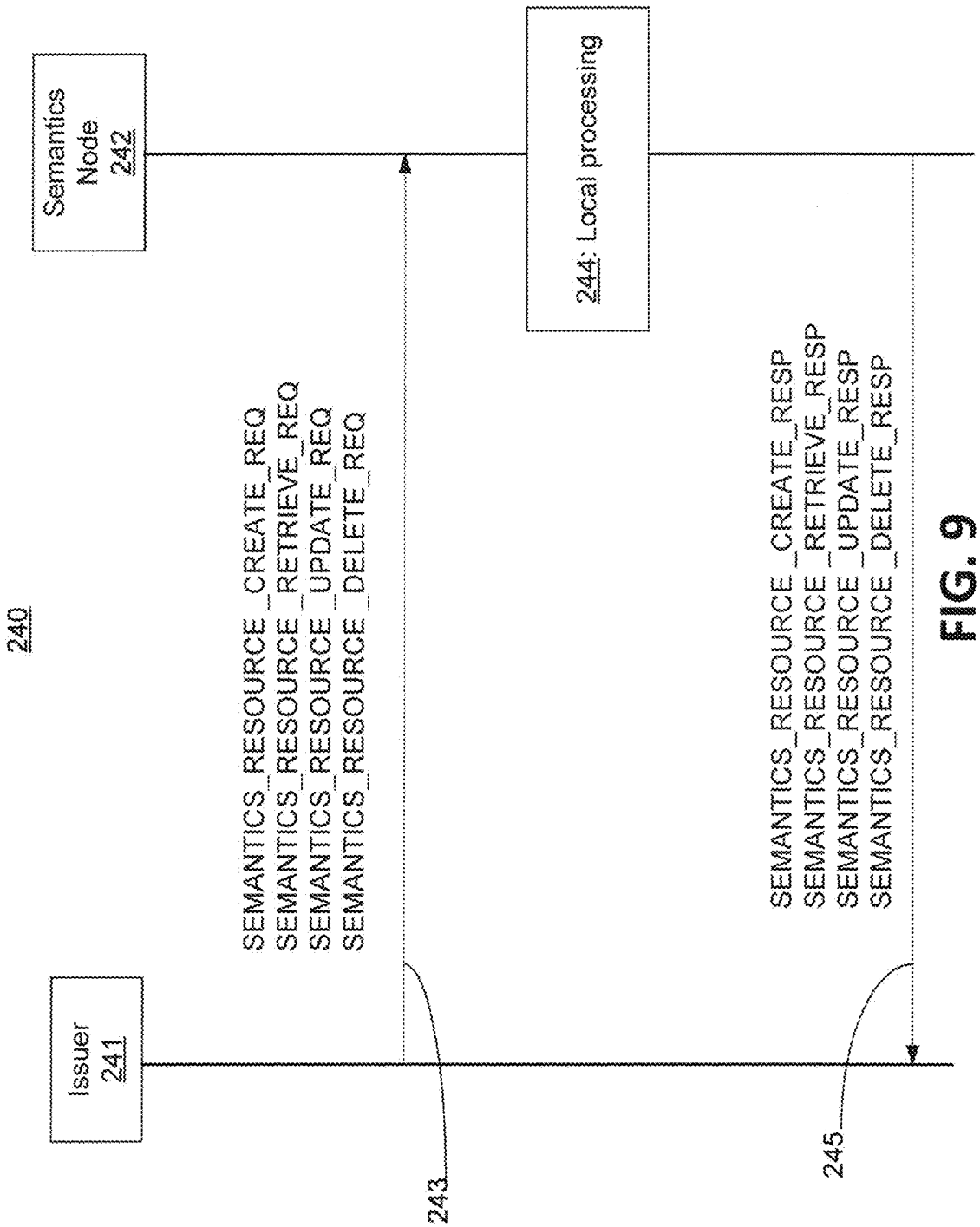
FIG. 9 illustrates a message flow of RESTful semantic node operations.

FIG. 9 is a message flow diagram further illustrating these RESTful semantic node operations in accordance with this RESTful example. At step 243, issuer 241 requests to create, update, retrieve, or delete a semantics related resource (a class, relationship, or term) using the RESTful CREATE, UPDATE, RETRIEVE, or DELETE verbs correspondingly. Issuer 241 may be an application, another semantics node, a device, a user, or the like. To create a semantics related resource at step 243, issuer 241 issues a CREATE request, providing the type and representation of the semantics related resource. To update a semantics related resource at step 243, issuer 241 issues a UPDATE request, providing the unique identity or address and the updated or partially updated representation of the semantics related resource. To retrieve a semantics related resource at step 243, issuer 241 issues a RETRIEVE request, providing the unique identity or address of the semantics related resource and optionally a searchString parameter(s). To delete a semantics related resource at step 243, issuer 241 issues a DELETE request, providing the unique identity or address of the semantics related resource.

At step 244, semantics node 242 acts as a server and validates and otherwise processes the received request. The received request is allowed, if issuer 241 is authorized with the proper access rights. If the create operation is allowed by semantics node 242, the new semantics related resource is created under the proper resource pool based on whether it is a class, relationship, or term. And the semantics related resource is assigned a unique identity or address by semantics node 242. If the update operation is allowed by semantics node 242, the representation of the semantics related resource is updated. If the retrieve operation is allowed by semantics node 242, the representation of the semantics related resource is prepared in the format issuer 241 requests. If the delete operation is allowed by semantics node 242, the requested semantics related resource is deleted.

At step 245, semantics node 242 returns a response to issuer 241. For a create operation, the identity or address of the newly created semantics related resource is returned to the issuer. For an update operation, a response code is returned to issuer 241 whether the operation is successful or not. For a retrieve operation, the representation of the semantics related resource in a format issuer 241 requests are returned to issuer 241. For a delete operation, a response code is returned to issuer 241 to indicate whether the operation is successful or not.

Figure 10:
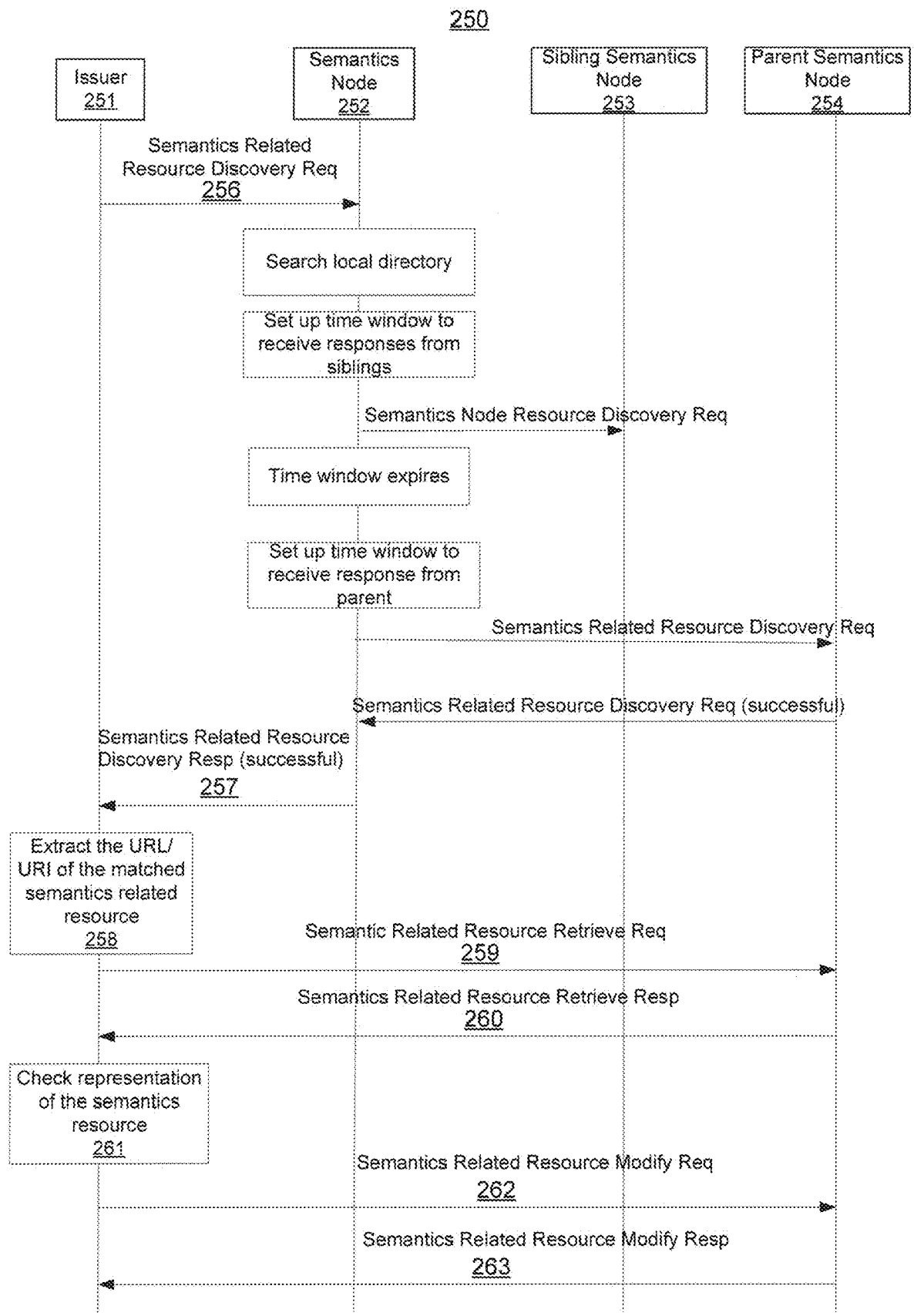
FIG. 10 illustrates a message flow of the semantics related resource discovery, retrieval and validation process.

FIG. 10 is a message flow 250 further illustrating the semantics related resource discovery, retrieval, and validation process described herein. In this example, a network may contain issuer 251, semantics node 252, sibling semantics node 253 which is a sibling of semantics node 252, and parent semantics node 254 which is a parent to semantics node 252. At step 256, issuer 251 sends a semantics related resource discovery request to semantics node 252. As shown in message flow 250, semantics node 252 goes through several steps (similar to the process in FIG. 8) to find a semantics related resource(s) that matches the request at step 256. As illustrated, first the semantics node 252 will search its local directory. If it does not find any matching resources, it will set up a time window and forward the discovery request to its siblings, such as sibling 253. If no responses are received from its siblings, the semantics node 252 may forward its request to parent semantics node 254. In this example, it is assumed that the parent semantics node 254 does find a matching resource, and it will send a response back to the semantics node 252 indicating the address (e.g., URI/URL) of the semantics related resource(s) that it found.

At step 257, semantics node 252 then sends a semantics related resource discovery response back to Issuer 251, which includes the address (e.g., URI/URL) of the semantics related resource(s) from parent semantics node 254 that matched Issuer 251's request. At step 259, issuer 251 sends a semantics related resource retrieve request based on the received URL. At step 260, parent semantics node 254 sends a semantics related resource retrieve response that contains the requested semantics information which may include a class, relationship, or term.

At step 261, issuer 251 checks (validates) the representation of the received semantics information from step 260. There is a possibility that the received semantics related resource sent at step 260 is not exactly what issuer 251 wants. For example, if issuer 251 requested a temperature class and the returned matching resource is a class called temperatureReading with an associated unit of Fahrenheit, but issuer 251 desires a temperature class with unit of Celsius, then issuer 251 can request that parent semantics node 254 modify the semantics. This can be supported by sending a semantics related resource modify request at step 262 to parent semantics node 254 to modify the semantics related resource. At step 263, the address (e.g., URL/URI) of the newly added or modified semantics related resource will be returned to issuer 251.

With reference to modification of semantics related resources, generally, the semantics node may collaborate with its siblings or parent to perform the modification, if the semantics node does not support modification itself. If the semantics node supports modification, then the semantics node may modify the class locally by adding a new class or extending the current one.

C. Subscribing to Semantics Related Resources

In one example, a semantics node can support a client (e.g., an application, another semantics node, a device, a user, or the like) subscribing to it. As one example, a client may subscribe to the semantic node to be notified when any update to a subscribed semantic related resource. When an update occurs, the subscribing client will be notified with the new representation of the resource. In the case of a client that is a semantic node itself, the subscribed semantics related resource might be stored in another semantics node that the subscriber semantics node has no relation with (e.g., not a parent-child or sibling). In this example, a client may issue a SEMANTICS_RESOURCE_SUBSCRIBE_REQ message to a semantics node. The message identifies the semantics related resource for which the client wishes to receives notifications when the resource is updated. The semantics node will respond to the request with a SEMANTICS_RESOURCE_SUBSCRIBE_RESP message acknowledging the subscription. When the semantics related resource to which the client has subscribed is updated, the semantics node will send a SEMANTICS_RESOURCE_SUBSCRIBER_NOTIFY message to notify the client of the update.

Figure 11:
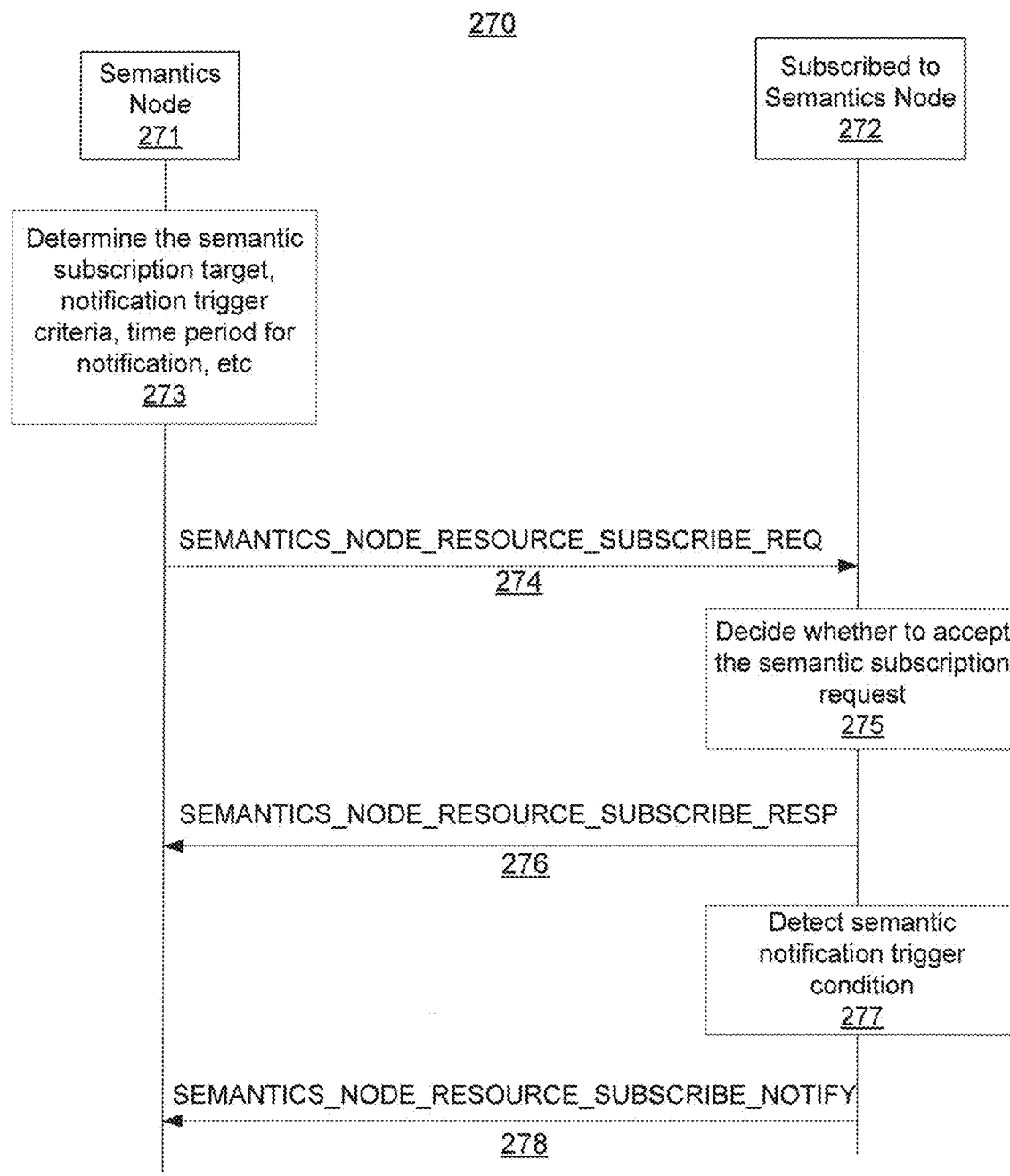
FIG. 11 illustrates a flow diagram of a semantics node that may be updated with the semantics related resources stored and managed by a sibling/parent/child semantics node.

As another example, a semantics node may be interested in being updated with the semantics related resources stored and managed by one of its sibling, parent, or child semantics nodes. FIG. 11 is an exemplary flow 270 of a subscription/notification process for this situation, in accordance with one example. In this example, semantics node 271 is updated with the semantics related resources stored and managed by a subscribed-to semantics node 272. Subscribed-to semantics node 272 may be a sibling, parent, or child of semantics node 271. At step 273, semantics node 271 identifies the subscription target and may set up notification trigger criteria such that it only receives semantics related resource notifications relevant to the trigger criteria. For example, the subscriber may configure the notification trigger criteria to specify a particular semantics related resource or a particular number of updates to a semantics related resource before a new notification is sent. Semantics node 271 may also set up the time period scheduling information for when the notification should be sent.

At step 274, semantics node 271 sends a semantics node resource subscribe request to target semantics node 272. At step 275, the target semantics node 272 determines whether to accept the semantics subscription request of step 274. The target semantics node 272 can decide whether to accept a subscription request, based on the existing subscribers, load of handling the subscription (e.g., load with regard to collecting update information or bandwidth used to send a notification), etc. At step 276, target semantics node 272 sends a semantics node subscription response to semantics node 271. The response at step 276 may include confirmation of the subscription and parameters that will be used in processing the subscription. At step 277, at some point in time after step 276, target semantics node 272 detects a semantic notification trigger condition that matches the requested trigger received at step 274. At step 278, target semantics node 272 sends a semantics node resource subscribe notify message to update semantics node 271 with regard to a particular semantics related resource.

Generally, a semantics related resource subscription can facilitate the semantics related resource discovery from a peer semantics node or parent semantics node. For example, based on the notification messages (which would include the URIs of newly created or updated semantics related resources stored on a semantics node), a semantics node may be able to perform discovery on semantics related resources of other nodes without sending discovery requests.

D. Linking and Association to Semantics Related Resources

The semantics related resources of a semantic node can be used in various ways. For example, semantics related resource representations may be retrieved from a semantics node and may be stored in a co-located manner in a network location where the data is stored (e.g., on a network server, on a device, on a gateway, etc.). Alternatively, the semantics of a resource may be stored on a semantic node and a link to the semantics may be co-located and stored along with the data. This semantic link may be stored in-line (i.e., embedded) within the data or may be stored separately (e.g. in a separate resource or attribute) alongside the data. Thus, through this linking to semantics-related resources, semantics can be applied to normal resources in an M2M system (e.g., <SCL>, <application>, <container> etc.). Typically, this linking will be created by the resource creator/generator, when the resources are created.

Continuing with the earlier example of a patient health monitoring application in FIG. 1, there are semantic classes defined on a semantics node and the URLs of these classes may be discovered by a patient health monitoring application. Table 2 shows examples of semantics related resources of type "class" that are relevant to the patient health monitoring application. Data may be linked to these semantic classes using a semantic relationship called has Type. As a result, for each data resource with a URI of example/healthmonitoring/data1, the semantics of the resource will be known by the following associations:

| | | |
|---|---|---|
| example/health/patient/data1 | has Type | semanticsNode1/class/patient |
| example/health/doctor/data2 | has Type | semanticsNode1/class/doctor |
| example/health/bp/data1 | has Type | semanticsNode1/class/bloodpressure |
| example/health/temp/data1 | has Type | semanticsNode1/class/temperature |
| example/health/hr/data5 | has Type | semanticsNode1/class/heartrate |

The hasType relationship may also be identified by a URL/URI which references a semantic description of the hasType relationship stored on the semantic node.

TABLE 2

Example of Class Semantics Related Resources

| Class | Fields | URL |
|---|---|---|
| Patient | Name: String<br>Sex: F/M<br>Address: String<br>Disease: String | semanticsNode1/class/patient |
| Doctor | Name: String<br>Affiliated hospital: String<br>Specialty: String | semanticsNode1/class/doctor |
| Blood_Pressure | Systolic Pressure: mmHg<br>Diastolic Pressure: mmHg | semanticsNode1/class/bloodpressure |
| Temperature | Unit: Fahrenheit | semanticsNode1/class/temperature |
| Heart_Rate | Unit: bpm | semanticsNode1/class/heartrate |
| . . . | | |

E. Grouping Optimization

If a group of resources have some similar semantics (e.g., all resources in the same application have the same semantics), the similar semantics may be applied to the application, instead of to each individual resource under that application. FIG. 12 illustrates a method 281 of grouping of resources with the same semantics, in accordance with one example thereof. At step 281, some of the existing data of the same application is determined to share the same semantics association. At step 282, the determined data in the same application sharing the same semantics is classified into groups. At step 283, each group of step 282 is associated with the appropriate semantics. At step 284, newly received data from the same application is put into the group that shares the same semantics. The existing data of the same application may be classified into multiple groups, each of which shares the same semantics linking and association. If new data is generated from the same application, the data is put into the group that shares the same semantics.

For example, multiple instances of blood pressure monitoring data have the same semantics. Hence each instance may be associated with the same semantics (semantics-Node1/class/bloodpressure) as shown below:

| | | |
|---|---|---|
| example/health/bp/data1 | has Type | semanticsNode1/class/bloodpressure |
| example/health/bp/data2 | has Type | semanticsNode1/class/bloodpressure |
| example/health/bp/data3 | has Type | semanticsNode1/class/bloodpressure |
| . . . | | |

By supporting this grouping optimization, the following association may also be valid:

| | | |
|---|---|---|
| example/health/bp | hasType | semanticsNode1/class/bloodpressure |

F. Pushing Semantics Related Resources

As mentioned above, the classes, relationships, and terms that are hosted in a semantics node may be discovered and used by others. Based on the frequency of the requests, some of the semantics related resources may be pushed or mirrored in another semantics node for easier discovery and access. For example, after one semantics node detects the same forwarded discovery request from another semantics node a certain number of times (e.g., exceeding a policy defined threshold); it may decide to push a mirrored copy of the semantics related resource to that semantics node.

Figure 13:
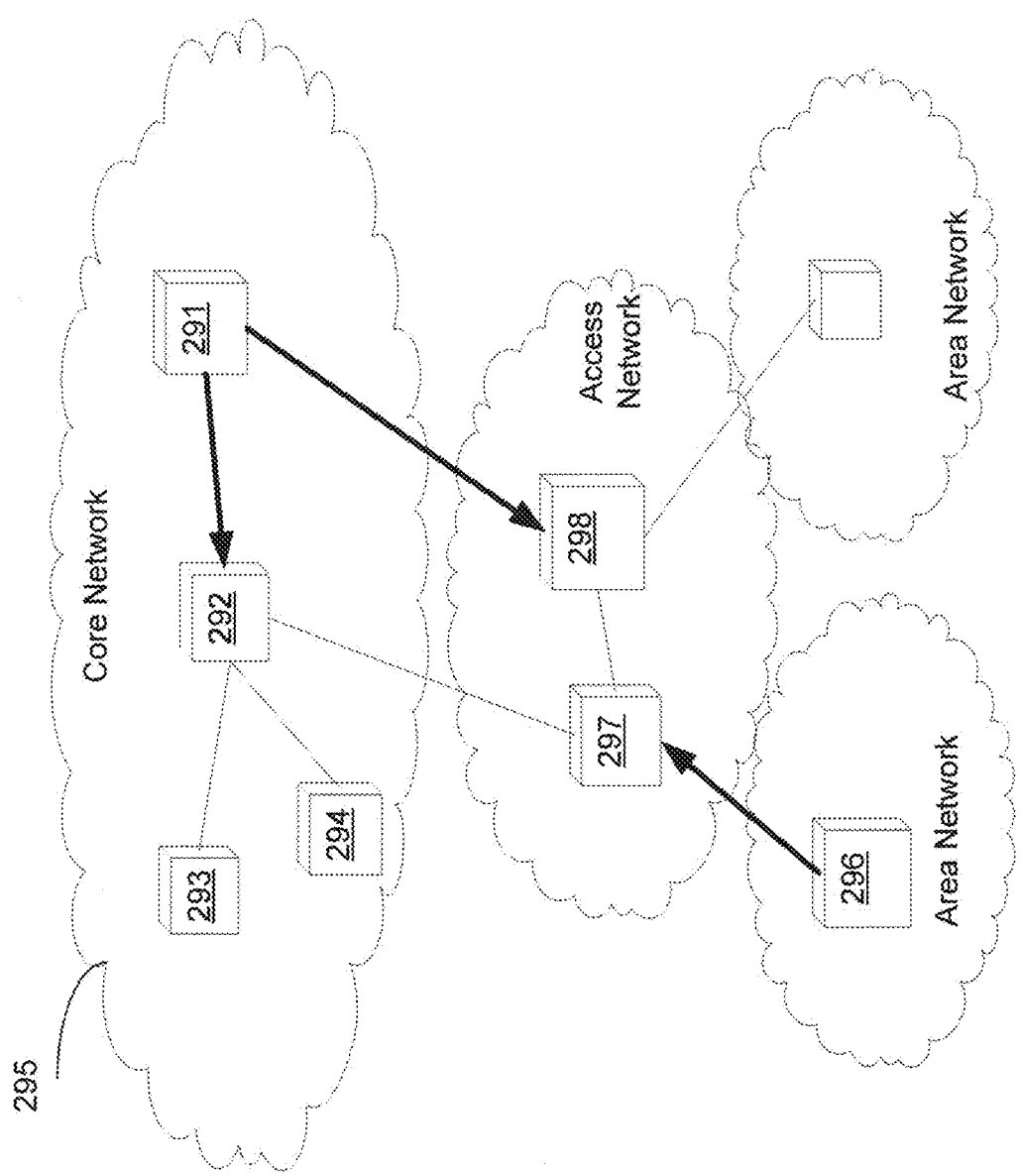
FIG. 13 illustrates a semantics related resource pushing.

The semantics related resource pushing can happen between siblings, or between parent and child semantic nodes, as shown in FIG. 13. For example, semantics node 291 of FIG. 13 in core network 295 may receive many discovery and retrieval requests for the same semantics related resource (e.g., temperature) from semantics node 292, semantics node 293, and semantics node 294. When discovery requests reach a defined threshold, semantics node 291 may decide to create the same semantics related resource (i.e., mirror the resource) on semantics node 292, such that semantics node 293 and semantics node 294 may access the semantics related resource with a faster response time. Semantics node 291 may create the mirrored resource on the semantics node(s) by issuing a SEMANTICS_RESOURCE_CREATE_REQ message to the other semantics nodes, which would then respond with an appropriate SEMANTICS_RESOURCE_CREATE_RESP message.

The following options may be used in order to keep the semantics related resource up-to-date. With reference to FIG. 13, semantics node 291 may automatically update a semantics related resource on semantics node 292, if there is any update to the original representation of the semantics related resource (e.g., a subscription is not needed). Alternatively, semantics node 292 may subscribe to the original semantics related resource. Based on the subscription of semantics node 292 to the semantics related resource, semantics node 292 will be notified of any change to the particular subscribed to semantics related resource. There also may be a combination of the aforementioned scenarios. For example, there may be a situation where the automatic updates of semantics node 291 occur periodically for all semantics related resources on semantics node 291, while semantics node 292 desires a more immediate update for particular subscribed to semantics related resources.

The semantics related resource pushing can happen between siblings, or between a parent and child in either direction. For example, with reference to FIG. 13, semantics node 296 may push some local semantics related resource to its parent semantics node 297. In another example, semantics node 291 may push some higher-level semantics related resource to its child semantics node 298.

G. Data/Semantics Related Resources Movement

Figure 14:
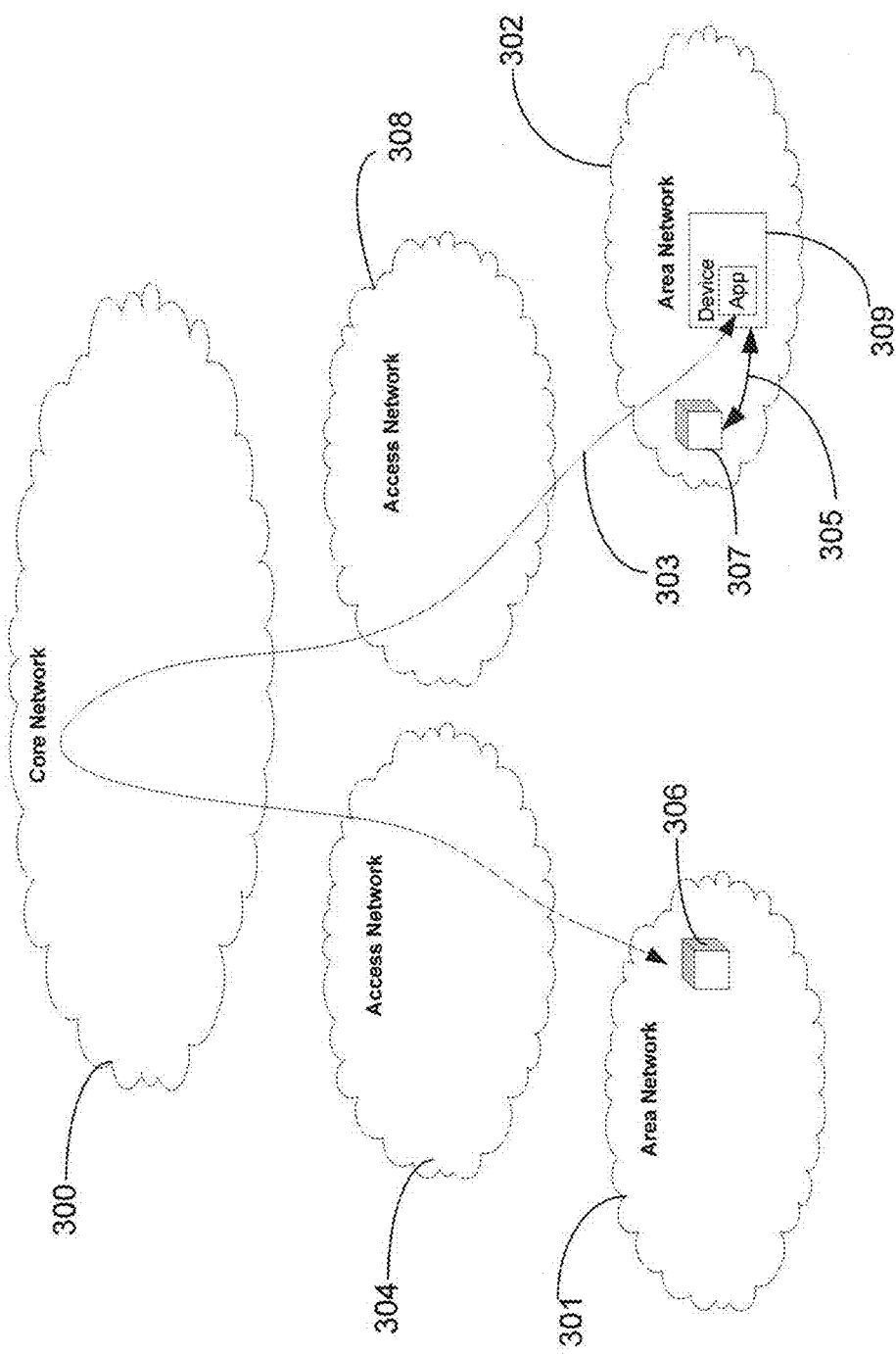
FIG. 14 illustrates a scenario in which a device moves from one area network to another one.

FIG. 14 illustrates a scenario in which a device moves from one network to another. In this scenario, the semantics resources relevant to the device and the data generated by the device may also need to be moved to the new location for security, overhead and/or loading due to the semantics resource retrieval.

Referring to FIG. 14, the device initially may have been located in area network 301, but has now moved to area network 302. Initially, device 309 communicated with semantics node 306. After device 309 arrives at area 302, device 309 may initially continue to communicate to semantics node 306, as demonstrated by line 303. This can result in unnecessary overhead in access network 304, access network 308, and core network 300. To address this and other issues, semantics related resources of semantics node 306 may be moved to semantics node 307 in area network 302. After moving semantics related resources to semantics node 307, device 309 does not need to traverse core network 300 for the semantics related resources but instead can now communicate with semantics node 307 as indicated by line 305.

Figure 15:
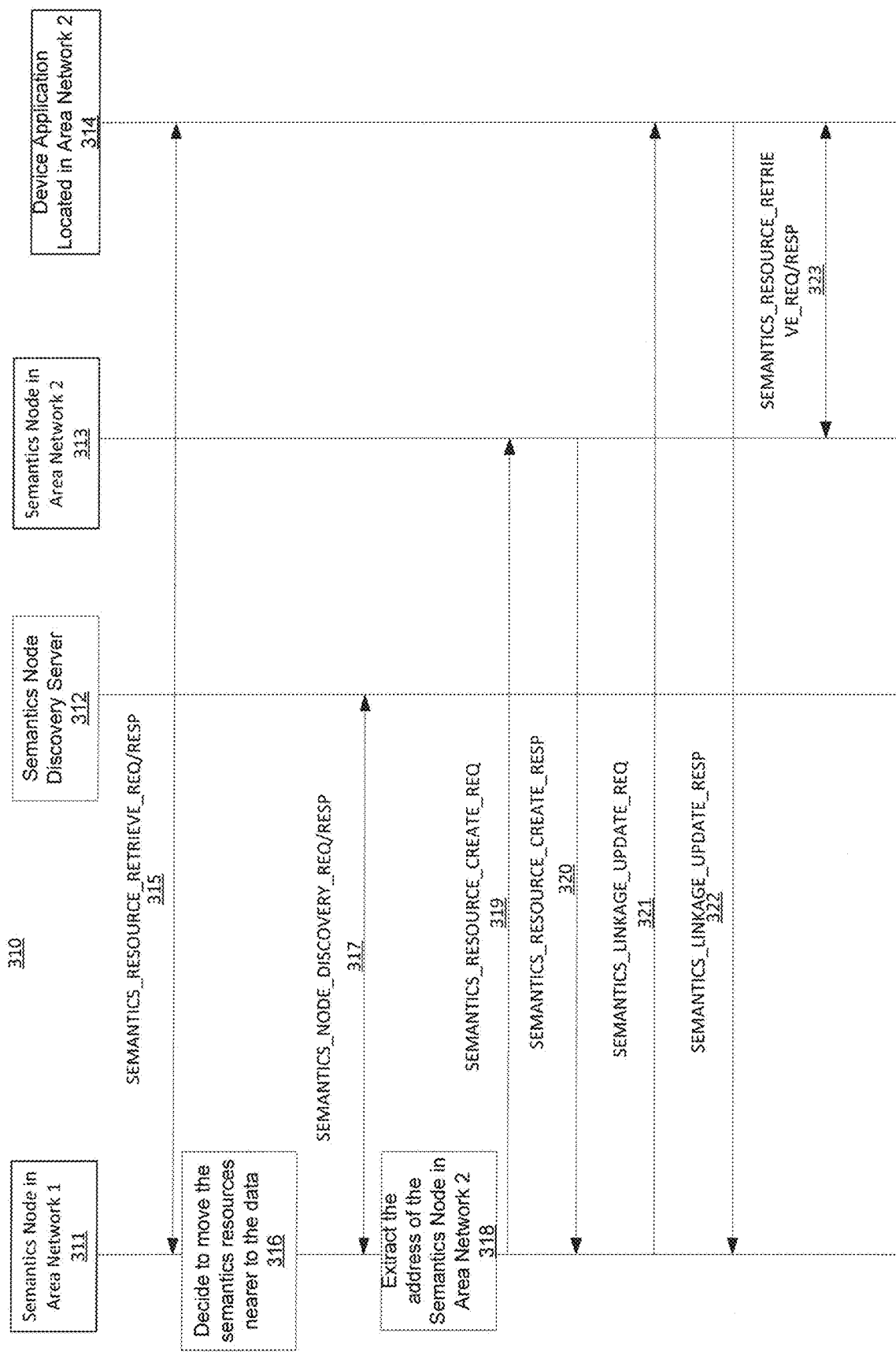
FIG. 15 illustrates a message flow of data/semantics related resources movement.

FIG. 15 is an example of message flow 310 further illustrating the movement of data or semantics related resources as depicted in FIG. 14. At step 315, semantics node 311 in a first area network exchanges messages with device application 314 located in area network 2. The messages exchanged at step 315 may include, for example, a semantics related resource retrieve request and semantics related resource retrieve response. At step 316, semantics node 311 decides to move the semantics related resources associated with device application 214 to semantics node 313 located in a second area network. Semantics node 313 may be communicatively closer (takes less time to reach) than the first area network or logically closer (e.g., less hops). With reference to step 316, other devices may make the decision to move the semantics related resources, such as semantics node discovery server 312, device application 314, or another computing device (not shown).

At step 317, semantics node discovery requests and responses are exchanged between semantics node 311 and semantics node discovery server 312 in order to build the hierarchy of semantics nodes, as well as sibling relationships. At step 318, semantics node 311 determines the address of semantics node 313. At step 320, a semantics related resource create request message is sent to semantics node 313 in order to copy the semantics related resource (and other data) that is used by device application 314. Semantics node 313 responds with a semantics related resource create response message, which may include an acknowledgement that the semantics related resource and other data has been copied successfully. At step 321, a semantics linkage update request message is sent to device application 314. The message at step 321 may include instructions for device application 314 to retrieve semantics related resources from semantics node 313. At step 322, the semantics linkage update response message may include an acknowledgement that the semantics node linkage is updated. At step 323, device application 314 retrieves semantics related resources in types of class, relationship, and term from semantics node 313.

V. ETSI M2M/oneM2M Examples

A. ETSI M2M Architecture with Semantics Node

Figure 16:
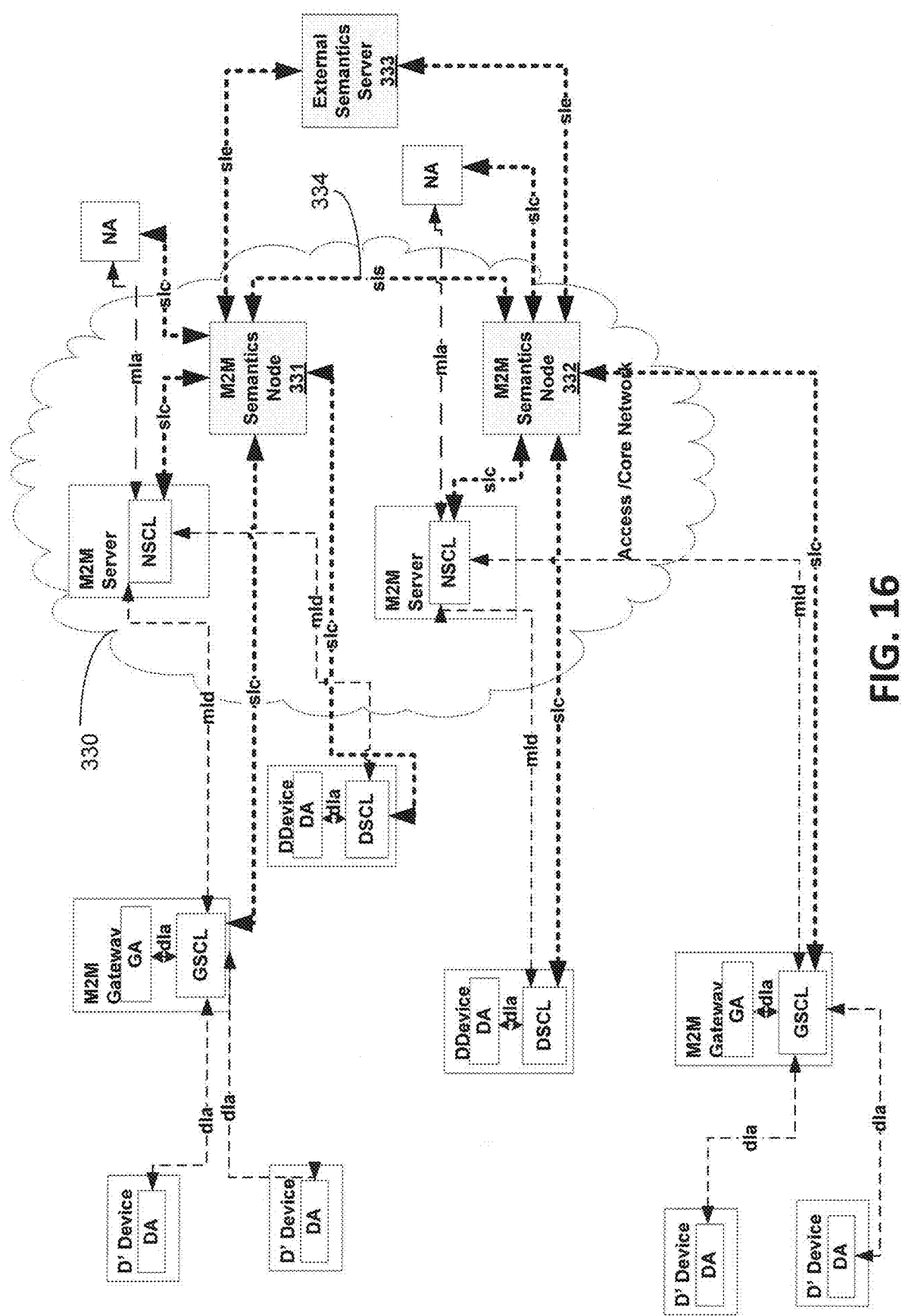
FIG. 16 illustrates a ETSI M2M architecture with standalone semantics nodes.

As mentioned above, the semantic node concept described herein can be used to enhance the ETSI M2M architecture. In one example, one or more semantics nodes may be located in the access/core network as a stand-alone network entity, which may be referred to as a M2M semantics node as shown in FIG. 16. In FIG. 16, M2M semantics node 331 and M2M semantics node 332 are located in the same access/core network 330. M2M semantics s node M2M 331 and M2M semantics node 332 in area/core network 330 may interface with DSCLs, GSCLs, NSCLs, and applications via the sIc reference point described above. In addition, M2M semantics node 331 and M2M semantics node 332 may interface with one another via the sIs reference point 334. M2M semantics node 331 and M2M semantics node 332 may also reference to another type of external semantics node 333 via sIe reference points. In this example, M2M semantics nodes located in the access/core network 330 may also form sibling and/or parent-child relationships.

Figure 17:
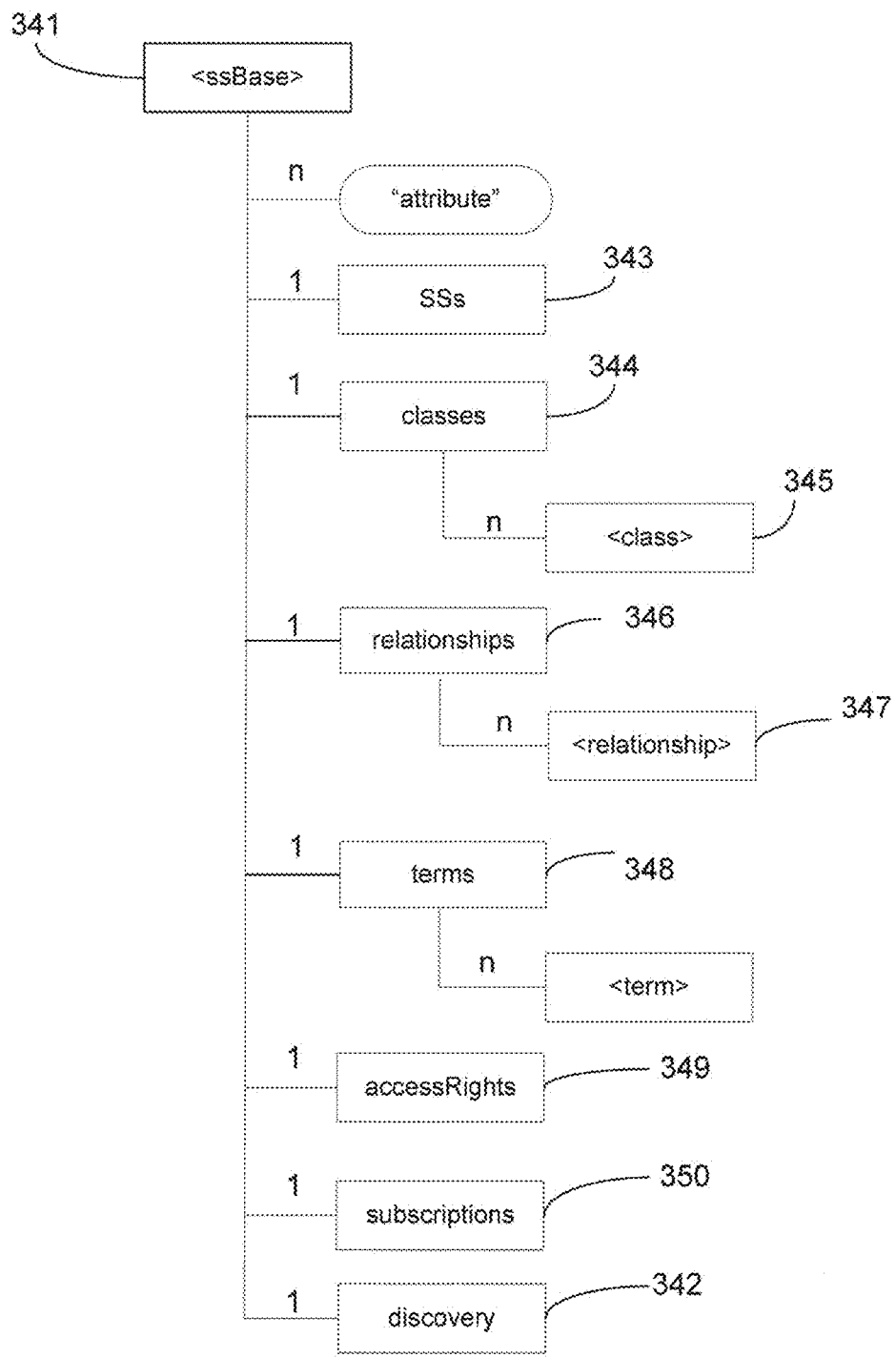
FIG. 17 illustrates a semantics node resource structure.

A semantics node may support a complementary resource structure as used in the service capability layer (xSCL) of the current ETSI M2M Architecture, and this resource structure may be applied to the semantics node described herein, in the manner illustrated in FIG. 17. In this example, the <ssBase> resource 341 is the root of the resource tree residing on the hosting semantics node. The <ssBase> resource 341 may contain attributes that describe the hosting semantics node. The <ssBase> resource 341 contains collection resources representing collections of SS resources 343, classes resources 344, relationships resources 346, terms resources 348, accessRights resources 349, and subscriptions resources 350, among others. Under a classes resource 344 there might be other <class> resources 345, which are the subclasses of the classes resource 344. Under a relationship resource 346 there might be other <relationship> resources 347, which are the sub-relationships of the relationship resource 346. The SSs resource collection 343 contains semantics node resources that are created or deleted when a remote semantics node registers or de-registers with the local semantics node.

Figure 18:
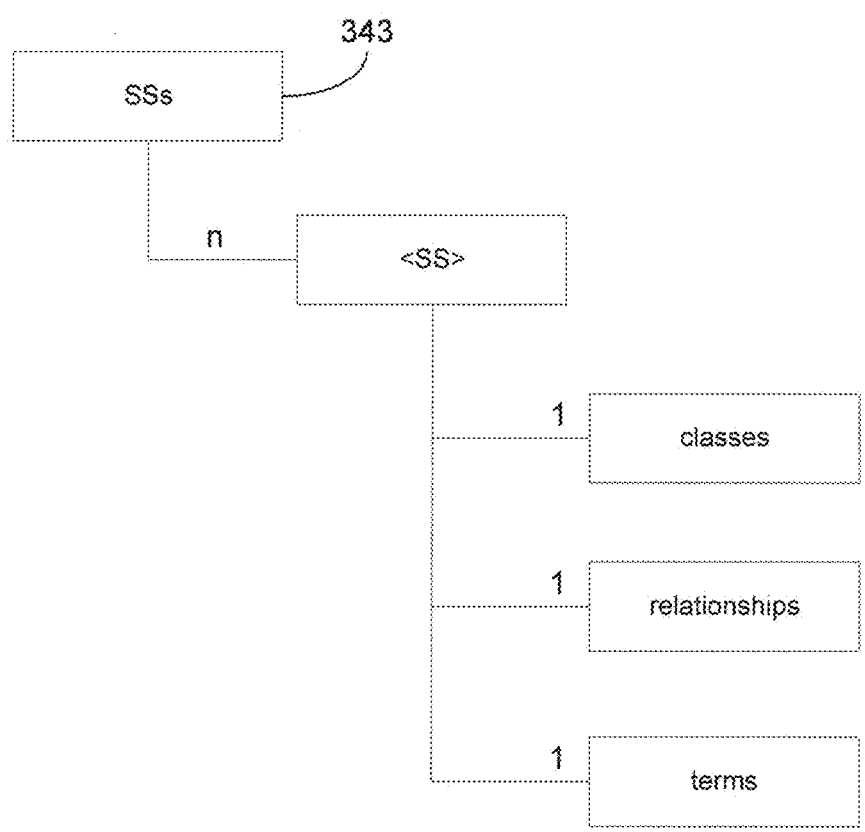
FIG. 18 illustrates a SSs resource structure.

As shown in FIG. 18, each semantics node resource in a collection for SSs resource 343 may have a corresponding resource structure. These resources maintain state for remote semantics nodes registered to the local semantics node. For example, state such as contact address information, discovery information (e.g., announced semantic class, representation, and term resources), and security information (e.g., credentials used to communicate with the corresponding remote semantics node).

With reference again to FIG. 17, the classes 344, relationships 346, and terms 348 collections under <ssBase> resource 341 can each contain respective instances of semantics related resources hosted on the local semantics node. Each instance can contain a semantic representation as well as have other attributes associated with it, such as discovery related information such as tags. These collections of semantics related resources can be accessed by clients having the proper access rights to do so. AccessRights resource 349 under <ssBase> resource 341 can contain instances of accessRight resources. These accessRight resources 349 can define the instances of accessRights that control which clients are granted access to which semantics related resources and operations supported by the semantics node. Alternatively, other instances of accessRights collections can be supported in the resource structure to provide finer grain access controls (not shown in FIG. 17). The collection of subscriptions resources 350 can contain instances of subscription resources. Instances of subscription resources can be created by clients who wish to receive semantic notifications from the semantics node when specified notification trigger criteria events occur. Discovery resource 342 supports client semantic discovery requests. These discovery requests can support search criteria (e.g., semantic related resources having specific types of attributes). The semantics node can respond to discovery requests with a list of resource addresses (e.g., URIs) that match the search criteria (if any). The semantics node can also support forwarding of requests to other semantics nodes (e.g., forwarding of discovery requests to child, sibling, or parent semantics nodes).

B. xSCL with Semantics Capability

Figure 19:
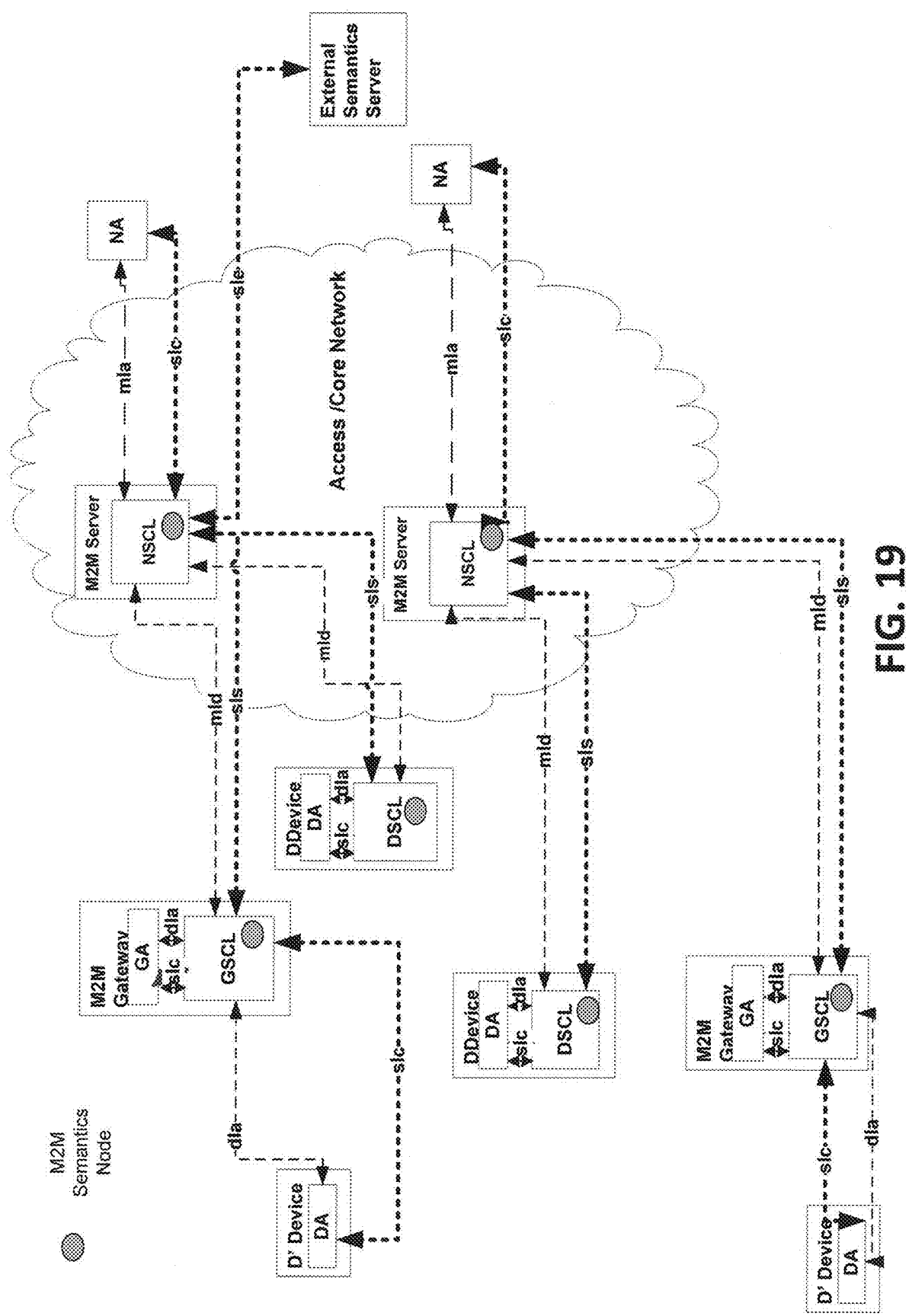
FIG. 19 illustrates a ETSI M2M architecture with integrated semantics nodes.

In another example illustrated in FIG. 19, an M2M semantics node may be deployed as an embedded capability within a DSCL, GSCL, and/or NSCL of the ETSI M2M architecture rather than as a separate standalone semantics node. In this embedded example, the sIs reference point may remain separate or the ETSI M2M mId reference point may be enhanced to support sIs functionality. Likewise, the sIc reference point may remain separate, or the ETSI M2M mIa and dIa reference points may be enhanced to support sIc functionality. In this example, M2M semantics nodes located in the GSCL or DSCL may establish parent-child relationships with the NSCL(s) they are registered with. In addition, the semantics nodes located in GSCLs or DSCLs may also establish sibling relationships with one another.

Figure 20:
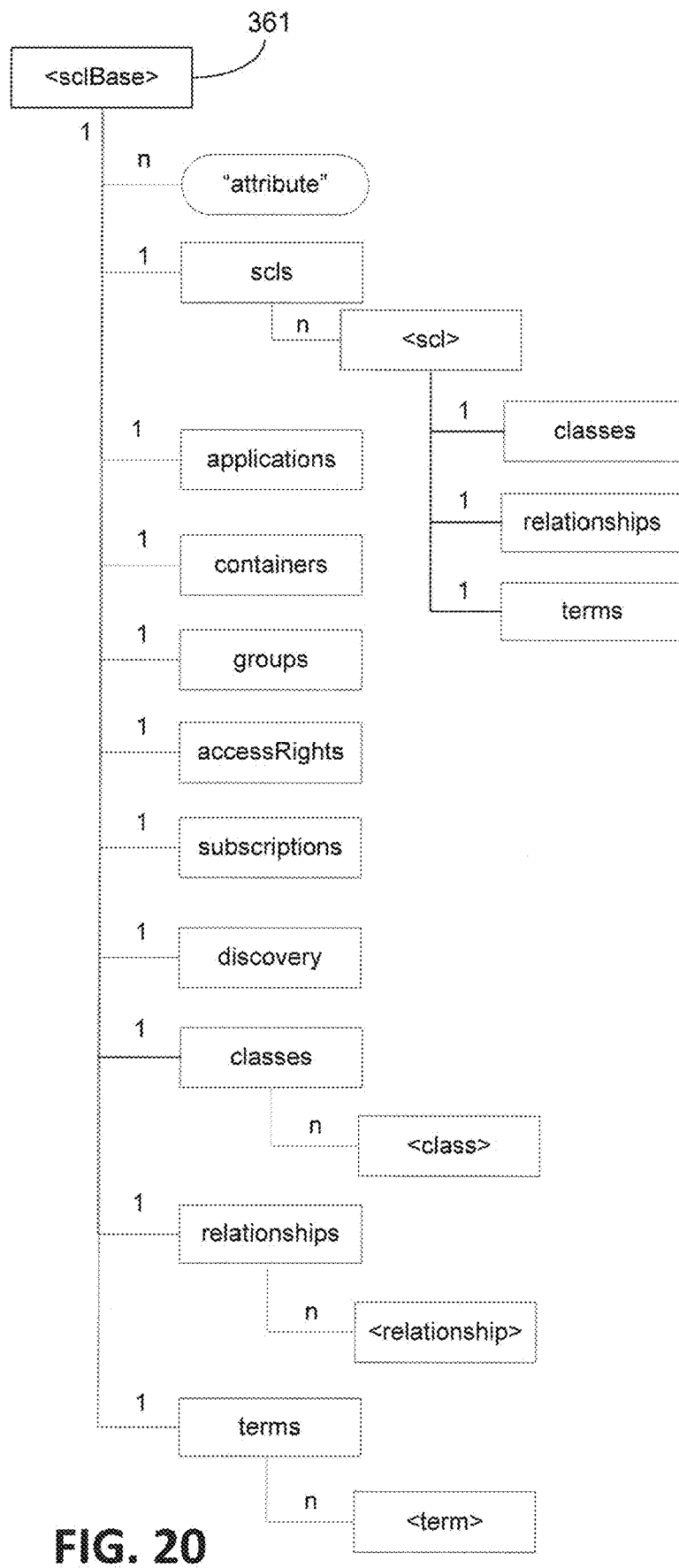
FIG. 20 illustrates a xSCL resource structure.

To support the example of FIG. 19, the xSCL may have the resource structure shown in FIG. 20. The resource collection of the semantics node contains semantics node resources that are created or deleted when a remote SCL having semantics node capability registers or de-registers with the local SCL. Each semantics node resource in this collection may have a corresponding resource structure as shown in FIG. 20. These resources maintain state for remote semantics nodes registered to the local SCL. For example, state such as semantic discovery information (e.g., announced semantic class, representation, and term resources), etc.

The classes, relationships, and terms collections under the <sclBase> resource 361 may each contain respective instances of semantics related resources hosted on the local SCL. <Sscl> is used as the name of the root of the semantics-related resources as discussed herein. Roots are exemplary naming and do not have to be named as discussed herein. Each instance may contain a semantic representation as well as have other attributes associated with it, such as discovery related information such as tags. These collections of semantic related resources may be accessed by clients having the proper access rights to do so.

C. Use Case Example of ETSI M2M Semantics Implementation

The semantics related resources managed by a semantics node may be associated and linked to resources in the ETSI M2M resource structure, such as <sclBase>, <application>, <container>, <contentInstance>, and the like. The following discussion illustrates how semantics related resources may be used to provide semantics information for a <contentInstance>.

Figure 21:
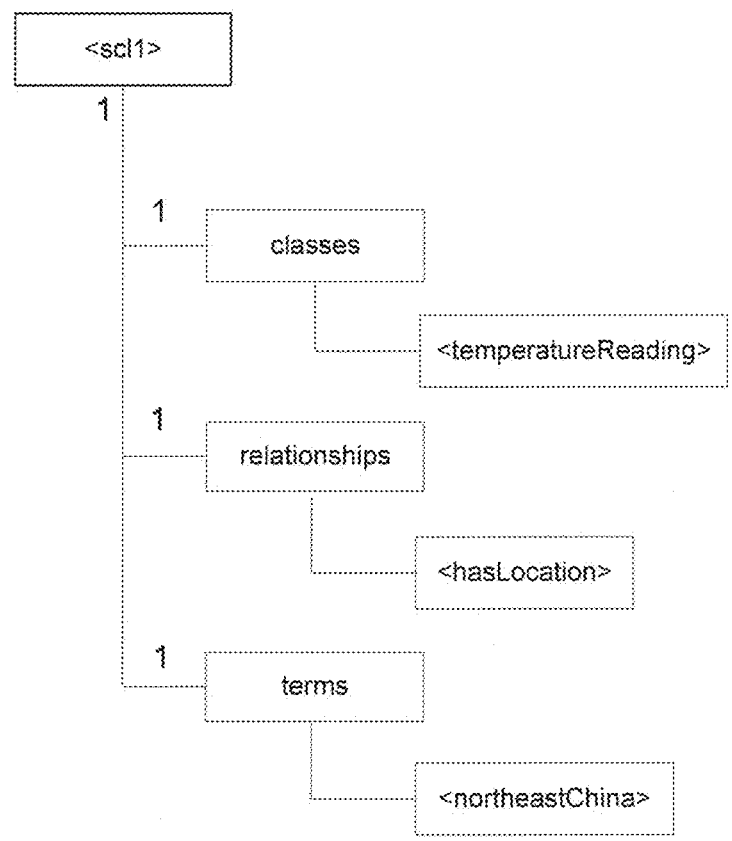
FIG. 21 illustrates a semantics related resource structure on <scl1>.
Figure 22:
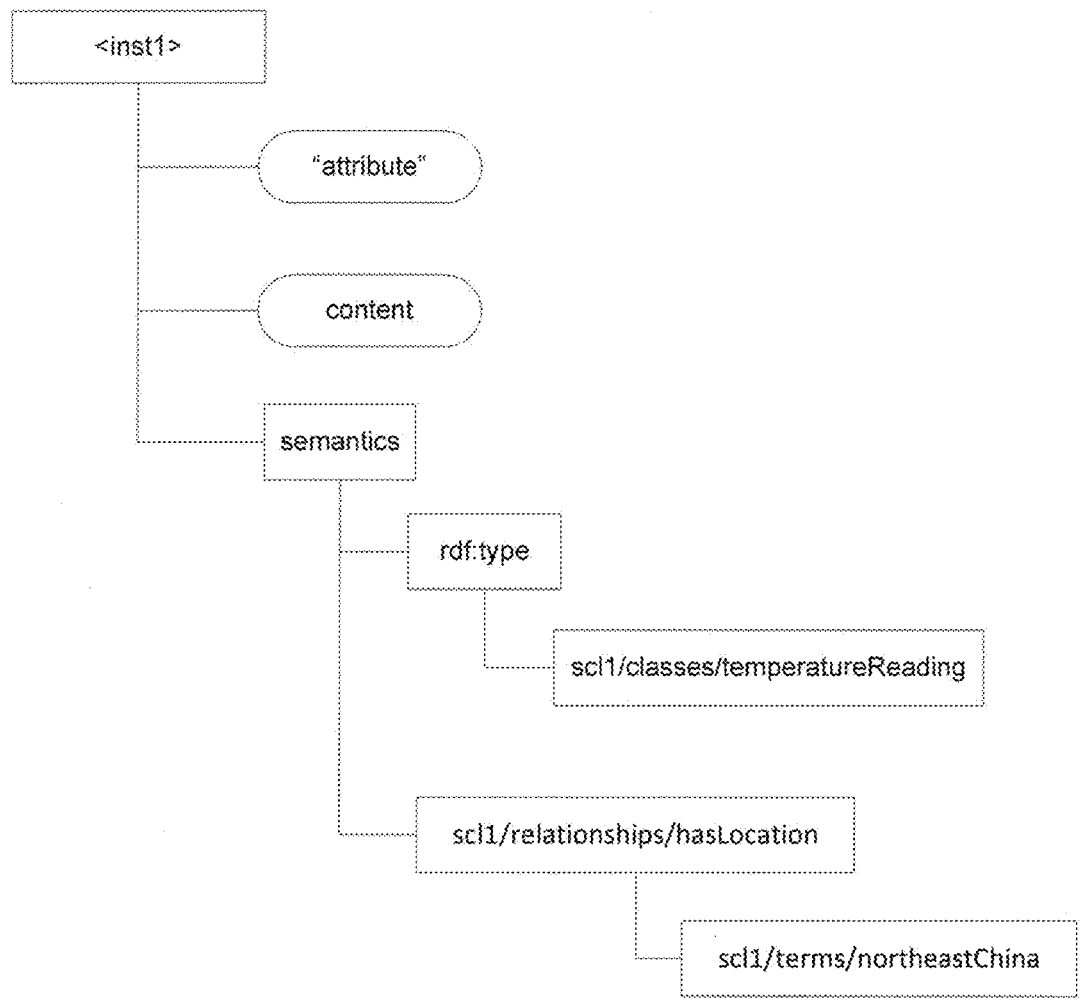
FIG. 22 illustrates a contentInstance semantics.

In this example, assume that a temperatureReading class is defined and stored on scl1, and has URI of scl1/classes/temperatureReading. The relationship hasLocation is defined and stored on scl1 as well, and has URI of scl1/relationships/hasLocation. Additionally, the term 'northeast China' is defined and stored on scl1 too, and has URI of scl1/terms/northeastChina. FIG. 21 shows the semantics related resource structure on <scl1>, which is an example of the xSCL resource structure shown in FIG. 20. This resource structure determines the URIs of the semantics related resources. The contentInstance has a URI of gscl2/application/app1/containers/<temperature>/contentInstances/<inst1>. By enhancing the contentInstance with the semantics as shown in the xSCL resource structure of FIG. 22, the content of the contentInstance is able to be effectively described and interpreted without ambiguity.

Figure 23:
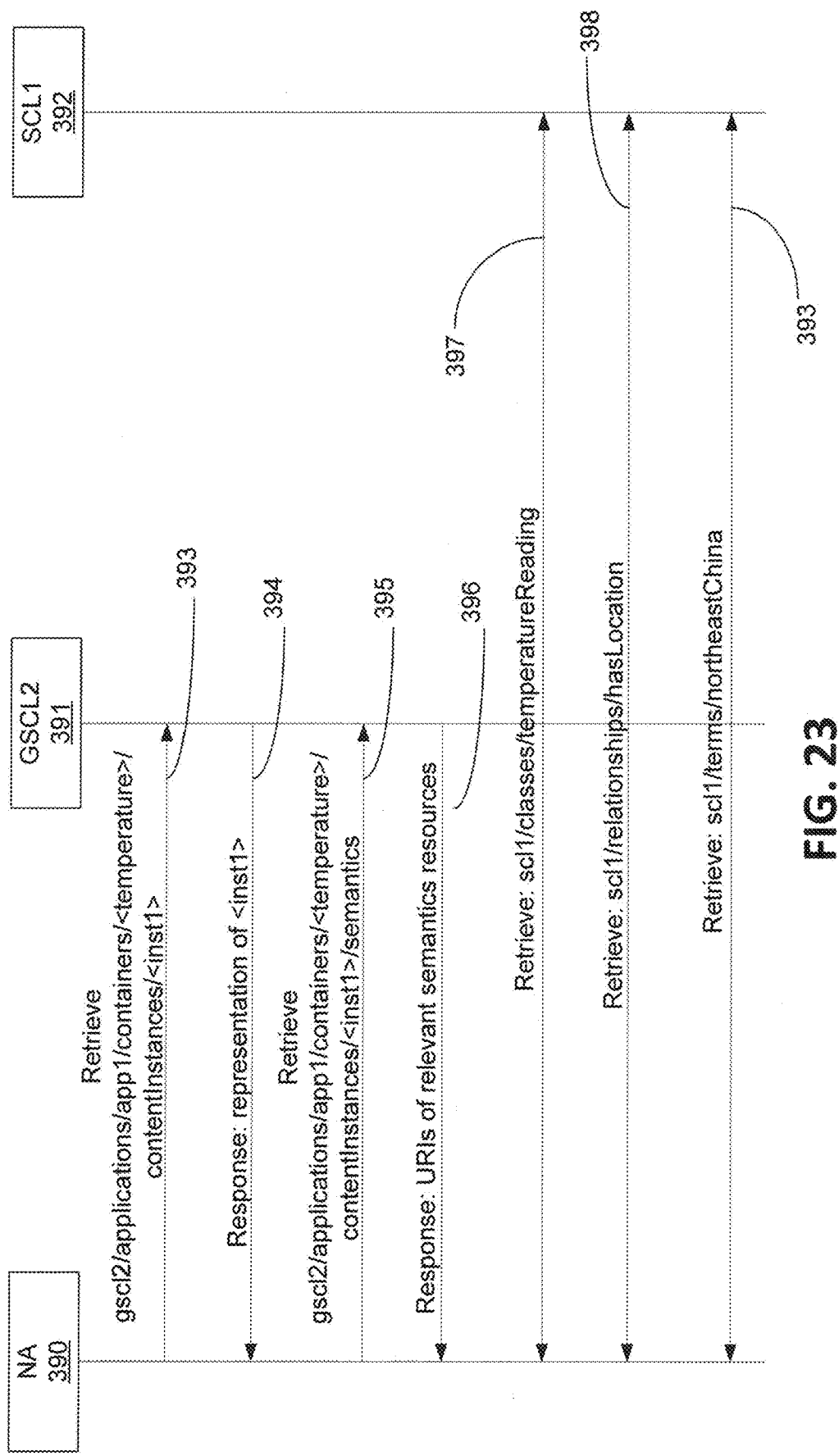
FIG. 23 illustrates a message flow of resource and semantics retrieval.

FIG. 23 is a message flow illustrating one example of resource and semantics retrieval. At step 393, NA 390 sends a RETRIEVE request to GSCL2 391 for a data resource. The data resource, for example, may be a blood pressure sensor reading, core temperature sensor reading, oxygen saturation sensor reading, or motion accelerometer sensor reading, among other things. At step 394, GSCL2 391 returns the representation of the data resource. In order to understand the data resource, the NA needs to retrieve the semantics of the data resource. Accordingly, at step 395, NA 390 sends a retrieve request to the GSCL 391. At step 396, GSCL2 391 returns a list of URIs of the relevant semantics related resources for the data resource, which are stored on SCL1 392. At step 397 through 399, NA 390 exchanges RETRIEVE messages with SCL1 392 for the semantics related resources temperatureReading, hasLocation, and northeastChina, respectively. With these semantics related resources, NA 390 is able to understand the data resources, and therefore can use and manipulate the data resources.

VI. 3GPP MTC Architecture Examples

Figure 24:
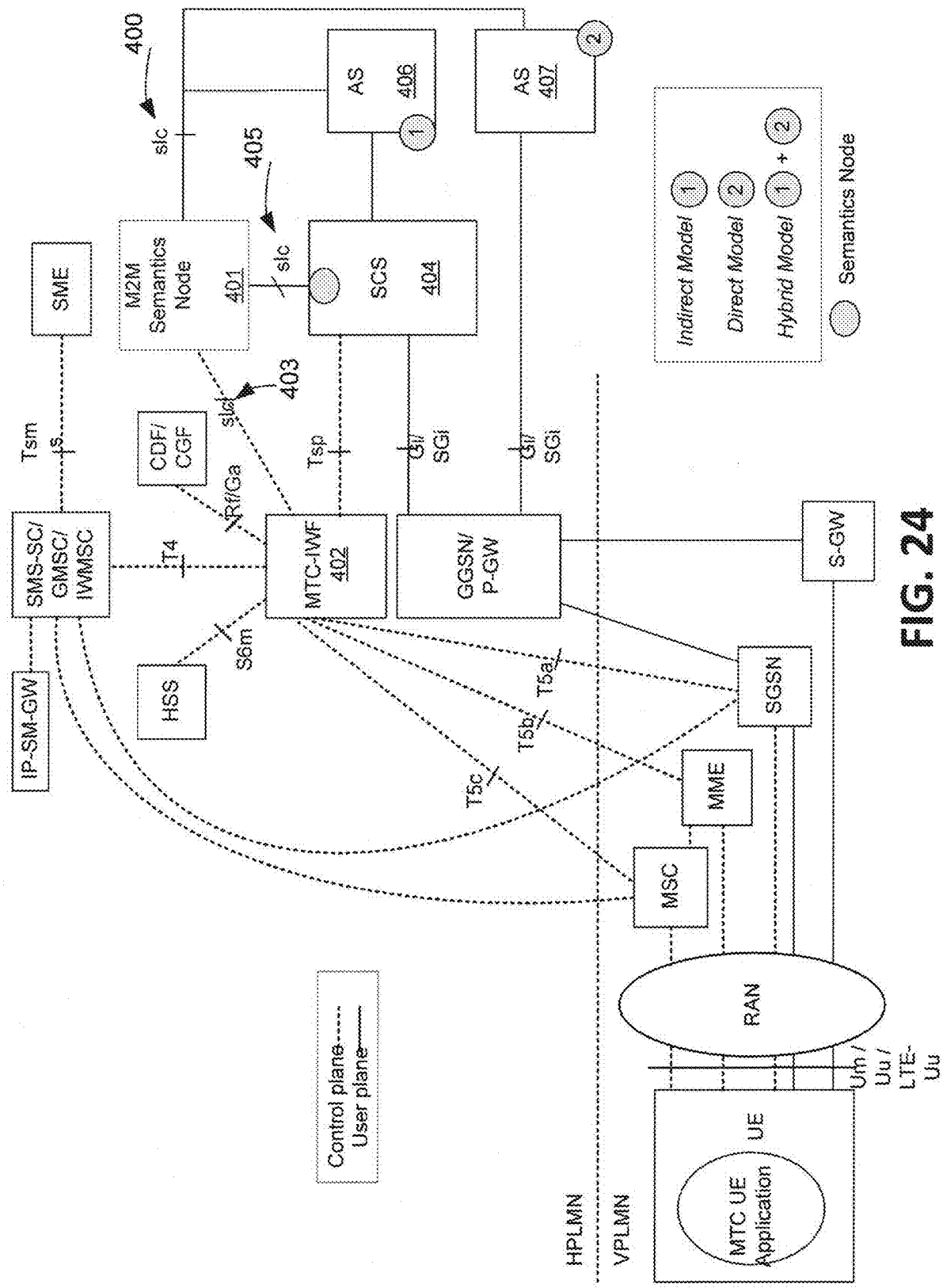
FIG. 24 illustrates a 3GPP MTC architecture with standalone semantics nodes.
Figure 25:
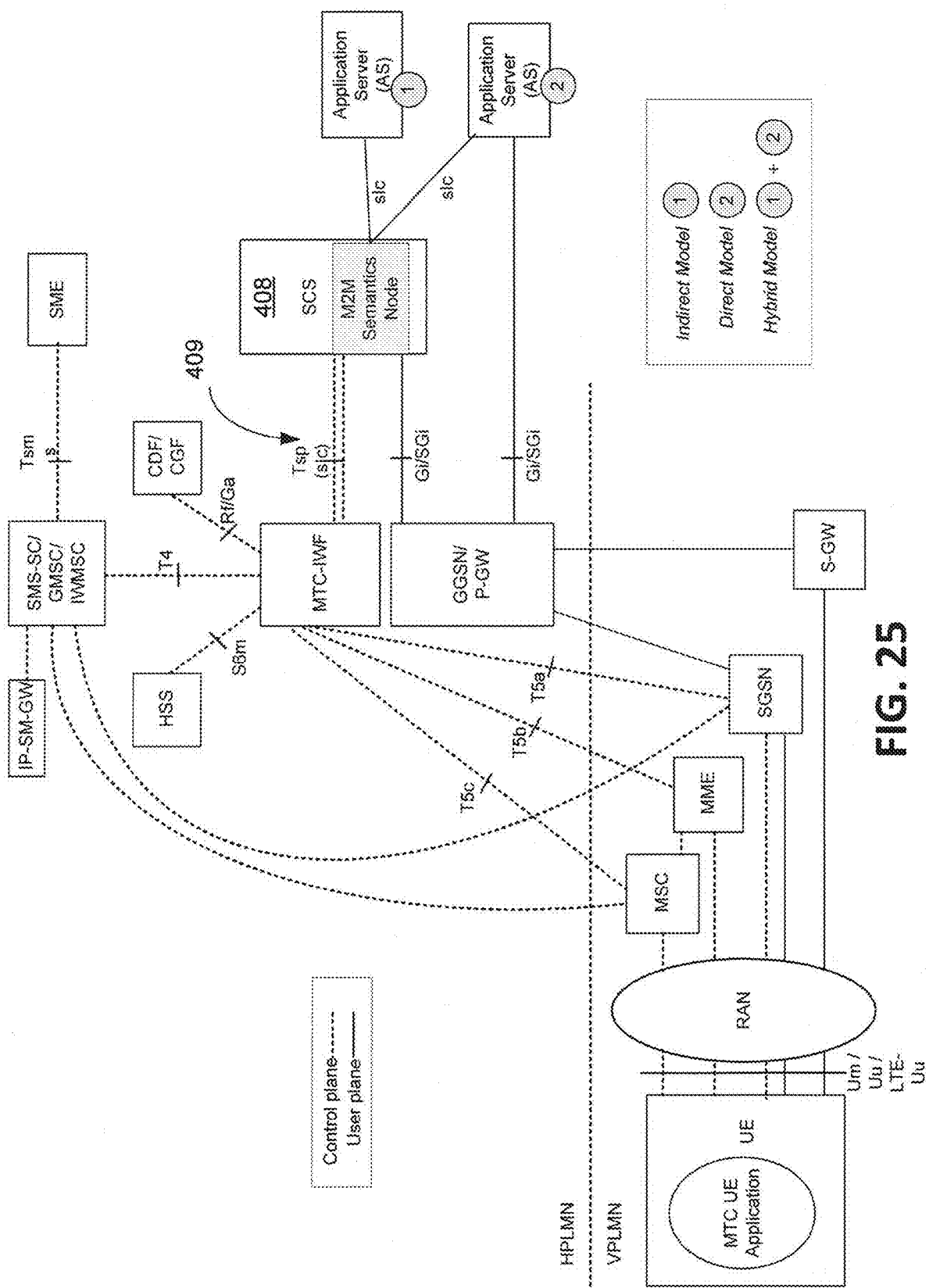
FIG. 25 illustrates a 3GPP MTC architecture with standalone semantics nodes.

As further mentioned above, the 3GPP MTC architecture may also be enhanced with the semantics support provided by the semantics nodes described herein. As shown in FIG. 24, in one example, M2M semantics node 401 may be located outside the 3GPP core network boundary. As further shown, SCS 404 may be enhanced to support a semantics capability and may interface with M2M semantics node 401 via the sIs reference point (not shown). M2M semantics node 401 may also interface with 3GPP machine type communication inter-working function (MTC-IWF) 402 via sIc reference point 403. Application server (AS) 406 and AS 407 may communicate with M2M semantics node 401 via sIc reference point 400. FIG. 25 illustrates another example for a 3GPP MTC architecture with a semantics node. In this example, the semantic node has been integrated into an SCS

408. As further shown in FIG. 25 at 409, in this example the slc referent point may be part of 3GPP MTC Tsp.

Ontology Language

It may be said that the Semantics Web uses a combination of a schema language and an ontology language to provide the capabilities of vocabularies, taxonomies, and ontologies. A vocabulary may be considered a collection of unambiguously defined terms used in communication. A taxonomy may be considered a vocabulary in which terms are organized in a hierarchical manner. Each term may share a parent-child relationship with one or more other elements in the taxonomy. An ontology uses a predefined, reserved vocabulary of terms to define concepts and the relationships between them for a specific area of interest, or more. Ontology can actually refer to either a vocabulary, a taxonomy, or something more. Typically the term refers to a rich, formal logic-based model for describing a knowledge domain. Using ontologies, you can express the semantics behind vocabulary terms, their interactions, and context of use.

RDF schema (RDFS) provides a specific vocabulary for RDF that can be used to define taxonomies of classes and properties and simple domain and range specifications for properties. The Web Ontology Language (OWL) provides an expressive language for defining ontologies that capture the semantics of domain knowledge.

Figure 27:
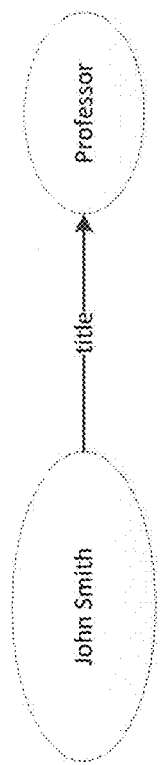
FIG. 27 illustrates a semantic example.

In summary, as discussed before, RDF is a framework for representing information in the Web. RDF is essentially a data-model. Its basic building block is a resource-property-value triple, called a statement. RDF has been given a syntax in XML. In the example shown in FIG. 27, the statement is that John Smith's title is Professor, which can be represented in RDF as shown below. The xmlns:uni is the self-defined domain name, in which the properties (Name and title) are defined as part of the RDFS.

```
<rdf:RDF
xmlns:rdf="http://www.w3.org/1999/02/22-rdf-syntax-ns#"
xmlns:xsd ="http://www.w3.org/2001/XLMSchemae
xmlns:uni="http://www.mydomain.org/uni-ns">
<rdf:Description rdf:about="949352">
<uni:name>John Smith</uni:name>
<uni:title>Professor</uni:title>
</rdf:Description>
</rdf:RDF>
```

RDF is domain-independent, in which no assumptions about a particular domain of use are made. It is up to the users to define their own terminology in a schema language called RDFS. RDFS defines the vocabulary used in RDF data models. In RDFS we can define the vocabulary, specify which properties apply to which kinds of objects and what values they can take, and describe the relationships between objects.

OWL extends the RDFS vocabulary with additional resources that can be used to build more expressive ontologies for the web. OWL introduces additional restrictions regarding the structure and contents of RDF documents in order to make processing more computationally decidable. OWL uses the RDF and RDFS, XML schema datatypes, and OWL namespaces. The OWL vocabulary itself is defined in the namespace http://www.w3.org/2002/07/owl# and is commonly referred to by the prefix owl. OWL 2 extends the original OWL vocabulary and reuses the same namespace.

Datatypes represent ranges of data values that are identified using URIs. OWL allows you to use a number of predefined datatypes, most of which are defined in the XML Schema Definition (XSD) namespace.

OWL allows you to define your own datatypes by creating instances of the class rdfs:Datatype and associating one or more facet restrictions with the instance. A facet restriction is a way of describing a set of values for a specific datatype that makes up the range of valid values. Table 3 includes facets supported by OWL.

TABLE 3

| Facet | Description |
|---|---|
| xsd: length | The exact number of items (or characters) allowed. |
| xsd: minLength | The minimum number of items (or characters) allowed. |
| xsd: maxLength | The maximum number of items (or characters) allowed. |
| xsd: pattern | A regular expression that defines allowed character strings. |
| xsd: minInclusive | Values must be greater than or equal to the specified number. |
| xsd: minExclusive | Values must be strictly greater than the specified number. |
| xsd: maxInclusive | Values must be less than or equal to the specified number. |
| xsd: maxExclusive | Values must be strictly less than the specified number. |
| xsd: totalDigits | The number of digits must be equal to the specified number. |
| xsd: fractionDigits | The minimum number of decimal places allowed. |

Complex types describe the permitted content of an element, including its element and text children and its attributes. A complex type definition consists of a set of attribute uses and a content model. A complex type can be derived from another complex type by restriction (disallowing some elements, attributes, or values that the base type permits) or by extension (allowing additional attributes and elements to appear). Simple types (also called data types) constrain the textual values that may appear in an element or attribute.

W3C XML Schema Definition Language (XSD) provides a set of 19 primitive data types (anyURI, base64Binary, boolean, date, dateTime, decimal, double, duration, float, hexBinary, gDay, gMonth, gMonthDay, gYear, gYearMonth, NOTATION, QName, string, and time). It allows new data types to be constructed from these primitives by three mechanisms:

restriction (reducing the set of permitted values), list (allowing a sequence of values), and union (allowing a choice of values from several types).

The followings are two examples of defining datatypes in XSD:

Example 1

```
<simpleType name="Temperature">
  <restriction base="integer">
  </restriction>
</simpleType>
```

Example 2

```
<complexType name="BloodPressure">
    <sequence>
        <element name="s" type="integer"/>
        <element name="d" type="integer"/>
    </sequence>
</complexType>
```

Discussed in further detail are the structure and attributes for the semantics-related resources. In addition, the mechanisms and procedures are specified with regard to how to use those resources to enable the semantics to the normal resources in the M2M systems.

The content of resources in M2M systems is usually of complex data type other than the existing primitive ones as defined in XSD standard. Hence it is natural to define the semantics of complex data types, such that the resources of the same type may follow the same semantics and can be interpreted, without defining the semantics of each individual resource (e.g., semantics grouping optimization). Although OWL allows for defining of your own datatypes by creating instances of the class rdfs: Datatype and associating one or more facet restrictions with the instance, it does not provide means in defining new complex data type. In other words, the newly defined datatypes may be limited to being extended from the primitive types. Although XSD allows new data types to be constructed from the 19 primitives by restriction, list and union, it is not able to provide sufficient restrictions to understand the content of resources. Thus the semantics provided by XSD to the fields in the complex data type is very limited. The following shows two examples, one is a simple datatype and another is a complex datatype defined by XSD.

As discussed herein with regard to XSD, Example 1 is a simple Temperature datatype, using one of the standard restrictions to define that the values of such datatype are all integers. However, the existing restriction facets cannot restrict the unit of the values, such that it is still ambiguous whether the temperature readings are in Celsius, Fahrenheit, or something else.

Example 2 is a complex BloodPressure datatype, using the list mechanism to define that it has two fields 's' and 'd' in sequence, each of which has values in integer. However, the existing restriction facets cannot restrict the unit of each field. And from the name of the elements in the sequence, it cannot be known what are the two fields contained in the complex data. Thus, it may not be possible for different applications to understand and interpret the content in the content instances.

In summary, the aforementioned issues may be addressed herein by structures and representations of the semantics-related resources and methods to enable semantics to resources by linking and associating the resources with the semantics-related resources. In addition, the issues may be addressed via mechanisms to enable extension of XSD with restrictions/facets unit and description, such that the fields in the complex data type can be extracted and interpreted. Lastly, the issues may be addressed by embedding description/attributes in the name of the datatypes and the fields in the complex datatypes, such as keywords of the datatype to make it discoverable and interpretable and unit of each field in the datatype such that the value to each can be properly quantified.

Resource structure will be discussed in more detail hereafter. In an example, the semantics node may support a complementary resource structure as used in xSCL of the current ETSI M2M Architecture. An example of a resource structure for the semantics node is shown in FIG. 17. Resource <Sscl> is the root of the resource tree residing on the hosting semantics node. <Sscl> is used as the name of the root of the semantics-related resources as discussed herein. Roots are exemplary naming and does not have to be named as discussed herein. The <Sscl> resource may contain attributes that describe the hosting semantics node. The <Sscl> resource contains collection resources representing collections of <SS> resources (notified semantics-related resources from other Semantics Node), <class> resources, <relationship> resources, <term> resources, <accessRight> resources, and <subscription> resources.

Within M2M systems there can exist multiple types of resources. There may be semantics-related resources that may include some of the following: classes, <class>, relationships, <relationship>, terms and <term>. Semantics-related resources refer to resources stored on the Semantics Node. Otherwise, resource may be used to refer to normal resources. Normal resources may include some of the following, such as CSEBase, application entity (AE), container, and contentInstance defined in oneM2M architecture. And similar resources may be adopted in ETSI M2M architecture as well.

Figure 28:
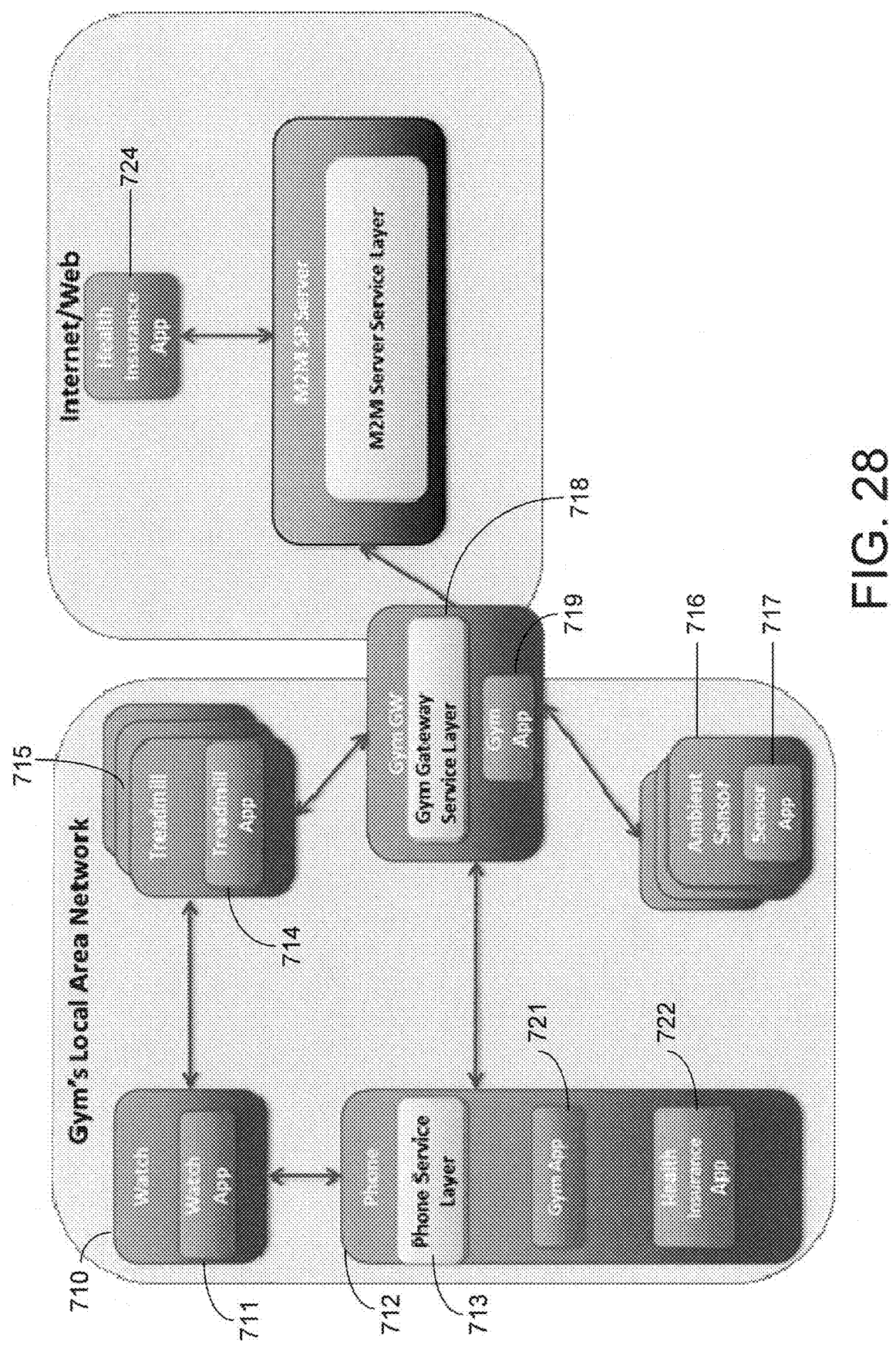
FIG. 28 illustrates the entity configuration involved in a Gym use case.

In the following, we describe a gym use case as shown in FIG. 28 that may illustrate the mechanisms and procedures proposed in this disclosure. The use of terms, e.g. application, service layer (SL), may be mapped respectively to AE, CSE in oneM2M or DA/GA/NA, DSCL/GSCL/NSCL in ETSI M2M. FIG. 28 illustrates the entity configuration involved in the use case with the same terminology.

In the gym use case, a user has watch 710, which has watch application 711. Watch 710 discovers user's phone SL 713, and registers with it. Treadmill applications 714 may be on one or more treadmills 715 in the gym. Ambient sensors 716 may be on treadmill 715 and throughout the gym. Ambient sensors 716 may discover gym SL 718 and register with it. And when the user is at the gym, phone SL 713 may discover gym SL 718 and register with it. Gym application 721 on phone 712 may be able to discover treadmills 715 and select one of treadmills 715 to use via gymSL 718. Gym application 721 on phone 712 may discover treadmills 715 and select one of treadmills 715 to use by knowing the semantics of treadmill application 714.

Health insurance application 722 on phone 712 collects data from ambient sensors 716 (e.g., temperature or humidity in the gym), the measurement from watch 710 (e.g., heart rate, blood pressure of the user), or the gym training program finished by the user from treadmill 714. Health insurance application 722 may calculate the health score of the user based on the collected data and share the health score to health insurance company application 724. Health insurance application 722 on phone 712 may also send the user's finished gym training program to health insurance company application 724, which can determine and adjust the user's insurance premium based on the data (e.g., health score, workout results). Health insurance applications 722 and health insurance company application 724 may have the same interpretation of the data by using the appropriately added and enabled semantics of the data.

Discussed herein is service layer (SL) support of semantics functions to enable semantics to normal resources. Detailed structures of the semantics-related resources are disclosed and how the semantics-related resources enable semantics to normal resources.

Figure 29:
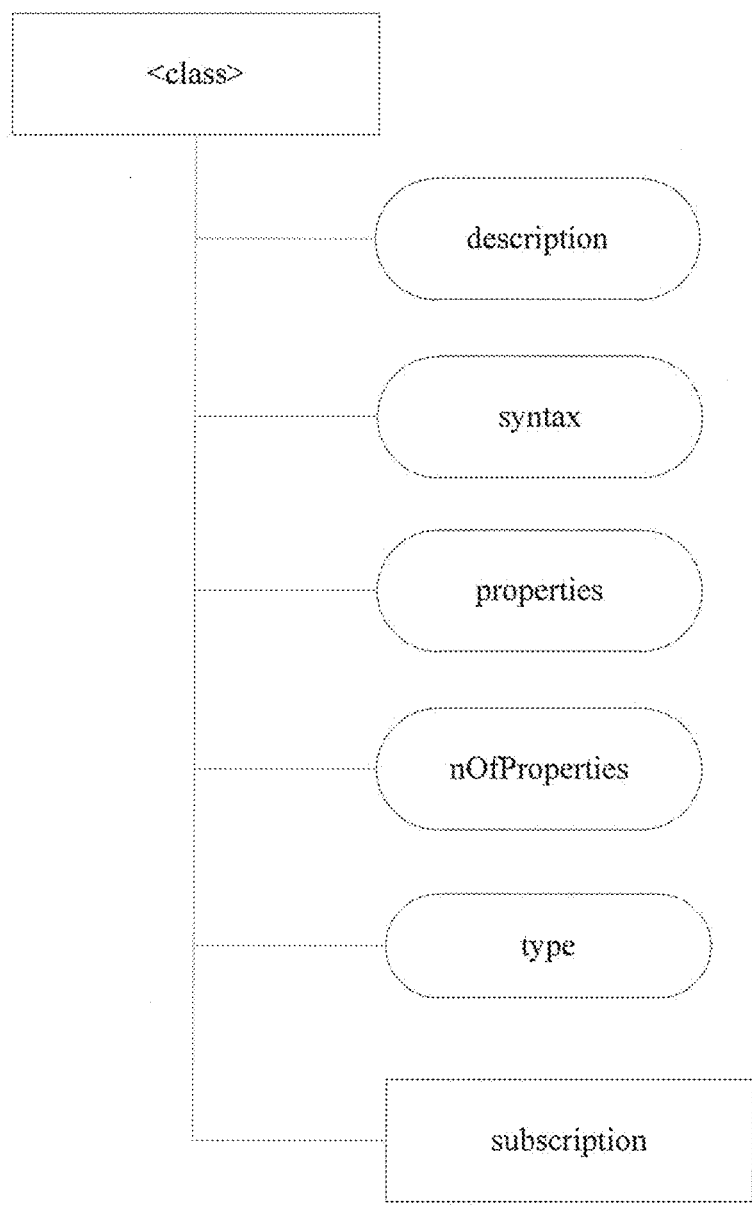
FIG. 29 illustrates a structure of <class> Resource.

The resource tree structure of <class> is shown in FIG. 29. A <class> resource is used to define a resource's semantics as part of the resource-relationship-value triple (Value). Table 4 shows the child resources of <class>. Table 5 shows the attributes of <class>

TABLE 4

Child Resources of <class> Resource

| Child Resource Type | Multiplicity | Description |
| --- | --- | --- |
| <subscription> | 0 . . . n | See clause 9.6.8 in oneM2M-TS-0001 oneM2M Functional Architecture-V0.3.2 |

TABLE 5

Attributes of <class> Resource

| Attribute Name | Multiplicity | RW/ RO/ WO | Description |
| --- | --- | --- | --- |
| resourceType | 1 | RO | See clause 9.6.1 in oneM2M-TS-0001 oneM2M Functional Architecture-V1.2.0 (hereinafter [1]) where this common attribute is described. |
| parentID | 1 | RO | See clause 9.6.1 in [1] where this common attribute is described. |
| expirationTime | 1 | RW | See clause 9.6.1 in [1] where this common attribute is described. |
| accessControlPolicyIDs | 0 . . . n | RW | See clause 9.6.1 in [1] where this common attribute is described. |
| creationTime | 1 | RW | See clause 9.6.1 in [1] where this common attribute is described. |
| lastModifiedTime | 1 | RO | See clause 9.6.1 in [1] where this common attribute is described. |
| Labels | 0 . . . n | RO | See clause 9.6.1 in [1] where this common attribute is described. |
| announceTo | 1 | RW | See clause 9.6.1 in [1] where this common attribute is described. |
| announcedAttribute | 1 | RW | See clause 9.6.1 in [1] where this common attribute is described. |
| description | 1 | RW | The representation of the class which follows the format as specified for the whole ontology. |
| syntax | 1 | RW | The syntax used in description attribute, e.g. XML, RDFS in XML, String. |
| properties | 1 | RW | The list of properties of the class, which take the value of the URIs of <relationship> resources. |
| nOfProperties | 1 | RW | The total of properties associated with the class. |
| type | 1 | RW | Indication of whether it is a dataType. 1 means it is a dataType, 0 means it is not a dataType. |

A complex datatype is a special class, which defines the data structure needed to parse the content instances stored under the <container> resource. The type attribute of a <class> resource is used to indicate whether it is a dataType or not. If it is a dataType, the description attribute is used to describe the data structure by using certain syntax; XSD is one of the options. If it is not a dataType, the description attribute is used to define the class in certain language, RDF is one of the options. RDF may also have XML syntax. The syntax attribute is used to indicate the possible syntax that may be used. For example, XML may mean that it follows the patterns used in XSD to describe the simple and complex data types. RDF in XML may mean that the class is described in RDF language with XML syntax (the other syntactic representation of RDF, not based on XML, are also possible). String may mean the description attribute only gives some words describing the class.

The properties attribute is optional, which will take the value of the URIs of <relationship> resources. Properties associated with a class may be a complex datatype or a non-complex datatype.

An extension of XSD may be enabled with restrictions/facets to interpret each element in a complex datatype that are the description facet and unit facet. A description facet may be used to give a brief description of the element, which includes the possible key words that assists the application in recognizing the element and understanding what the element is about. The unit facet is used to specify the unit of the element. Updated versions of previous Example 1 and Example 2 are shown below:

Example 1A

Description and Unit Facet

```
<simpleType name="Temperature">
  <restriction>
    description ="temperature in Celsius" unit="Celsius" base="integer"
  </restriction>
</simpleType>
```

Example 2A

Description and Unit Facet

```
<complexType name="BloodPressure">
  <sequence>
    <element name="systolic" description="systolic reading" unit="mmHG" type="integer"/>
    <element name="diastolic" description="diastolic reading" unit="mmHG" type="integer"/>
  </sequence>
</complexType>
```

A description/attribute may be embedded to the name of datatypes and its elements. The datatype name and the names of the elements of a datatype may contain information that assists the application with interpreting the datatypes and its elements. The format of the name of a datatype and its elements may look like Table 6. As a result, the updated versions of previous Example 1 and Example 2 are as follows:

Example 1B

Embed Description/Attribute to the Name of Datatypes and its Elements

```
<simpleType name="TemperatureINCelsius">
  <restriction base="integer">
  </restriction>
</simpleType>
```

Example 2B

Embed Description/Attribute to the Name of Datatypes and its Elements

```
<complexType name="BloodPressure">
  <sequence>
    <element name="systolicINmmHG" type="integer"/>
    <element name="diastolicINmmHG" type="integer"/>
  </sequence>
</complexType>
```

TABLE 6

Datatype and Element Name Format

| Key word 1 | ... Key word n | IN | Unit |
|---|---|---|---|

Figure 30:
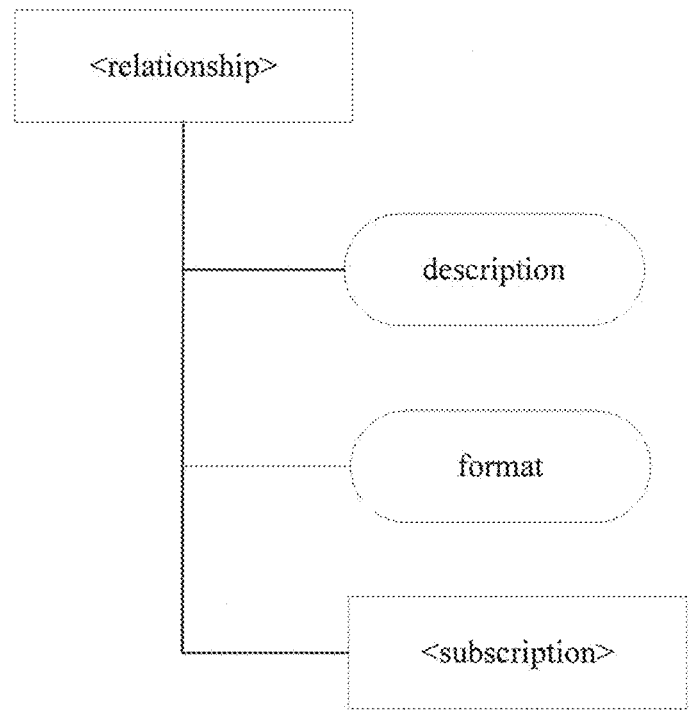
FIG. 30 illustrates a structure of <relationship> resource.

The resource tree structure of <relationship> is shown in FIG. 30. A <relationship> resource may be used to define properties that can be associated to classes. In other words, the properties attribute of a <class> resource may contain the links of the <relationship> resources. A <relationship> resource is also used to define a resource's semantics as part of the resource-relationship-value triple (Relationship). Table 7 shows the child resources of <relationship>. Table 8 shows the attributes of <relationship>.

TABLE 7

Child Resources of <relationship> Resource

| Child Resource Type | Multi-plicity | Description |
|---|---|---|
| <subscription> | 0 ... n | See clause 9.6.8 in oneM2M-TS-0001 oneM2M Functional Architecture-V1.2.0 |

TABLE 8

Attributes of <relationship> Resource

| Attribute Name | Multi-plicity | RW/RO/WO | Description |
|---|---|---|---|
| resourceType | 1 | RO | See clause 9.6.1 in [2] where this common attribute is described. |
| parentID | 1 | RO | See clause 9.6.1 in [2] where this common attribute is described. |
| expirationTime | 1 | RW | See clause 9.6.1 in [2] where this common attribute is described. |
| accessControlPolicyIDs | 0 ... n | RW | See clause 9.6.1 in [2] where this common attribute is described. |
| creationTime | 1 | RW | See clause 9.6.1 in [2] where this common attribute is described. |
| lastModifiedTime | 1 | RO | See clause 9.6.1 in [2] where this common attribute is described. |
| labels | 0 ... n | RO | See clause 9.6.1 in [2] where this common attribute is described. |
| announceTo | 1 | RW | See clause 9.6.1 in [2] where this common attribute is described. |
| announcedAttribute | 1 | RW | See clause 9.6.1 in [2] where this common attribute is described. |
| format | 1 | RW | It indicates the format of the description of the relationship. |
| description | 1 | RW | The representation of the relationship which follows the format as designated. |

Figure 31:
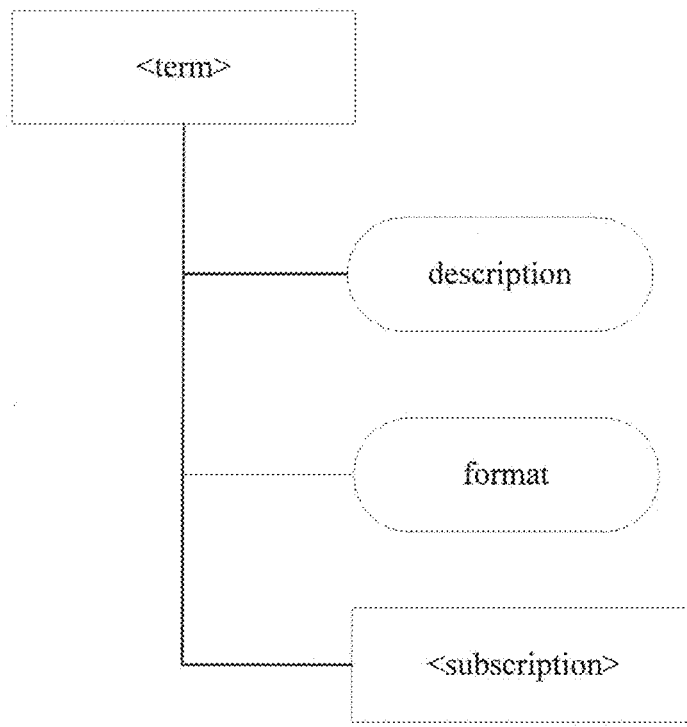
FIG. 31 illustrates a structure of <term> resource.

The resource tree structure of <term> is shown in FIG. 31. A <term> resource may be used to define a resource's semantics as part of the resource-relationship-value triple (Value). Table 9 shows the child resources of <term>. Table 10 shows the attributes of <term>.

TABLE 9

Child Resources of <term> Resource

| Child Resource Type | Multi-plicity | Description |
|---|---|---|
| <subscription> | 0 ... n | See clause 9.6.8 in oneM2M-TS-0001 oneM2M Functional Architecture-V1.2.0 |

TABLE 10

Attributes of <term> Resource

| Attribute Name | Multi-plicity | RW/RO/WO | Description |
|---|---|---|---|
| resourceType | 1 | RO | See clause 9.6.1 in [2] where this common attribute is described. |
| parentID | 1 | RO | See clause 9.6.1 in [2] where this common attribute is described. |
| expirationTime | 1 | RW | See clause 9.6.1 in [2] where this common attribute is described. |
| accessControlPolicyIDs | 0 . . . n | RW | See clause 9.6.1 in [2] where this common attribute is described. |
| creationTime | 1 | RW | See clause 9.6.1 in [2] where this common attribute is described. |
| lastModifiedTime | 1 | RO | See clause 9.6.1 in [2] where this common attribute is described. |
| labels | 0 . . . n | RO | See clause 9.6.1 in [2] where this common attribute is described. |
| announceTo | 1 | RW | See clause 9.6.1 in [2] where this common attribute is described. |
| announcedAttribute | 1 | RW | See clause 9.6.1 in [2] where this common attribute is described. |
| format | 1 | RW | It indicates the format of the description of the term. |
| term | 1 | RW | The representation of the term which follows the format as designated. |

The semantics-related resources capability can be associated with and linked to normal resources in the M2M systems, e.g., in the oneM2M resource structure, <CSEBase>, <AE>, <container>, <contentInstance>, etc., to provide the semantics description to those resources. A normal resource may be described by a collection of resource-relationship-value triples, consisting of a resource, a relationship, and a value. Values may be classes, terms, or other resources. Since in those triples, the resource itself is fixed and known, what maybe added is a collection of relationship-value doubles, or the like. Another semantics attribute may be used (i.e., added) to complement the existing searchStrings attribute to enable the semantics. How the semantics is enabled for <AE> and <container> resource in the oneM2M resource structure is discussed herein.

Figure 32:
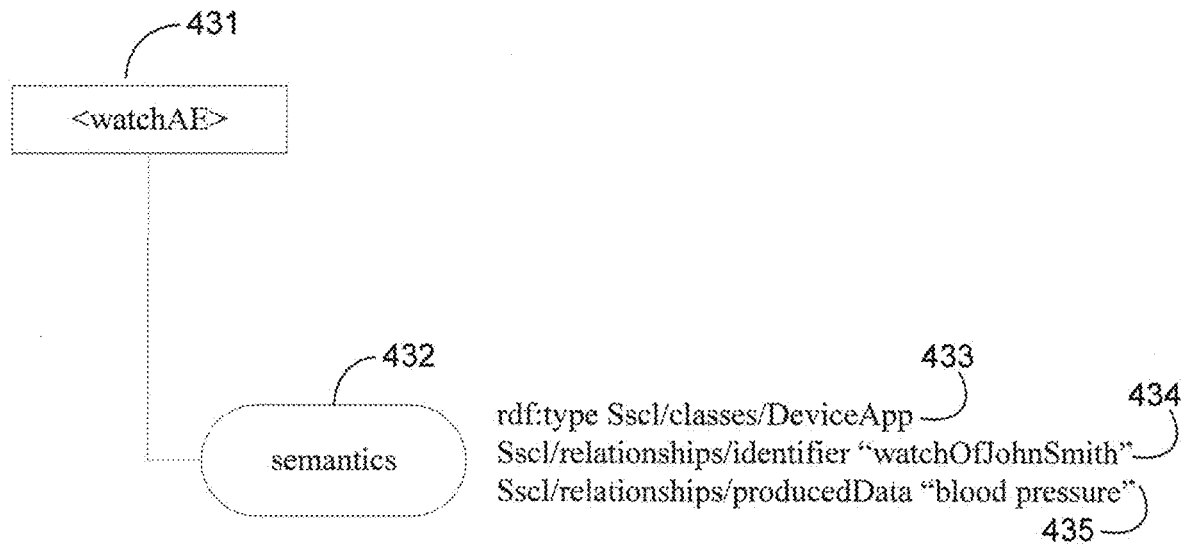
FIG. 32 illustrates a <AE> Resource to Enable Semantics.

In order to enable the semantics to an <AE> resource, the rdf: type relates the <AE> resource to a <DeviceApp> class as defined herein, which has properties of identifier and producedData. Since W3C RDFS already defined the core property rdf: type, we may use it as one of the external relationships if we include http://www.w3.org/1999/02/22-rdf-syntax-ns# in one of the prefixes. On the other hand, there is no limitation in defining such similar relationship on the semantics node. The semantics attribute is used to store the semantics description of the <AE> resource. In this example, as shown in FIG. 32, the application is a watch, which has identifier of watchOfJohnSmith and producedData of blood pressure. As a result, in the semantics attribute, there are multiple items. The first item indicates that the <watchAE> 431 has the type of <DeviceApp>. And from the <DeviceApp> class description, there are multiple properties associated with it. Thus the second and third items are to assign values to those properties.

Prefixes may be defines such as
@prefix relationship: <Sscl>/relationships/
@prefix class: <Sscl>/classes/
such that, the semantics attribute may be supplied to be
rdf: type class/DeviceApp 433
relationship/identifier "watchOfJohnSmith" 434
relationship/producedData "blood pressure" 435

The semantics of <container> resource may be applied to the individual <contentInstance> resource under that container. This is regarded as a grouping optimization in describing the semantics of a group of similar resources.

For example, multiple instances of blood pressure monitoring data may have the same semantics. Hence, each content instance may be associated with the same semantics (the BloodPressure class was defined herein with URI Sscl/classes/BloodPressure) as shown below. Note Sscl is just another name of a root as discussed herein is also the same as ssBase in FIG. 17:

- <CSEBase1>/bpAE/<bpContainer>/<contentInstance1> rdf: type Sscl/classes/BloodPressure
- <CSEBase1>/bpAE/<bpContainer>/<contentInstance2> rdf: type Sscl/classes/BloodPressure
- <CSEBase1>/bpAE/<bpContainer>/<contentInstance3> rdf: type Sscl/classes/BloodPressure
- ...

Figure 33:
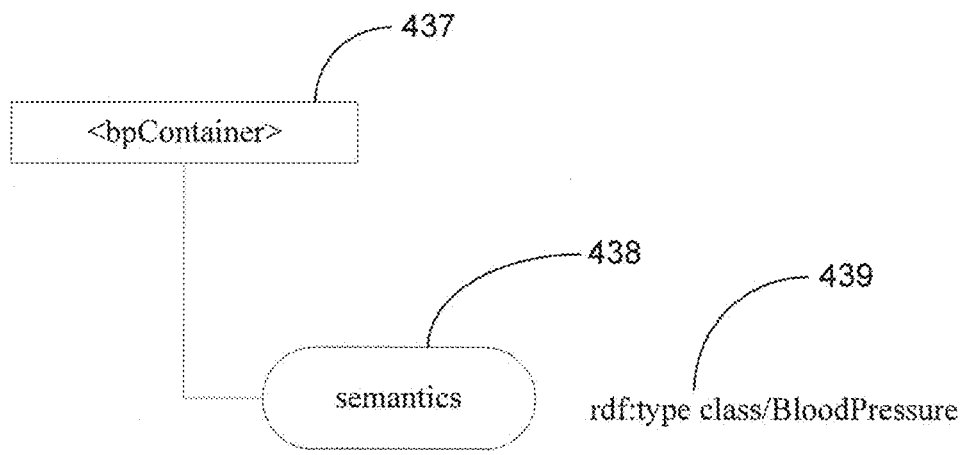
FIG. 33 illustrates a <container> Resource to Enable Semantics.

By supporting the grouping optimization, the following association is also valid:
<CSEBase1>/bpAE/<bpContainer> rdf type Sscl/classes/BloodPressure The <BloodPressure> class is a special <class> resource, which is a datatype as defined herein. Specifically, the content instance has the BloodPressure datatype has two fields in its content attribute, i.e., systolicINmmHG and diastolicINmmHG. In this example as shown in FIG. 33, the semantics attribute is used to store the information that the container has the type of <BloodPressure>.

Figure 34:
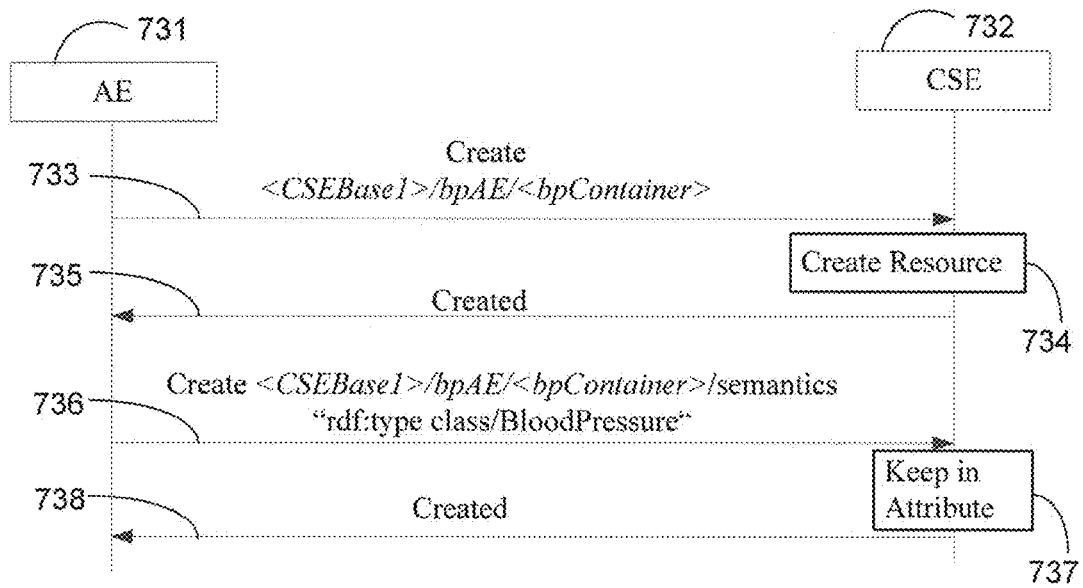
FIG. 34 illustrates a Message Flow of Creating a new <container> and Enabling Semantics for it.
Figure 35:
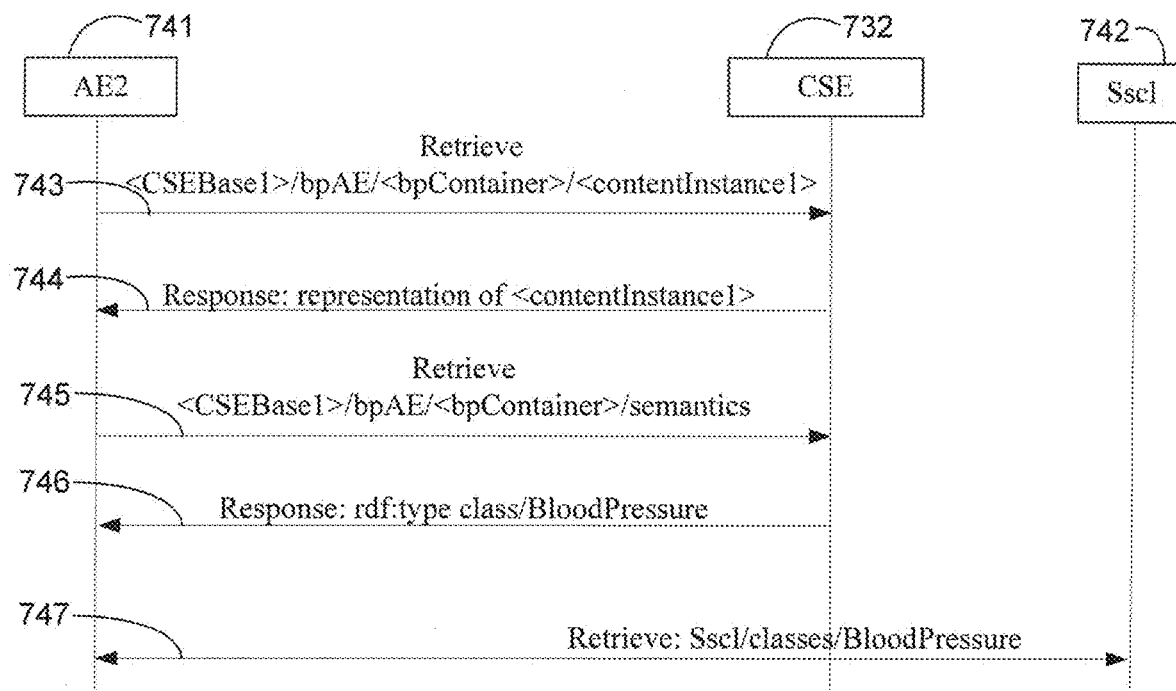
FIG. 35 illustrates a Message Flow of <contentInstance> Resource and Semantics Retrieval.

As an example, a <contentInstance> has URI of <CSEBase1>/bpAE/<bpContainer>/<contentInstance1>. We assume <BloodPressure> class is defined and stored on Sscl, and has URI of Sscl/classes/BloodPressure. FIG. 34 shows an exemplary message flow of creating the <bpContainer> container by AE 731 (e.g., blood pressure monitor app (not shown) in watch 710) and how the semantics is enabled by AE 731. At step 733, AE 731 sends to CSE 732 a request to create a normal resource (e.g., <bpContainer> 437 as shown in FIG. 33). At step 734, CSE 732 creates <bpContainer> 437 and at step 735, CSE 732 sends to AE 731 a confirmation associated with creating <bpContainer> 437. At step 736, AE 731 provides semantics information associated with the <bpContainer>. In this situation, AE 731 provides semantics information that the container (<bpContainer> 437) contains data with blood pressure type. At step 737, CSE 732 may keep the semantics information in an attribute (semantics attribute 438) of <bpContainer> 437 as shown in FIG. 33. At step 738, CSE 732 may send to AE 731 a confirmation associated with receiving the semantics information of step 736. AE 731 adds value for the semantics attribute 438 of <bpContainer> 437 container resource. FIG. 35 illustrates a use of another application (e.g. a doctor) who is interested in the data contained in the container.

FIG. 35 shows an exemplary message flow of <contentInstance> resource and semantics retrieval process by another AE 741 that may be associated with a doctor's office that may desire the blood pressure information. At step 743, AE 741 sends a request to CSE 732 for a content instance (e.g. . . . /<bpContainer>/<contentInstance1>). At step 744, CSE 732 provides the <contentInstance> resource to AE 741. In order to understand and interpret the data, the application (AE 741) would like semantics information. In this case, at step 745, AE 741 sends a subsequent request to CSE 742 to retrieve the semantics information stored along with the data (e.g. . . . /<bpContainer>/<contentInstance1>).

At step 746, CSE 732 provides semantics information. The semantics information of step 746 includes information that the data has certain type (e.g., type class/blood pressure 439), which, in this case, is defined as a class resource. At step 747, AE 741 communicates with Sscl 742 (a semantics node), in order to understand this type (class resource). AE 741 retrieves the definition of the class resource from the semantics node.

Figure 36:
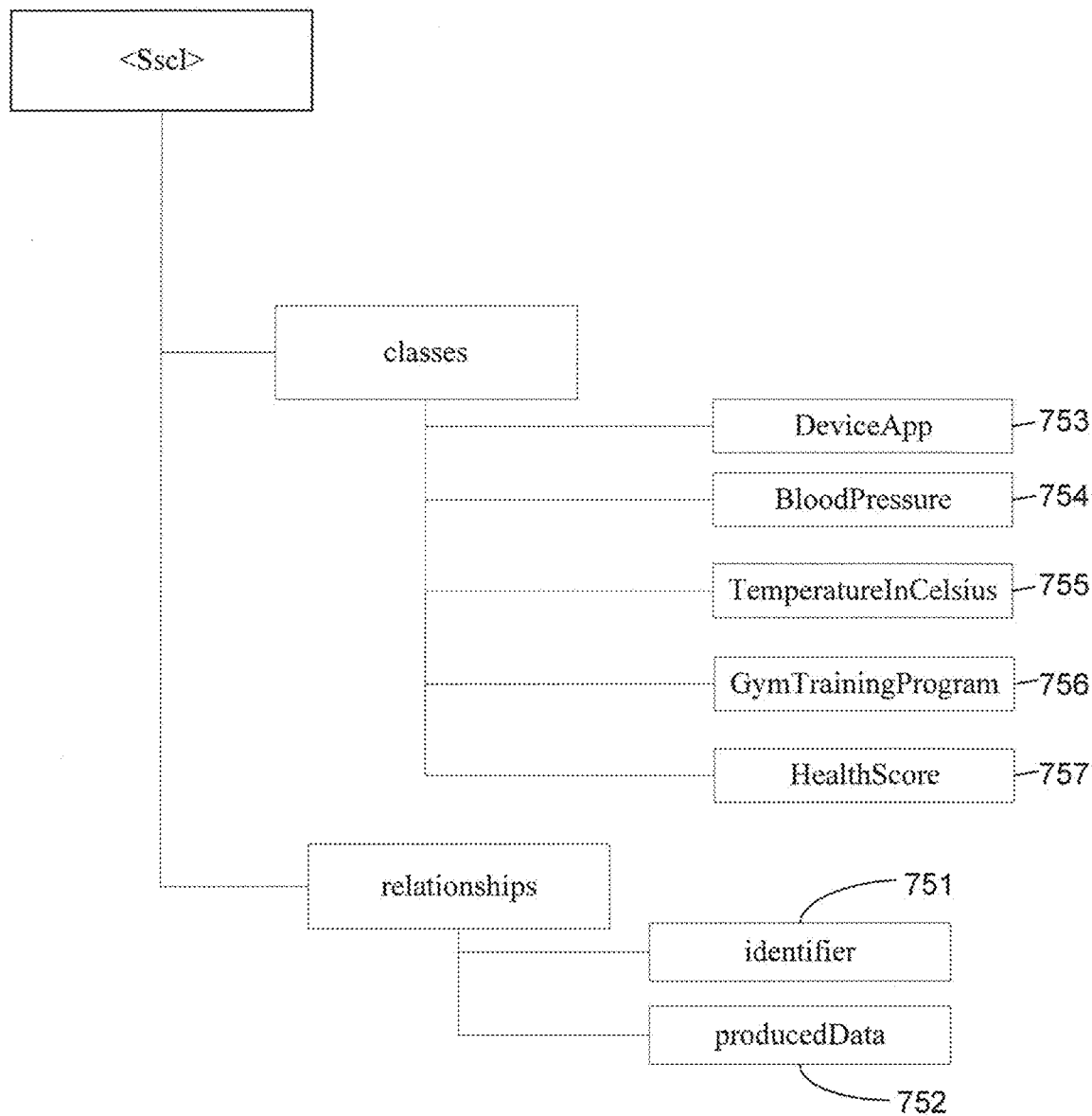
FIG. 36 illustrates a Semantics-related Resources Defined for the Gym Use Case.

The examples of semantics-related resources that may be used for the gym use case, as disclosed herein, are shown in FIG. 36. The identifier relationship specifies the identifier to an object/entity, e.g., application, data, etc. The attributes (syntax, searchStrings, description) of the <identifier> 751 relationship resource are shown in Table 11, whose description is written RDFS in XML.

TABLE 11

Description of <identifier> in RDFS in XML

| | |
|---|---|
| syntax | RDF in XML |
| searchStrings | "identifier" |
| description | <rdf:Property rdfabout="coap://<Sscl>/relationships/identifier"> |
| | <rdfs:label>identifier</rdfs:label> |
| | <rdfs:comment> |
| | Relation from an object to its unique identifier. |
| | </rdfs:comment> |
| | <rdfs:range rdfresource="http://www.w3.org/2000/01/rdf-schema#Literal"/> |
| | <rdfs:isDefinedBy rdfresource="coap://<Sscl>/"/> |
| | </rdf:Property> |

The produced data relationship specifies the produced data of an application. The attributes (syntax, searchStrings, description) of the <producedData> 752 relationship resource are shown in Table 12, whose description is written RDFS in XML.

TABLE 12

Description of <producedData> in RDFS in XML

| | |
|---|---|
| syntax | RDF in XML |
| searchStrings | "producedData" |
| description | <rdf:Property rdfabout="coap://<Sscl>/relationships/measurement"> |
| | <rdfs:label>measurement</rdfs:label> |
| | <rdfs:comment> |
| | Relation from an application to its produced data (measured data or data analyzed from the measurements. |
| | </rdfs:comment> |
| | <rdfs:domain rdfresource="coap://<Sscl>/classes/DeviceApp"/> |
| | <rdfs:range rdfresource="http://www.w3.org/2000/01/rdf-schema#Literal"/> |
| | <rdfs:isDefinedBy rdfresource="coap://<Sscl>/"/> |
| | </rdf:Property> |

The identifier 751 and produced data 752 relationships defined above may be used to relate one class to another class, one class to its properties. The <DeviceApp> 753 class is the class of the applications involved in the use cases. A <DeviceApp> 753 may have attributes, which are not limited to the ones specified here and extensible. Watch application 711, treadmill application 714, and ambient sensor application 717 are instances of the <DeviceApp> 753 class. The <DeviceApp> 753 has the following properties, which are defined herein, which are identifier and producedData. The attributes (syntax, searchStrings, properties, nOfProperties, type, and description) of the <DeviceApp> 753 class resource are shown in Table 13 and Table 14, respectively when description is written in String or RDFS in XML.

TABLE 13

Description of <DeviceApp> in String

| | |
|---|---|
| syntax | String |
| searchStrings | "application" |
| properties | . . . / . . . /relationship/identifier |
| | . . . / . . . /relationship/producedData |
| nOfProperties | 2 |
| type | 0 |
| description | "An application" |

TABLE 14

Description of <DeviceApp> in RDFS in XML

| | |
|---|---|
| syntax | RDF in XML |
| searchStrings | "application" |
| properties | . . . / . . . /relationship/identifier |
| | . . . / . . . /relationship/producedData |
| nOfProperties | 2 |
| description | <rdf:Class rdfabout="coap://<Sscl>/class/DeviceApp"> |
| | <rdfs:label>=DeviceAppL</rdfs:label> |
| | <rdfs:comment> |
| | An application. |
| | </rdfs:comment> |
| | <rdfs:isDefinedBy rdfresource="coap://<Sscl>/"/> |
| | </rdf:Class> |

Watch application 711 (e.g., associated like <watch> 761 of FIG. 37) is an instance of the <DeviceApp> 753 class, which has the properties defined for the <DeviceApp> 753 class. Watch application 711 is able to produce the blood pressure data.
RDF:

<rdf:RDF
xmlns:rdf="http://www.w3.org/1999/02/22-rdf-syntax-ns#"

-continued xmlns:xsd ="http://www.w3.org/2001/XLMSchema#"
xmlns:mwc="coap://<Sscl>">
<rdf:Description rdfabout="coap:// phoneCSEBase/<watch>">
<rdf:type rdfresource="coap://<Sscl>/classes/DeviceApp"/>
<mwc:identifier="watchOfJohnSmith"/>
<mwc:producedData="blood pressure"/>
</rdf:Description>
</rdf:RDF>

Ambient sensor application 717 (e.g., associated like <sensor> 771 of FIG. 38) is an instance of the <DeviceApp>

753 class, which has the properties defined for the <DeviceApp> 753 class. Ambient sensor application 717 is able to produce temperature data.
RDF:

```
<rdf:RDF
xmlns:rdf="http://www.w3.org/1999/02/22-rdf-syntax-ns#"
xmlns:xsd ="http://www.w3.org/2001/XLMSchema#"
xmlns:mwc="coap://<Sscl>">
<rdf:Description rdf:about="coap://gymCSEBase/<sensor>">
<rdf:type rdf:resource="coap://<Sscl>/classes/DeviceApp"/>
<mwc:identifier="temperatureSensor1"/>
<mwc:producedData="temperature"/>
</rdf:Description>
</rdf:RDF>
```

Treadmill application 714 (e.g., associated like <treadmill> 775 of FIG. 38) is an instance of the <DeviceApp> class, which has the properties defined for the <DeviceApp> class. Treadmill application 714 is able to produce the gym training program data the user finishes.
RDF:

```
<rdf:RDF
xmlns:rdf="http://www.w3.org/1999/02/22-rdf-syntax-ns#"
xmlns:xsd ="http://www.w3.org/2001/XLMSchema#"
xmlns:mwc="coap://<Sscl>">
<rdf:Description rdf:about="coap://gymCSEBase/<treadmill>">
<rdf:type rdf:resource="coap://<Sscl>/classes/DeviceApp"/>
<mwc:identifier="treadmill1"/>
<mwc:producedData="gym training program"/>
</rdf:Description>
</rdf:RDF>
```

Health insurance application 722 (e.g., associated like <healthInsurance> 765 of FIG. 37) on phone 712 is an instance of the <DeviceApp> class, which has the properties defined for the <DeviceApp> class. Health insurance application 722 is able to produce the health score data.
RDF:

```
<rdf:RDF
xmlns:rdf="http://www.w3.org/1999/02/22-rdf-syntax-ns#"
xmlns:xsd ="http://www.w3.org/2001/XLMSchema#"
xmlns:mwc="coap://<Sscl>">
<rdf:Description rdf:about="coap://phoneCSEBase/<phone>">
<rdf:type rdf:resource="coap://<Sscl>/classes/DeviceApp"/>
<mwc:identifier="healthInsuranceOnJohn'sPhone"/>
<mwc:producedData="health score"/>
</rdf:Description>
</rdf:RDF>
```

The <BloodPressure> 754 class is a datatype. It has fields systolicINmmHG and diastolicINmmHG. The attributes (syntax, searchStrings, type and description) of the <BloodPressure> class resource are shown in Table 15 when description is written in XML.

TABLE 15

Description of <BloodPressure> in XML

| | |
|---|---|
| syntax | XML |
| searchStrings | "blood pressure" |
| type | 1 |
| description | <complexType name="BloodPressure"> <sequence> <element name="systolicINmmHG" type="integer"/> <element name="diastolicINmmHG" |

TABLE 15-continued

Description of <BloodPressure> in XML

| | |
|---|---|
| | type="integer"/> </sequence> </complexType> |

The <TemperatureInCelsius> 755 of FIG. 36 class is a datatype. The attributes (syntax, searchStrings, type and description) of the <TemperatureInCelsius> 755 class resource are shown in Table 16 when description is written in XML.

TABLE 16

Description of <TemperatureINCelsius> in XML

| | |
|---|---|
| syntax | XML |
| searchStrings | "temperature", "celsius" |
| type | 1 |
| description | <simpleType name="TemperatureINCelsius"> <restriction base="integer"> </restriction> </simpleType> |

The <GymTrainingProgram> 756 class is a datatype. It has the fields of usedEquipmentType, usedEquipmentLevel, durationINMinute, targetHeartRateINPerMinute, and calorieBurnINPerHour. The usedEquipementType shows the type of the equipment being used for the training. The usedEquipmentLevel shows which level of the equipment was set up for the training. The durationINMinute shows how long the training was in minutes. The heartRateINPerMinute shows the average heart rate per minute during the training. The calorieBurnINPerHour shows the total calorie burn per hour during the training. The attributes (syntax, searchStrings, type and description) of the <GymTrainingProgram> 756 class resource are shown in Table 17 when description is written in XML.

TABLE 17

Description of <GymTrainingProgram> in XML

| | |
|---|---|
| syntax | XML |
| searchStrings | "gym training program" |
| type | 1 |
| description | <complexType name="GymTrainingProgram"> <sequence> <element name="usedEquipmentType" type="string"/> <element name="usedEquipmentLevel" type="integer"/> <element name="durationINMinute" type="integer"/> <element name="heartRateINPerMinute" type="integer"/> <element name="calorieBurnINPerHour" type="integer"/> </sequence> </complexType> |

The <HealthScore> 757 class is a datatype. Its values, in this example, have range between 0 and 100. The attributes (syntax, searchStrings, type and description) of the <HealthScore> 757 class resource are shown in Table 18 when description is written in XML.

TABLE 18

Description of <HealthScore> in XML

| | |
|---|---|
| syntax | XML |
| searchStrings | "health score" |
| type | 1 |

TABLE 18-continued

Description of <HealthScore> in XML

| description | <simpleType name="HealthScore"><br><restriction base="integer"><br><minInclusive value="0"/><br><maxInclusive value="100"/><br></restriction><br></simpleType> |
|---|---|

Figure 37:
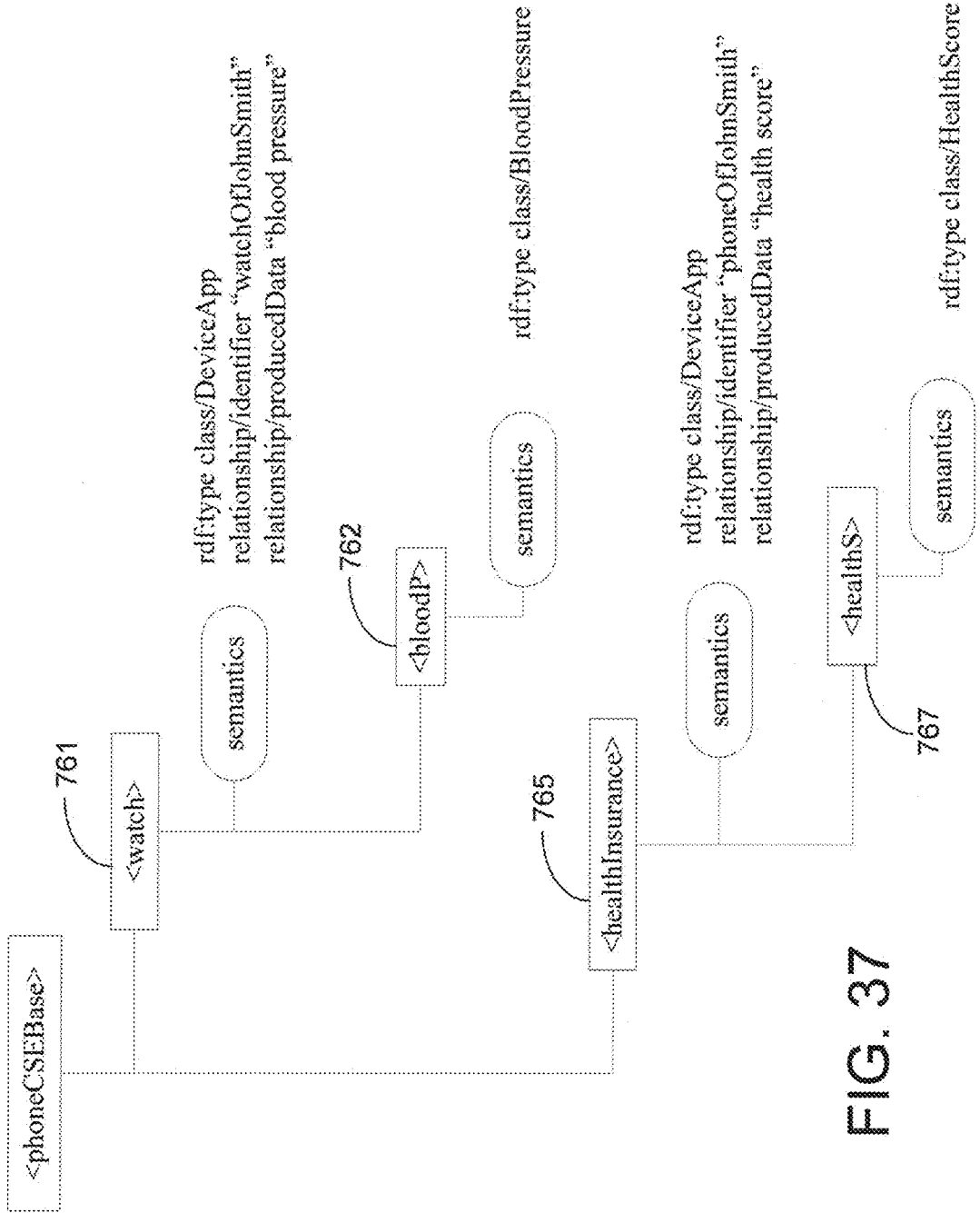
FIG. 37 illustrates a Phone CSE Resource Structure.
Figure 38:
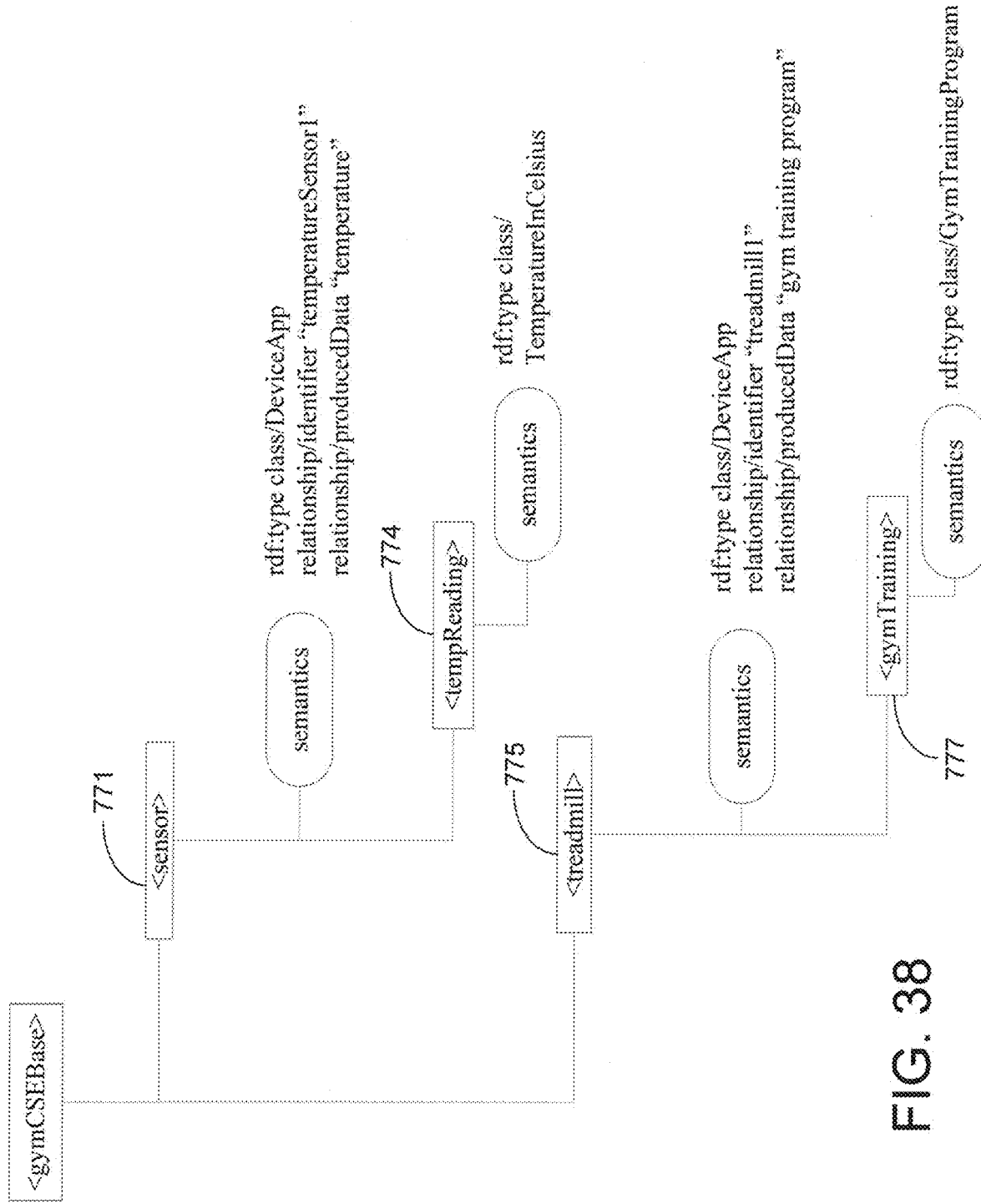
FIG. 38 illustrates a Gym CSE Resource Structure.

Herein, with regarded to FIG. 37 and FIG. 38, oneM2M resource structure is used for illustration purposes. However, the example of the resources defined in other M2M architectures, such as ETSI M2M, are very similar and may also be applicable to oneM2M examples. The following discussion regarding FIG. 37 and FIG. 38 may be viewed in the context of the methods as shown with regard to FIG. 34 and FIG. 35.

In an example, when watch application 711 registers with the phone service layer 713 (e.g., common service entity—CSE or service layer—SL), it attaches its semantics in the registration message. The watch has the type of DeviceApp 753. By following the schema of <DeviceApp> 753 class, watch application 711 indicates to phone service layer 713 that it may produce the blood pressure data. Phone SL 713 may create an application resource for watch 710, as shown in FIG. 37 (e.g., <watch> 761). Watch application 711 creates a container on phone SL 713 to upload the data it measures. Watch application 711 indicates that the content instance has the type of BloodPressure 754. Since every content instance under this <bloodP> 762 container has the same semantics, the semantics is associated with the <bloodP> 762 container instead of each content instance, as shown in FIG. 37.

Similarly, when health insurance application 722 registers with phone SL 713, it attaches its semantics in the registration message. Health insurance application 722 has the type of DeviceApp 753. By following the schema of <DeviceApp> 753 class, health insurance application 722 indicates to phone SL 713 that it may produce the health score data. Phone SL713 may create an application resource for health insurance application 722, as shown in FIG. 37 (e.g., <healthInsurance> 765). Health insurance application 722 creates a container on phone SL 713 to upload the data it calculates. Health insurance application 722 indicates that the content instance has the type of HealthScore 757. Since every content instance under this <healthS> 767 container has the same semantics, the semantics is associated with the <healthS> 767 container instead of each content instance, as shown in FIG. 37.

When ambient sensor application 717 registers with gym SL 718, it attaches its semantics in the registration message. Ambient sensor 716 has the type of DeviceApp 753. By following the schema of <DeviceApp> 753 class, ambient sensor 716 indicates to gym SL 718 that it can produce the temperature data. Gym SL 718 may create an application resource for ambient sensor 716 as shown in FIG. 38 (e.g., <sensor> 771). Ambient sensor application 717 creates a container on gym SL 718 to upload the data it measures. Ambient sensor application 717 indicates that the content instance has the type of TemperatureINCelsius 755. Since every content instance under this <tempReading> 774 container has the same semantics, the semantics is associated with the <tempReading> 774 container instead of each content instance, as shown in FIG. 38.

Similarly, when treadmill application 714 registers with gym SL 718, it attaches its semantics in the registration message. Treadmill 715 has the type of DeviceApp 753. By following the schema of <DeviceApp> 753 class, the treadmill 715 indicates to gym SL 718 that it may produce the gym training program data. Gym SL 718 may create an application resource for treadmill 715, as shown in FIG. 38 (e.g., <treadmill> 775). Treadmill application 714 creates a container on gym SL 718 to upload the data it measures. Treadmill application 714 indicates that the content instance has the type of Gym TrainingProgram 756. Since each content instance under this <gymTraining> 777 container has the same semantics, the semantics is associated with the <gymTraining> 777 container instead of each content instance, as shown in FIG. 38.

Figure 39A:
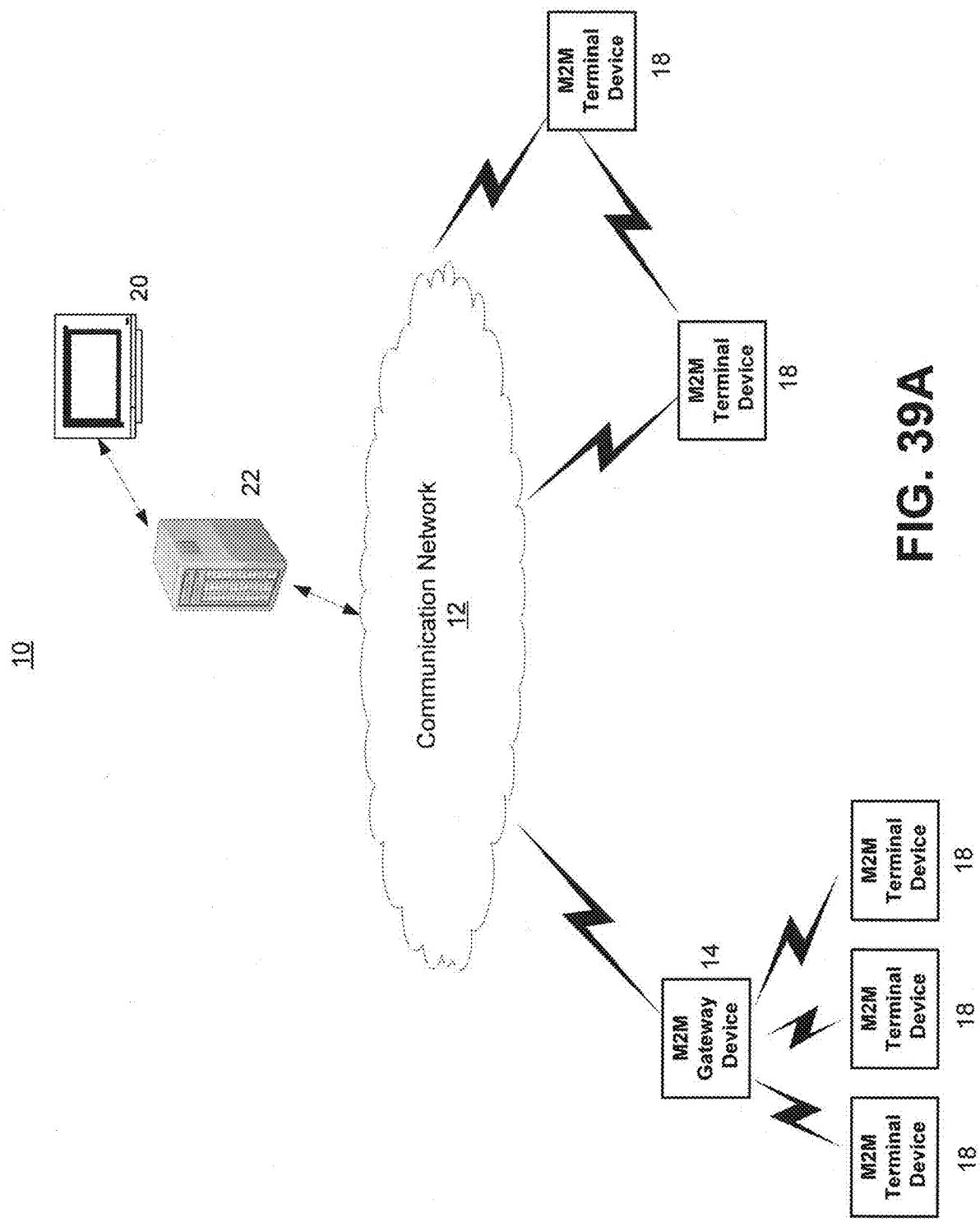
FIG. 39A is a system diagram of an example machine-to-machine (M2M) or Internet of Things (IoT) communication system in which the disclosed subject matter may be implemented.
Figure 39B:
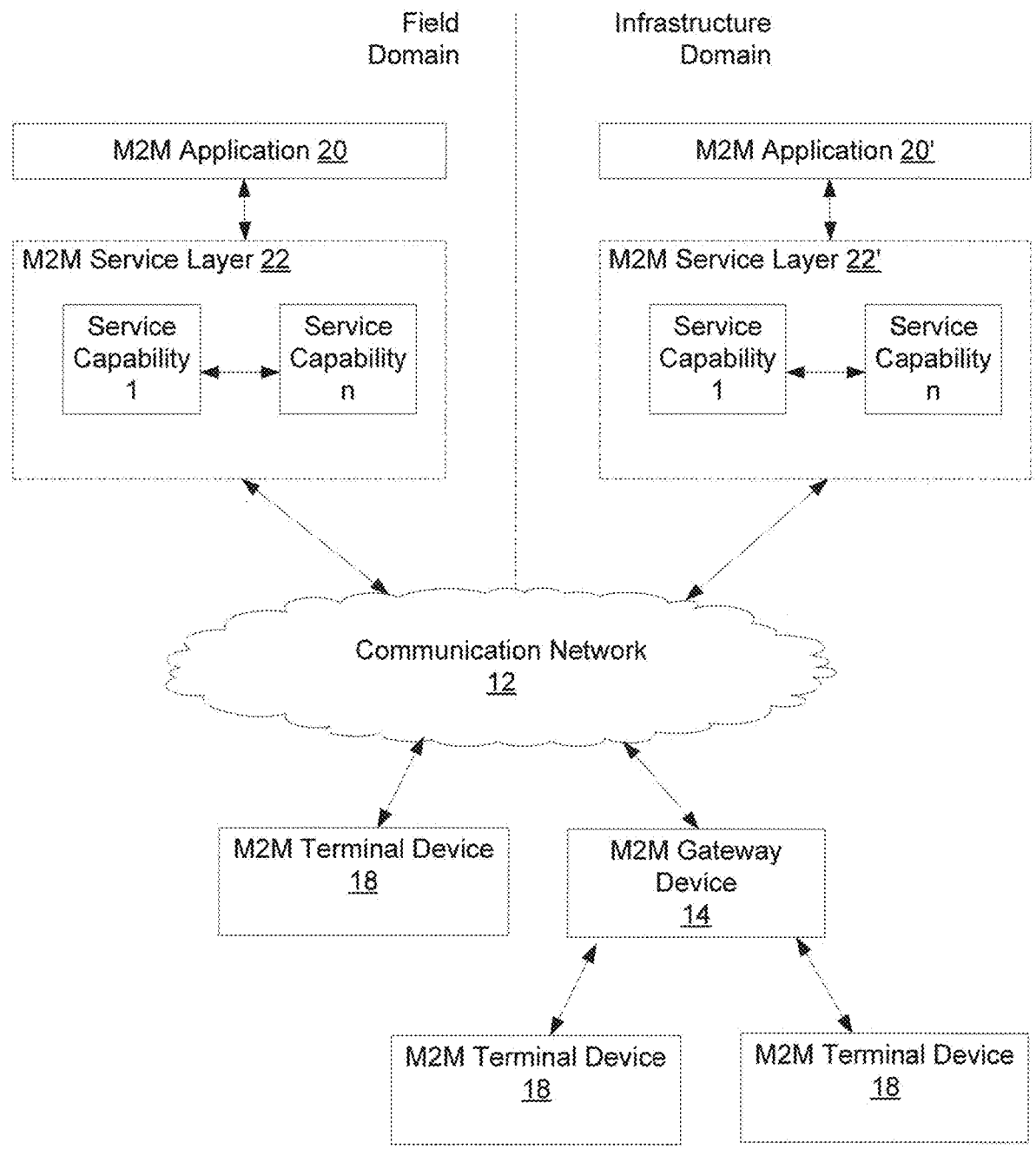
FIG. 39B is a system diagram of an example architecture that may be used within the M2M/IoT communications system illustrated in FIG. 39A.
Figure 39C:
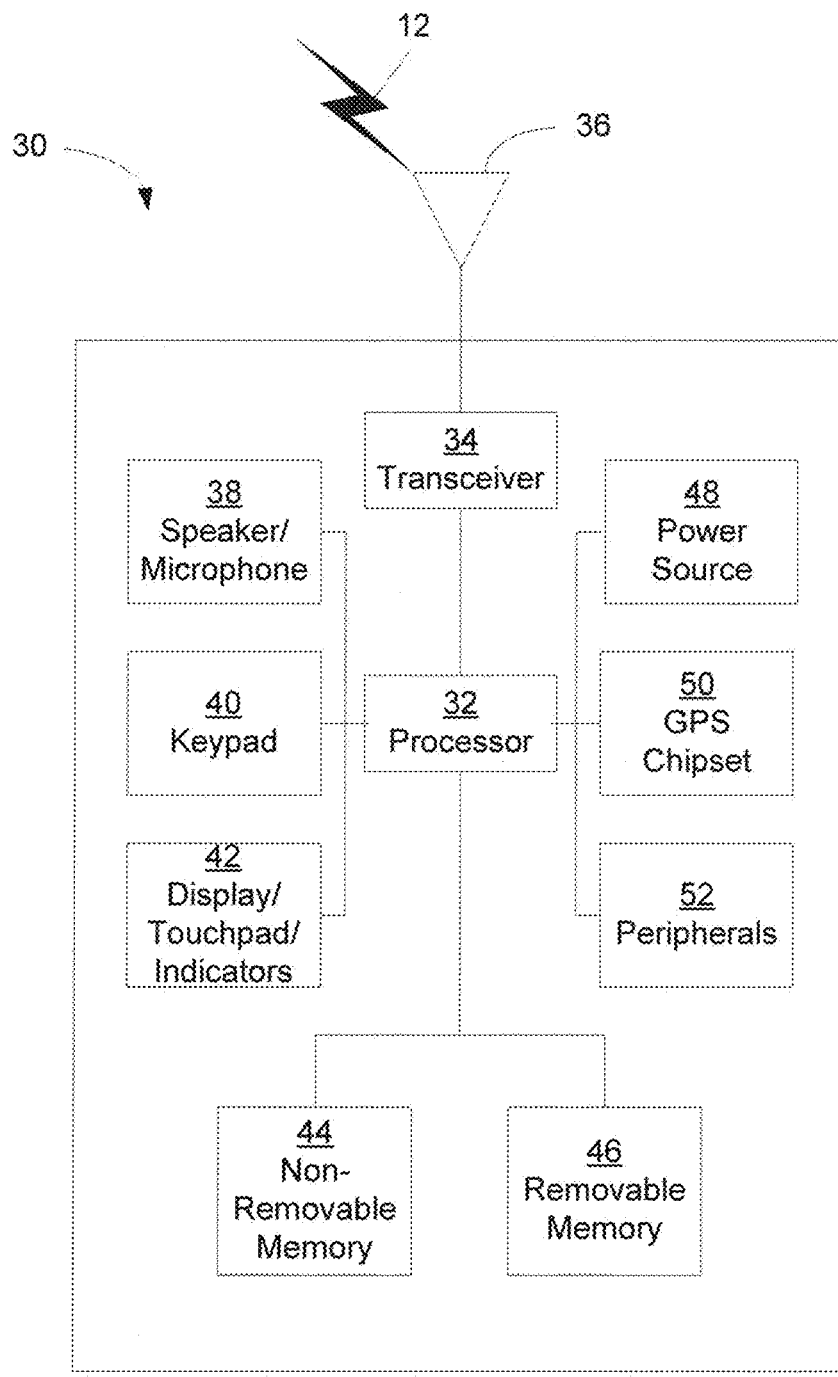
FIG. 39C is a system diagram of an example M2M/IoT terminal or gateway device that may be used within the communications system illustrated in FIG. 39A.
Figure 39D:
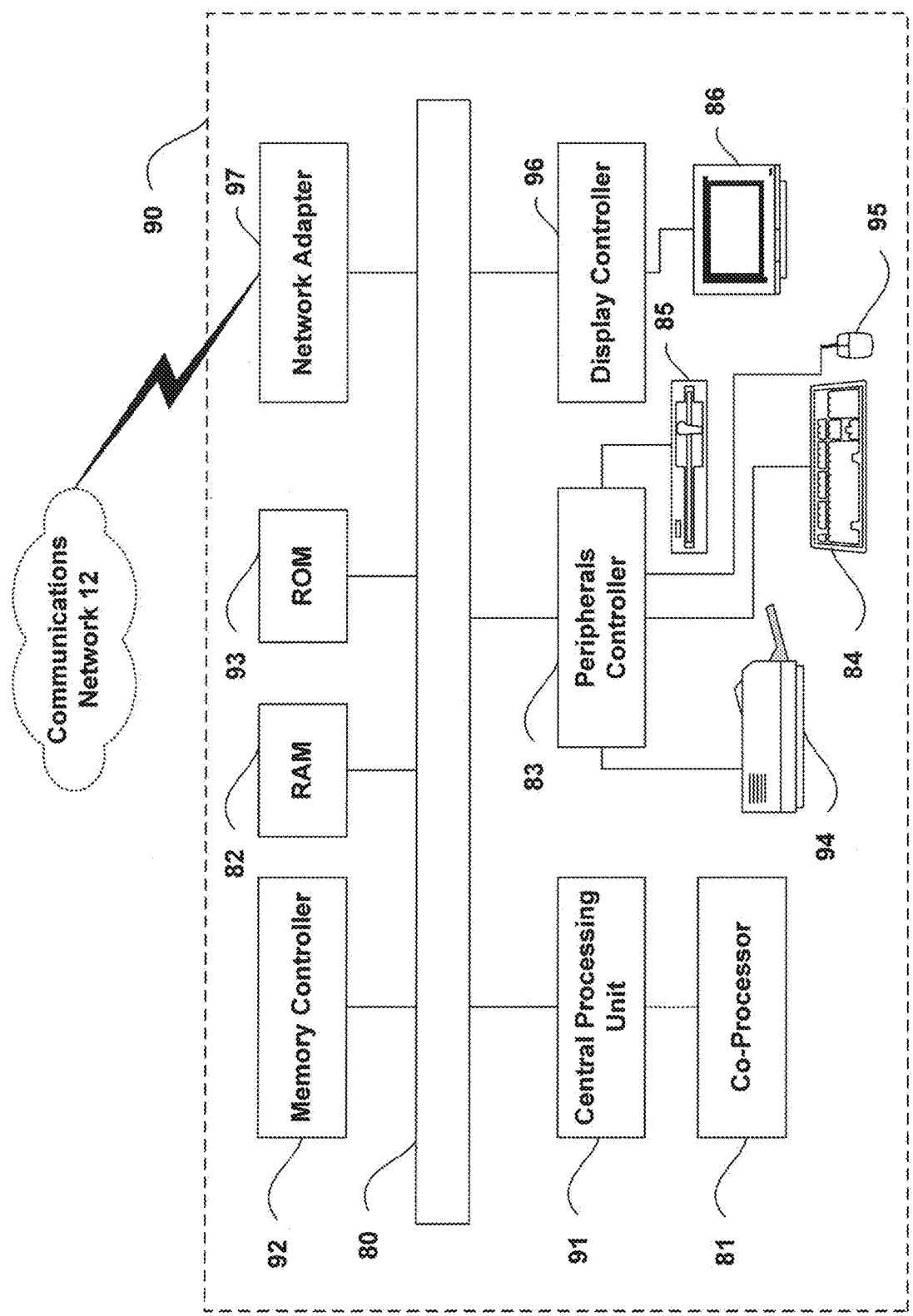
FIG. 39D is a block diagram of an example computing system in which aspects of the communication system of FIG. 39A may be embodied.

It is understood that the entities performing the steps illustrated in flow diagrams, for example FIG. 34-FIG. 35, are logical entities that may be implemented in the form of software (e.g., computer-executable instructions) stored in a memory of, and executing on a processor of, a device, server, or computer system such as those illustrated in FIG. 39C or FIG. 39D. That is, the method(s) illustrated in herein, for example FIG. 34-FIG. 35 or the like, may be implemented in the form of software (i.e., computer-executable instructions) stored in a memory of a computing device, such as the device or computer system illustrated in FIG. 39C or FIG. 39D, which computer executable instructions, when executed by a processor of the computing device, perform the steps illustrated in FIG. 34-FIG. 35 or other figures. In an example, with further detail below with regard to the interaction of M2M devices, AE 741 of FIG. 35 may reside on M2M terminal device 18 of FIG. 39A, while CSE 732 and Sscl 742 of FIG. 35 may reside on M2M gateway device 14 of FIG. 39A.

Without in any way limiting the scope, interpretation, or application of the claims appearing herein, a technical effect of one or more of the examples disclosed herein is to provide adjustments to how semantics is managed. Semantics information (and related intelligence) may be handled or stored by a special entity (e.g., a semantics node). Another technical effect of one or more of the concepts disclosed herein is that, by comparison to conventional implementations, if a CSE supports the semantics node or semantics hierarchy as discussed herein, the resource hierarchy can be organized in a more flexible way, such that semantics information may be more efficiently accessed, distributed, or stored.

While the 3GPP and ETSI M2M architectures are described by way of background herein and may be used to illustrate subject matter described herein, it is understood that implementations of the subject matter described herein may vary while remaining within the scope of the present disclosure. One skilled in the art will also recognize that the disclosed subject matter is not limited to implementations using the 3GPP or ETSI M2M architectures discussed above, but rather may be implemented in other architectures and systems, such as oneM2M, message queuing telemetry transport (MQTT), and other M2M systems and architectures.

FIG. 39A is a diagram of an example machine-to machine (M2M), Internet of Things (IoT), or Web of Things (WoT) communication system 10 in which one or more disclosed concepts, such as semantics, may be implemented. Generally, M2M technologies provide building blocks for the IoT/WoT, and any M2M device, M2M gateway or M2M service platform may be a component of the IoT/WoT as well as an IoT/WoT service layer, etc.

As shown in FIG. 39A, M2M/IoT/WoT communication system 10 includes communication network 12. Communication network 12 may be a fixed network (e.g., Ethernet, Fiber, ISDN, PLC, or the like) or a wireless network (e.g., WLAN, cellular, or the like) or a network of heterogeneous networks. For example, communication network 12 may comprise of multiple access networks that provides content such as voice, data, video, messaging, broadcast, or the like to multiple users. For example, communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, communication network 12 may comprise other networks such as a core network, the Internet, a sensor network, an industrial control network, a personal area network, a fused personal network, a satellite network, a home network, or an enterprise network for example.

As shown in FIG. 39A, M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in M2M/IoT/WoT communication system 10 as desired. Each of M2M gateway devices 14 and M2M terminal devices 18 are configured to transmit and receive signals via communication network 12 or direct radio link. M2M gateway device 14 allows wireless M2M devices (e.g. cellular and non-cellular) as well as fixed network M2M devices (e.g., PLC) to communicate either through operator networks, such as communication network 12 or direct radio link. For example, M2M devices 18 may collect data and send the data, via communication network 12 or direct radio link, to M2M application 20 or M2M devices 18. M2M devices 18 may also receive data from M2M application 20 or M2M device 18. Further, data and signals may be sent to and received from M2M application 20 via M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Referring to FIG. 39B, illustrated M2M service layer 22 in the field domain provides services for M2M application 20, M2M gateway devices 14, and M2M terminal devices 18 and communication network 12. It will be understood that M2M service layer 22 may communicate with any number of M2M applications, M2M gateway devices 14, M2M terminal devices 18, and communication networks 12 as desired. M2M service layer 22 may be implemented by one or more servers, computers, or the like. M2M service layer 22 provides service capabilities that apply to M2M terminal devices 18, M2M gateway devices 14 and M2M applications 20. The functions of M2M service layer 22 may be implemented in a variety of ways, for example as a web server, in the cellular core network, in the cloud, etc.

Similar to illustrated M2M service layer 22, there is M2M service layer 22' in the Infrastructure Domain. M2M service layer 22' provides services for M2M application 20' and underlying communication network 12' in the infrastructure domain. M2M service layer 22' also provides services for M2M gateway devices 14 and M2M terminal devices 18 in the field domain. It will be understood that M2M service layer 22' may communicate with any number of M2M applications, M2M gateway devices and M2M terminal devices. M2M service layer 22' may interact with a service layer by a different service provider. M2M service layer 22' may be implemented by one or more servers, computers, virtual machines (e.g., cloud/compute/storage farms, etc.) or the like.

Referring also to FIG. 39B, M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. Service layer 22 and 22' also enables M2M applications 20 and 20' to communicate through various networks 12 and 12' in connection with the services that service layer 22 and 22' provide.

In some examples, M2M applications 20 and 20' may include desired applications that communicate using semantics nodes, semantics-related resources, or the associated implementations regarding semantics, as discussed herein. M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/geofencing, device/service discovery, and legacy systems integration, and provides these functions as services to M2M applications 20 and 20'.

The semantics nodes, semantics-related resources, or the associated implementations regarding semantics of the present application may be implemented as part of a service layer. The service layer (e.g. phone SL 713 or gym gateway service layer 179) is a software middleware layer that supports value-added service capabilities through a set of application programming interfaces (APIs) and underlying networking interfaces. An M2M entity (e.g., an M2M functional entity such as a device, gateway, or service/platform that may be implemented by a combination of hardware and software) may provide an application or service. Both ETSI M2M and oneM2M use a service layer that may contain the semantics nodes, semantics-related resources, or the associated implementations regarding semantics of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The oneM2M service layer supports a set of Common Service Functions (CSFs) (i.e. service capabilities). An instantiation of a set of one or more particular types of CSFs is referred to as a Common Services Entity (CSE), which can be hosted on different types of network nodes (e.g. infrastructure node, middle node, application-specific node). Further, the semantics nodes, semantics-related resources, or the associated implementations regarding semantics of the present application can be implemented as part of an M2M network that uses a Service Oriented Architecture (SOA) and/or a resource-oriented architecture (ROA) to access services, such as the semantics implementations of the present application.

FIG. 39C is a system diagram of an example M2M device 30, such as M2M terminal device 18. As shown in FIG. 39C, M2M device 30 may include processor 32, transceiver 34, transmit/receive element 36, speaker/microphone 38, keypad 40, display/touchpad 42, non-removable memory 44, removable memory 46, power source 48, global positioning system (GPS) chipset 50, and other peripherals 52. It will be appreciated that M2M device 30 may include any subcombination of the foregoing elements while remaining consistent with the disclosed subject matter. M2M device 30 (consistent with watch 710, phone 712, ambient sensor 716, M2M device 171, M2M server 170, M2M gateway 172, Sscl 742, AE 741, CSE 732, and others) may be a device that uses the disclosed systems and methods for semantics nodes, semantics-related resources, or the associated implementations regarding semantics.

Processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. Processor 32 may perform signal coding, data processing, power control, input/output processing, and/or any other functionality that enables M2M device 30 to operate in a wireless environment. Processor 32 may be coupled to transceiver 34, which may be coupled to transmit/receive element 36. While FIG. 39C depicts processor 32 and transceiver 34 as separate components, it will be appreciated that processor 32 and transceiver 34 may be integrated together in an electronic package or chip. Processor 32 may perform application-layer programs (e.g., browsers) and/or radio access-layer (RAN) programs and/or communications. Processor 32 may perform security operations such as authentication, security key agreement, and/or cryptographic operations, such as at the access-layer and/or application layer for example.

Transmit/receive element 36 may be configured to transmit signals to, or receive signals from M2M service platform 22. For example, transmit/receive element 36 may be an antenna configured to transmit and/or receive RF signals. Transmit/receive element 36 may support various networks and air interfaces, such as WLAN, WPAN, cellular, and the like. In an example, transmit/receive element 36 may be an emitter/detector configured to transmit and/or receive IR, UV, or visible light signals, for example. In yet another example, transmit/receive element 36 may be configured to transmit and receive both RF and light signals. It will be appreciated that transmit/receive element 36 may be configured to transmit and/or receive any combination of wireless or wired signals.

In addition, although transmit/receive element 36 is depicted in FIG. 39C as a single element, M2M device 30 may include any number of transmit/receive elements 36. More specifically, M2M device 30 may employ MIMO technology. Thus, in an example, M2M device 30 may include two or more transmit/receive elements 36 (e.g., multiple antennas) for transmitting and receiving wireless signals.

Transceiver 34 may be configured to modulate the signals that are to be transmitted by transmit/receive element 36 and to demodulate the signals that are received by transmit/receive element 36. As noted above, M2M device 30 may have multi-mode capabilities. Thus, transceiver 34 may include multiple transceivers for enabling M2M device 30 to communicate via multiple RATs, such as UTRA and IEEE 802.11, for example.

Processor 32 may access information from, and store data in, any type of suitable memory, such as non-removable memory 44 and/or removable memory 46. Non-removable memory 44 may include random-access memory (RAM), read-only memory (ROM), a hard disk, or any other type of memory storage device. Removable memory 46 may include a subscriber identity module (SIM) card, a memory stick, a secure digital (SD) memory card, and the like. In other examples, processor 32 may access information from, and store data in, memory that is not physically located on M2M device 30, such as on a server or a home computer. Processor 32 may be configured to control lighting patterns, images, or colors on display or indicators 42 in response to whether the semantics associated methods in some of the examples described herein are successful or unsuccessful (e.g., whether the datatype is compatible for semantics, whether another application was or will need to be queried to gather semantics information, or display of semantics), or otherwise indicate a status of semantics nodes, semantics-related resources, or the associated implementations regarding semantics. The control lighting patterns, images, or colors on display or indicators 42 may be reflective of the status of any of the method flows or components in the FIG.'s (e.g., FIG. 1-FIG. 38) illustrated or discussed herein. Disclosed herein are messages and procedures of semantics-related resources management as well as resource semantics information management. The messages and procedures can be extended to provide interface/API for users to request resource-related resources via an input source (e.g., speaker/microphone 38, keypad 40, or display/touchpad 42) and request, configure, or query semantics information of resources, among other things that may be displayed on display 42.

Processor 32 may receive power from power source 48, and may be configured to distribute and/or control the power to the other components in M2M device 30. Power source 48 may be any suitable device for powering M2M device 30. For example, power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

Processor 32 may also be coupled to GPS chipset 50, which is configured to provide location information (e.g., longitude and latitude) regarding the current location of M2M device 30. It will be appreciated that M2M device 30 may acquire location information by way of any suitable location-determination method while remaining consistent with information disclosed herein.

Processor 32 may further be coupled to other peripherals 52, which may include one or more software and/or hardware modules that provide additional features, functionality and/or wired or wireless connectivity. For example, peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 39D is a block diagram of exemplary computing system 90 on which, for example, M2M service platform 22 of FIG. 39A and FIG. 39B may be implemented. Computing system 90 (e.g., M2M terminal device 18 or M2M gateway device 14) may comprise a computer or server and may be controlled primarily by computer readable instructions, which may be in the form of software, wherever, or by whatever means such software is stored or accessed. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, central processing unit 91 may comprise multiple processors. Coprocessor 81 is an optional processor, distinct from main CPU 91 that performs additional functions or assists CPU 91. CPU 91 and/or coprocessor 81 may receive, generate, and process data related to the disclosed systems and methods for semantics nodes, semantics-related resources, or the associated implementations regarding semantics, such as creating or receiving semantics-related resources.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 can be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85.

Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIG. 39A and FIG. 39B.

It is understood that any or all of the systems, methods and processes described herein may be embodied in the form of computer executable instructions (i.e., program code) stored on a computer-readable storage medium which instructions, when executed by a machine, such as a computer, server, M2M terminal device, M2M gateway device, or the like, perform and/or implement the systems, methods and processes described herein. Specifically, any of the steps, operations or functions described above may be implemented in the form of such computer executable instructions. Computer readable storage media include both volatile and nonvolatile, removable and non-removable media implemented in any method or technology for storage of information, but such computer readable storage media do not includes signals, per se. Computer readable storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other physical medium which can be used to store the desired information and which can be accessed by a computer.

In describing preferred methods, systems, or apparatuses of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. For example, although it is illustrated that the target of semantics related resource publishing and discovery are siblings and children, the semantics node can choose other semantics nodes for publishing and discovery that may not have such relationships.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Methods, systems, and apparatuses, among other things, as described herein may provide for Semantics Node functions which provide semantics support in machine-to-machine (M2M) systems. A method, system, computer readable storage medium, or apparatus has means for requesting semantics information for data; means for receiving a type (which is an example of semantics information) that is associated with the data based on the requesting of semantics information; and means for requesting a definition of the type from a semantics node. The type has a name that comprises a keyword that describes a unit associated with the data. The unit associated with the data comprises a unit for temperature or a unit for blood pressure. The semantics information comprises a class resource. The data is stored in a resource hierarchy along with the semantics information. The semantics information comprises a class resource. The method, system, computer readable storage medium, or apparatus has means for determining whether the type that is associated with the data is compatible with a first application entity, wherein the data is from a second application entity. All combinations in this paragraph (including the removal or addition of steps) are contemplated in a manner that is consistent with the other portions of the detail description.

Methods, systems, and apparatuses, among other things, as described herein may provide for Semantics Node functions which provide semantics support in machine-to-machine (M2M) systems. A method, system, computer readable storage medium, or apparatus has means for receiving, by a first application entity, data associated with a second application entity; means for requesting, by the first application entity, semantics information for the data; means for receiving, by the first application entity, a type that is associated with the data based on the requesting of semantics information; means for determining, by the first application entity, whether the type that is associated with the data is compatible with the first application entity; and means for requesting a definition of the type from a semantics node based on the compatibility with the first application entity. The type has a name that comprises a keyword that describes a unit associated with the data. The unit associated with the data comprises a unit for temperature or a unit for blood pressure. The semantics information comprises a class resource. The data is stored in a resource hierarchy along with the semantics information. The semantics information comprises a class resource. The first application entity comprises an application associated with a sensor. All combinations in this paragraph (including the removal or addition of steps) are contemplated in a manner that is consistent with the other portions of the detail description.

Methods, systems, and apparatuses, among other things, as described herein may provide for Semantics Node functions which provide semantics support in machine-to-machine (M2M) systems. A method, system, computer readable storage medium, or apparatus has means for requesting semantics information for data; means for receiving a type that is associated with the data based on the requesting of semantics information; and means for determining, by a first application entity, whether the type that is associated with the data is compatible with the first application entity; and means for requesting a definition of the type from a semantics node based on the compatibility with the first application entity. The type has a name that comprises a keyword that describes a unit associated with the data. The unit associated with the data comprises a unit for temperature or a unit for blood pressure. The semantics information comprises a class resource. The data is stored in a resource hierarchy along with the semantics information. The method, system, computer readable storage medium, or apparatus has means for determining whether the type that is associated with the data is compatible with the first application entity, wherein the data is from a second application entity. All combinations in this paragraph (including the removal or addition of steps) are contemplated in a manner that is consistent with the other portions of the detail description.

What is claimed:

1. An apparatus, the apparatus comprising:
    a processor; and
    memory coupled with the processor, the memory comprising executable instructions that when executed by the processor cause the processor to effectuate operations comprising:
        having connections to one or more sibling entities and one or more parent entities;
        receiving a first discovery request, wherein the first discovery request comprises a valid discovery criteria;
        applying the valid discovery criteria over one or more resources available locally;
        identifying if the one or more resources meet the valid discovery criteria locally;
        when none of the one or more resources meet the valid discovery criteria locally, determining that the first discovery request should be forwarded to selected sibling entities of the one or more sibling entities;
        forwarding the first discovery request to the selected sibling entities;
        receiving, within a time window to wait for a response, first discovery results that comprises information of discovered resources from the selected sibling entities;
        when no resource that meet the valid discovery criteria is identified from the selected sibling entities, further determining whether the first discovery request should be forwarded to selected parent entities of the one or more parent entities;
        if there is a determination that the first discovery request should be forwarded to the selected parent entities,
            forwarding the first discovery request to the selected parent entities;
            receiving second discovery results that comprise information of discovered resources from the selected parent entities;
            aggregating the first discovery results and the second discovery results; and
            sending the aggregated discovery results including the discovered resources.

2. The apparatus or claim 1, wherein the one or more sibling entities and the one or more parent entities are middleware entities located on top of network protocol stacks.

3. The apparatus of claim 2, wherein the middleware entities are in service layer for IoT services.

4. The apparatus of claim 3, wherein the service layer is defined according to ETSI/oneM2M standards.

5. The apparatus of claim 1, wherein the discovered resources are a uniquely addressable element in a Resource Oriented Architecture (ROA) having representation that can be manipulated via RESTful methods.

6. The apparatus of claim 1, wherein the one or more sibling entities are one or more semantic nodes.

7. The apparatus of claim 1, wherein the apparatus is a semantics node that is a repository that describes data.

8. A method comprising:
    receiving a first discovery request, wherein the first discovery request comprises a valid discovery criteria;
    applying the valid discovery criteria over one or more resources available locally;
    identifying if the one or more resources meet the valid discovery criteria locally;
    when none of the one or more resources meet the valid discovery criteria locally, determining that the first discovery request should be forwarded to selected sibling entities of one or more sibling entities connected with an apparatus;
    forwarding the first discovery request to the selected sibling entities;
    receiving, within a time window to wait for a response, first discovery results that comprises information of discovered resources from the selected sibling entities;
    when no resource that meet the valid discovery criteria is identified from the selected sibling entities, further determining whether the first discovery request should be forwarded to selected parent entities of one or more parent entities connected with the apparatus;
    if there is a determination that the first discovery request should be forwarded to the selected parent entities,
        forwarding the first discovery request to the selected parent entities;

receiving second discovery results that comprise information of discovered resources from the selected parent entities;

aggregating the first discovery results and the second discovery results; and sending the aggregated discovery results including the discovered resources.

9. The method of claim 8, wherein the one or more sibling entities and the one or more parent entities are middleware entities located on top of network protocol stacks.

10. The method of claim 9, wherein the middleware entities are in service layer for IoT services.

11. The method of claim 10, wherein the service layer is defined according to ETSI/oneM2M standards.

12. The method of claim 8, wherein the discovered resources are a uniquely addressable element in a Resource Oriented Architecture (ROA) having representation that can be manipulated via RESTful methods.

13. The method of claim 8, wherein the one or more sibling entities are one or more semantic nodes.

14. The method of claim 13, further comprising receiving an indication that a semantics node comprises a matching semantics resource.

15. A computer readable storage medium comprising computer executable instructions that when executed by a computing device cause said computing device to effectuate operations comprising:

having connections to one or more sibling entities and one or more parent entities;

receiving a first discovery request, wherein the first discovery request comprises a valid discovery criteria;

applying the valid discovery criteria over one or more resources available locally;

identifying if the one or more resources meet the valid discovery criteria locally;

when none of the one or more resources meet the valid discovery criteria locally, determining that the first discovery request should be forwarded to selected sibling entities of the one or more sibling entities;

forwarding the first discovery request to the selected sibling entities;

receiving, within a time window to wait for a response, first discovery results that comprises information of discovered resources from the selected sibling entities;

when no resource that meet the valid discovery criteria is identified from the selected sibling entities, further determining whether the first discovery request should be forwarded to the selected parent entities;

if there is a determination that the first discovery request should be forwarded to the selected parent entities, forwarding the first discovery request to the selected parent entities;

receiving second discovery results that comprise information of discovered resources from the selected parent entities;

aggregating the first discovery results and the second discovery results; and sending the aggregated discovery results including the discovered resources.

16. The computer readable storage medium of claim 15, wherein the one or more sibling entities and the one or more parent entities are middleware entities located on top of network protocol stacks.

17. The computer readable storage medium of claim 16, wherein the middleware entities are in service layer for IoT services.

18. The computer readable storage medium of claim 17, wherein the service layer is defined according to ETSI/oneM2M standards.

19. The computer readable storage medium of claim 18, wherein the discovered resources are a uniquely addressable element in a Resource Oriented Architecture (ROA) having representation that can be manipulated via RESTful methods.

20. The computer readable storage medium of claim 15, wherein the one or more sibling entities are semantic nodes.

* * * * *